United States Patent
Tennant et al.

(10) Patent No.: US 12,060,452 B2
(45) Date of Patent: Aug. 13, 2024

(54) POLYOL COMPOSITIONS

(71) Applicant: Presidium USA, Inc, Dover, DE (US)

(72) Inventors: Andrew John Tennant, Burlington (CA); James Henry Blumsom, London (CA); Gary Jialanella, Burlington (CA); Jason Carter, Newberry (CA); James A. Cella, Clifton Park, NY (US); James M. Silva, Clifton Park, NY (US)

(73) Assignee: Presidium USA, Inc, Dover, DE (US)

( * ) Notice: Subject to any disclaimer, the term of this patent is extended or adjusted under 35 U.S.C. 154(b) by 701 days.

(21) Appl. No.: 17/287,156

(22) PCT Filed: Oct. 21, 2019

(86) PCT No.: PCT/US2019/057236
§ 371 (c)(1),
(2) Date: Apr. 21, 2021

(87) PCT Pub. No.: WO2020/086470
PCT Pub. Date: Apr. 30, 2020

(65) Prior Publication Data
US 2021/0363290 A1  Nov. 25, 2021
US 2024/0010786 A9  Jan. 11, 2024

Related U.S. Application Data

(63) Continuation-in-part of application No. 16/105,089, filed on Aug. 20, 2018, now Pat. No. 11,066,511, and
(Continued)

(51) Int. Cl.
| | |
|---|---|
| C08G 59/62 | (2006.01) |
| C08G 18/02 | (2006.01) |
| C08G 18/32 | (2006.01) |
| C08G 18/40 | (2006.01) |
| C08G 18/42 | (2006.01) |
| C08G 18/44 | (2006.01) |
| C08G 18/46 | (2006.01) |
| C08G 18/48 | (2006.01) |
| C08G 18/50 | (2006.01) |
| C08G 18/76 | (2006.01) |

(Continued)

(52) U.S. Cl.
CPC ............. *C08G 59/62* (2013.01); *C08G 18/02* (2013.01); *C08G 18/3206* (2013.01); *C08G 18/3215* (2013.01); *C08G 18/3284* (2013.01); *C08G 18/40* (2013.01); *C08G 18/4222* (2013.01); *C08G 18/4244* (2013.01); *C08G 18/44* (2013.01); *C08G 18/46* (2013.01); *C08G 18/4615* (2013.01); *C08G 18/48* (2013.01); *C08G 18/4829* (2013.01); *C08G 18/5021* (2013.01); *C08G 18/7664* (2013.01); *C08G 64/42* (2013.01); *C08L 75/04* (2013.01); *C08G 2310/00* (2013.01); *C08J 2375/04* (2013.01)

(58) Field of Classification Search
CPC .......................... C08G 59/62; C08G 2310/00; C08G 18/4829; C08G 18/46; C08G 18/5021; C08G 18/48; C08G 18/44; C08G 18/4222; C08G 18/4244; C08G 18/4615; C08G 18/7664; C08G 64/42; C08G 18/3206; C08G 18/3215; C08G 18/3284; C08G 18/02; C08G 18/40; C08L 75/04; C08J 2375/04
USPC ........................................................ 524/198
See application file for complete search history.

(56) References Cited

U.S. PATENT DOCUMENTS

| | | | |
|---|---|---|---|
| 4,528,364 A | 7/1985 | Prier | |
| 5,066,762 A | 11/1991 | Ohbuchi et al. | |

(Continued)

FOREIGN PATENT DOCUMENTS

| | | |
|---|---|---|
| CN | 1349096 A | 5/2002 |
| CN | 101633731 A | 1/2010 |

(Continued)

OTHER PUBLICATIONS

Achaya et al., "The Component Fatty Acids and Glycerides of Castor Oil" The Journal of the American Oil Chemist's Society, vol. 41, Issue 12, pp. 783-784 (1964).

(Continued)

*Primary Examiner* — Hui H Chin

(74) *Attorney, Agent, or Firm* — Young Basile Hanlon & MacFarlane, P.C.

(57) ABSTRACT

Disclosed are polyol compositions with a low viscosity that exhibit superior heat resistance, enhanced stability in the presence of water, improved strength, hardness, and molding characteristics relative to known polyurethane materials. Disclosed is a polyol composition comprising: (a) at least one monomeric polyol comprising three or more hydroxyl groups; (b) at least one higher polyol comprising three or more hydroxyl groups; and (c) at least one polyhydroxylated aromatic compound; wherein the at least one higher polyol comprises residues of either or both of the at least one monomeric polyol and the polyhydroxylated aromatic compound linked by one or more carbonate groups, oxygen ether groups, or a combination thereof. Disclosed are methods of preparing the disclosed compositions. Disclosed are articles prepared from the disclosed compositions that exhibit flexural strengths in excess of 10,000 psi and flexural moduli in excess of 400,000 psi, and exhibit outstanding green strength.

20 Claims, 6 Drawing Sheets

Related U.S. Application Data a continuation-in-part of application No. 16/105,106, filed on Aug. 20, 2018, now Pat. No. 11,072,679, and a continuation-in-part of application No. 16/105,126, filed on Aug. 20, 2018, now Pat. No. 11,072,680, and a continuation-in-part of application No. 16/105,148, filed on Aug. 20, 2018, now Pat. No. 11,066,512, and a continuation-in-part of application No. 16/105,161, filed on Aug. 20, 2018, now Pat. No. 11,078,325, said application No. 16/105,089 is a continuation of application No. 15/589,182, filed on May 8, 2017, now Pat. No. 10,053,533, and a continuation of application No. PCT/US2017/032614, filed on May 15, 2017, said application No. 16/105,106 is a continuation of application No. 15/589,182, filed on May 8, 2017, now Pat. No. 10,053,533.

(60) Provisional application No. 62/749,372, filed on Oct. 23, 2018, provisional application No. 62/485,000, filed on Apr. 13, 2017.

(51) Int. Cl.
*C08G 64/42* (2006.01)
*C08L 75/04* (2006.01)

(56) References Cited

U.S. PATENT DOCUMENTS

| | | |
|---|---|---|
| 5,856,372 A | 1/1999 | Ho et al. |
| 5,936,047 A | 8/1999 | De Bont et al. |
| 5,952,450 A | 9/1999 | Ishihara et al. |
| 5,973,099 A | 10/1999 | Nodelman et al. |
| 6,046,301 A | 4/2000 | Bolton et al. |
| 6,534,620 B1 | 3/2003 | Hovestadt et al. |
| 6,624,278 B2 | 9/2003 | Muller et al. |
| 6,646,100 B2 | 11/2003 | Hofmann et al. |
| 7,098,274 B2 | 8/2006 | Wu et al. |
| 7,241,504 B2 | 7/2007 | Verborgt et al. |
| 7,250,483 B2 | 7/2007 | Heuer et al. |
| 7,521,521 B2 | 4/2009 | Bruchmann et al. |
| 7,649,074 B2 | 1/2010 | Bruchmann et al. |
| 7,858,732 B2 | 12/2010 | Bruchmann et al. |
| 7,928,182 B2 | 4/2011 | Dinh et al. |
| 7,928,183 B2 | 4/2011 | Truong Dinh et al. |
| 7,956,285 B2 | 6/2011 | Tally et al. |
| 7,964,202 B2 | 6/2011 | Orsoni et al. |
| 7,990,454 B2 | 8/2011 | Notsu et al. |
| 8,020,249 B2 | 9/2011 | Masuda et al. |
| 8,044,170 B2 | 10/2011 | Bruchmann et al. |
| 8,110,710 B2 | 2/2012 | Dai et al. |
| 8,197,715 B2 | 6/2012 | Weber et al. |
| 8,247,520 B2 | 8/2012 | Allen et al. |
| 8,273,846 B2 | 9/2012 | Nefzger et al. |
| 8,282,851 B2 | 10/2012 | Duwenhorst et al. |
| 8,309,646 B2 | 11/2012 | Terrenoire et al. |
| 8,362,146 B2 | 1/2013 | Eipper et al. |
| 8,399,554 B2 | 3/2013 | Roller et al. |
| 8,410,227 B2 | 4/2013 | Eipper et al. |
| 8,428,268 B2 | 4/2013 | Konagai et al. |
| 8,445,576 B2 | 5/2013 | Eipper et al. |
| 8,446,125 B2 | 5/2013 | Mkhitarian |
| 8,470,956 B2 | 6/2013 | Allen et al. |
| 8,501,280 B2 | 8/2013 | Bruchmann et al. |
| 8,530,567 B2 | 9/2013 | Roller et al. |
| 8,604,155 B2 | 12/2013 | Allen et al. |
| 8,822,622 B2 | 9/2014 | Huybrechts et al. |
| 8,853,319 B2 | 10/2014 | Weber et al. |
| 8,921,508 B2 | 12/2014 | Allen et al. |
| 8,933,192 B2 | 1/2015 | Gurtler et al. |
| 9,018,334 B2 | 4/2015 | Montgomery et al. |
| 9,029,498 B2 | 5/2015 | Allen et al. |
| 9,120,894 B2 | 9/2015 | Muller et al. |
| 9,155,479 B2 | 10/2015 | Solem |
| 9,249,259 B2 | 2/2016 | Muller et al. |
| 9,376,531 B2 | 6/2016 | Allen et al. |
| 9,522,976 B2 | 12/2016 | Tabor et al. |
| 9,809,678 B2 | 11/2017 | Allen et al. |
| 9,896,540 B2 | 2/2018 | Tabor et al. |
| 10,053,533 B1 | 8/2018 | Blumsom et al. |
| 2005/0288407 A1 | 12/2005 | Heuer et al. |
| 2006/0116055 A1 | 6/2006 | Oyu et al. |
| 2007/0244227 A1 | 10/2007 | Eipper et al. |
| 2007/0257240 A1 | 11/2007 | Engelmann et al. |
| 2007/0260015 A1 | 11/2007 | Stork et al. |
| 2008/0015303 A1 | 1/2008 | Eibeck et al. |
| 2008/0020194 A1 | 1/2008 | Younes et al. |
| 2008/0045668 A1 | 2/2008 | Eibeck et al. |
| 2008/0064827 A1 | 3/2008 | Eipper et al. |
| 2008/0076859 A1 | 3/2008 | Eipper et al. |
| 2008/0097033 A1 | 4/2008 | Rosenau et al. |
| 2008/0139715 A1 | 6/2008 | Scherzer et al. |
| 2008/0167419 A1 | 7/2008 | Eipper et al. |
| 2008/0180895 A1 | 7/2008 | Jin et al. |
| 2008/0194741 A1 | 8/2008 | Engelmann et al. |
| 2008/0207812 A1 | 8/2008 | Mettlach et al. |
| 2008/0211135 A1 | 9/2008 | Eipper et al. |
| 2008/0214701 A1 | 9/2008 | Wilms et al. |
| 2008/0226084 A1 | 9/2008 | Konagai et al. |
| 2008/0309787 A1 | 12/2008 | Notsu et al. |
| 2009/0011916 A1 | 1/2009 | Steidl |
| 2009/0047717 A1 | 2/2009 | Gross et al. |
| 2009/0057137 A1 | 3/2009 | Pitts et al. |
| 2009/0064442 A1 | 3/2009 | Masuda et al. |
| 2009/0169855 A1 | 7/2009 | Tunis |
| 2009/0171408 A1 | 7/2009 | Solem |
| 2009/0209701 A1 | 8/2009 | Steinmetz et al. |
| 2009/0247658 A1 | 10/2009 | Kobayashi et al. |
| 2009/0275680 A1 | 11/2009 | Bruchmann et al. |
| 2009/0281271 A1 | 11/2009 | Bruchmann et al. |
| 2009/0315513 A1 | 12/2009 | Mkhitarian |
| 2010/0000783 A1 | 1/2010 | Tally et al. |
| 2010/0032611 A1 | 2/2010 | Fukuhara et al. |
| 2010/0048935 A1 | 2/2010 | Mijolovic et al. |
| 2010/0222524 A1 | 9/2010 | Lawrey et al. |
| 2010/0249311 A1 | 9/2010 | Eipper et al. |
| 2010/0280165 A1 | 11/2010 | Terrenoire et al. |
| 2011/0196098 A1 | 8/2011 | Mettlach et al. |
| 2011/0201745 A1 | 8/2011 | Roller et al. |
| 2011/0274932 A1 | 11/2011 | Benten et al. |
| 2012/0003454 A1 | 1/2012 | Younes et al. |
| 2012/0085961 A1 | 4/2012 | Rogunova et al. |
| 2012/0201982 A1 | 8/2012 | Stewart et al. |
| 2014/0371363 A1 | 12/2014 | Nakamura et al. |
| 2015/0299372 A1 | 10/2015 | Allen et al. |
| 2015/0299374 A1 | 10/2015 | Hofmann et al. |
| 2016/0229955 A1 | 8/2016 | Muller et al. |
| 2016/0272756 A1 | 9/2016 | Tabor et al. |
| 2016/0297919 A1 | 10/2016 | Klesczewski et al. |
| 2016/0362518 A1 | 12/2016 | Muller et al. |
| 2017/0051103 A1 | 2/2017 | Tabor et al. |
| 2018/0134841 A1 | 5/2018 | Share et al. |
| 2018/0155481 A1 | 6/2018 | Share et al. |

FOREIGN PATENT DOCUMENTS

| | | |
|---|---|---|
| CN | 101775129 A | 7/2010 |
| CN | 102206333 A | 10/2011 |
| CN | 102382441 A | 3/2012 |
| CN | 102911636 A | 2/2013 |
| CN | 104119486 A | 10/2014 |
| CN | 104163976 A | 11/2014 |
| CN | 104356634 A | 2/2015 |
| CN | 104610872 A | 5/2015 |
| CN | 105174822 A | 12/2015 |
| CN | 106008948 A | 10/2016 |
| CN | 108070067 A | 5/2018 |
| CZ | 2011336 A3 * | 1/2013 |
| CZ | 20110336 A3 | 1/2013 |
| EP | 0224769 A3 | 10/1988 |
| EP | 1609818 A3 | 12/2006 |
| EP | 1612231 B1 | 3/2010 |
| EP | 2548906 A1 | 1/2013 |

(56) References Cited

FOREIGN PATENT DOCUMENTS

| | | | |
|---|---|---|---|
| EP | 2548907 | A1 | 1/2013 |
| FR | 2874217 | B1 | 10/2006 |
| FR | 2880025 | B1 | 3/2007 |
| JP | 10036474 | A | 8/1974 |
| JP | S60210674 | A | 10/1985 |
| JP | H03152181 | A | 6/1991 |
| JP | H08080672 | A | 3/1996 |
| JP | 2002284976 | A | 10/2002 |
| JP | 2002293869 | A | 10/2002 |
| JP | 2003147070 | A | 5/2003 |
| JP | 2003147185 | A | 5/2003 |
| JP | 2003183405 | A | 7/2003 |
| JP | 2003192761 | A | 7/2003 |
| JP | 2003246852 | A | 9/2003 |
| JP | 2004035738 | A | 2/2004 |
| JP | 2006160871 | A | 6/2006 |
| JP | 2010013523 | A | 1/2010 |
| JP | 2017014413 | A | 1/2017 |
| JP | 2018044431 | A | 3/2018 |
| JP | 2018047011 | A | 3/2018 |
| RU | 2297430 | C2 | 4/2007 |
| WO | 2007/009897 | A1 | 1/2007 |
| WO | 2011/035743 | A1 | 3/2011 |
| WO | 2011/089120 | A1 | 7/2011 |
| WO | 2011/129940 | A1 | 10/2011 |
| WO | 2013/011014 | A1 | 1/2013 |
| WO | 2013/011015 | A1 | 1/2013 |
| WO | 2014/072336 | A1 | 5/2014 |
| WO | 2014/093995 | A1 | 6/2014 |
| WO | 2014/153046 | A3 | 12/2014 |
| WO | 2014/203173 | A1 | 12/2014 |
| WO | 2015/078801 | A1 | 6/2015 |
| WO | 2015/128277 | A1 | 9/2015 |
| WO | 2015/132080 | A1 | 9/2015 |
| WO | 2016/001164 | A1 | 1/2016 |
| WO | 2016/025421 | A1 | 2/2016 |
| WO | 2016/025423 | A1 | 2/2016 |
| WO | 2016/186727 | A1 | 11/2016 |
| WO | 2018/190891 | A1 | 10/2018 |

OTHER PUBLICATIONS

Benes et al. "Medium chain glycerides of coconut oil for microwave-enhanced conversion of polycarbonate into polyols" European Polymer Journal 86 pp. 173-187 2016.

Benes et al., "Polyurethane foams based entirely on recycled polyols derived from natural oils" Polimery, vol. 60, Issue 9, pp. 579-585 (2015).

First Examination Report in co-pending application IN201947045635 dated Oct. 31, 2020 (5 pages).

Iannone et al. "Ionic liquids/ZnO nanoparticles as recyclable catalyst for polycarbonate depolymerization" Journal of Molecular Catalysis A: Chemical 426(Part A) pp. 107-116 2017.

International Search Report and Written Opinion from the European Patent Office for Application No. PCT/US2017/032614 mailed Dec. 14, 2017.

Lin et al. "Novel Chemical Recycling of Polycarbonate (PC) Waste Into Bis-Hydroxyalkyl Ethers of Bisphenol a for Use as PU Raw Materials" Green Chemistry Issue 1 pp. 38-43 Jan. 2007.

Lin et al., "Identification and Quantification of the Molecular Species of Acylglycerols in Castor Oil by HPLC Using ELSD" Journal of Liquid Chromatography & Related Technologies, vol. 26, Issue 5, pp. 773-780 (2003).

Liu et al. "Fully degradable brush polymers with polycarbonate backbones and polylactide side chains" Science China: Chemistry 58(6) pp. 999-1004 2015.

Nikje et al. "Chemical recycling of polycarbonate wastes into bisphenol A by using green solvent composition" Polimery 58(4) pp. 292-294 Warsaw Poland 2013.

Pant "Polycarbonate Waste Management using Gylcerol" Process Safety and Environmental Protection 100 pp. 281-287 2016.

Ray et al. "Polycarbonate and Poly(carbonate-ester)s Synthesized from Biocompatible Building Blocks of Glycerol and Lactic Acid" Macromolecules 36(10) pp. 3557-3562 2003.

First Office Action received in co-pending Chinese Patent Application No. 201980070135.6 mailed on Apr. 6, 2022, with translation (16 pages).

* cited by examiner

POLYOL COMPOSITIONS

CROSS-REFERENCE TO RELATED APPLICATIONS

This application claims benefit of U.S. provisional application 62/749,372 filed on Oct. 23, 2018 and is a continuation in part of U.S. application Ser. No. 16/105,089 published as United States application publication number 2019/0040184 filed on Aug. 20, 2018, is a continuation in part of U.S. application Ser. No. 16/105,106 published as United States application publication 2019/0055345 filed on Aug. 20, 2018, is a continuation in part of U.S. application Ser. No. 16/105,126 published as United States publication number 2018/0355097 filed on Aug. 20, 2018, is a continuation in part of U.S. application Ser. No. 16/105,148 published as United States application publication 2019/0055346 filed on Aug. 20, 2018, and is a continuation in part of U.S. application Ser. No. 16/105,161 published as United States application publication number 2019/0241699 filed on Aug. 20, 2018; said U.S. application Ser. No. 16/105,089 is a continuation of U.S. application Ser. No. 15/589,182 published as U.S. Pat. No. 10,053,533 filed on May 8, 2017 and is a continuation of Patent Cooperation Treaty application number PCT/US2017/032614 filed on May 15, 2017, which claims benefit of U.S. provisional application No. 62/485,000 filed on Apr. 13, 2017; said U.S. application Ser. No. 16/105,106 is a continuation of U.S. application Ser. No. 15/589,182 published as U.S. Pat. No. 10,053,533 filed on May 8, 2017 and is a continuation of Patent Cooperation Treaty application number PCT/US2017/032614 filed on May 15, 2017, which claims benefit of U.S. provisional application No. 62/485,000 filed on Apr. 13, 2017; said U.S. publication Ser. No. 16/105,126 is a continuation of U.S. application Ser. No. 15/589,182 published as U.S. Pat. No. 10,053,533 filed on May 8, 2017 and is a continuation of Patent Cooperation Treaty application number PCT/US2017/032614 filed on May 15, 2017, which claims benefit of U.S. provisional application No. 62/485,000 filed on Apr. 13, 2017; said U.S. application publication Ser. No. 16/105,148 is a continuation of U.S. application Ser. No. 15/589,182 published as U.S. Pat. No. 10,053,533 filed on May 8, 2017 and is a continuation of Patent Cooperation Treaty application number PCT/US2017/032614 filed on May 15, 2017, which claims benefit of U.S. provisional application No. 62/485,000 filed on Apr. 13, 2017; and said U.S. application publication Ser. No. 16/105,161 is a continuation of U.S. application Ser. No. 15/589,182 published as U.S. Pat. No. 10,053,533 filed on May 8, 2017 and is a continuation of Patent Cooperation Treaty application number PCT/US2017/032614 filed on May 15, 2017, which claims benefit of U.S. provisional application No. 62/485,000 filed on Apr. 13, 2017

FIELD

This disclosure relates to polyol compositions useful in the preparation of polymeric compositions. In particular, this disclosure relates to polyol compositions useful in the preparation of polyurethane compositions.

BACKGROUND

Polyurethanes are important industrial polymers used in a wide variety of applications including rigid and flexible foams, thermoplastic and thermosetting elastomers, sealants, coatings and adhesives, elastomeric fibers, and synthetic leather-like materials and are typically prepared by reacting a polyisocyanate with a polyol or mixture of polyols to form a product. Most polyurethanes used commercially are elastomers with Young's moduli less than about 50,000 psi, but some polyurethanes in unfilled form have moduli ranging from 250,000 psi to 500,000 psi or more. Examples include TPU engineering plastics (Isoplast®) and a number of commercial cast systems. Polyurethanes have several shortcomings including the need for mold release agents, long demold times (poor green strength) and intense in-mold exotherms that can cause visual imperfections in the final part. Such imperfections include color change and surface splay from outgassing. Most polyurethane elastomers are generally not used for structural applications due to their typical low modulus and strength. The flexural moduli of most polyurethane compositions are well below 300,000 psi and flexural strength values are typically below 10,000 psi. Known polyurethanes may be deficient in terms of their resistance to heat, and are frequently characterized by heat distortion temperatures which are less than 100 degrees centigrade. In addition, upon exposure to conditions of high humidity at moderate temperature known polyurethanes may exhibit significant loss of material properties.

Recently, polyol compositions more complex than simple mixtures of polyols and potentially suitable for use in polyurethane manufacture, have been developed. For example, polyol compositions have been prepared by elaboration of naturally occurring triglycerides such as castor oil or coconut oil into mixtures of polyols, and by conversion of simple polyols into highly branched or hyperbranched polycarbonate polyol compositions. Such polyol compositions have not been shown to overcome the deficiencies of polyurethanes, particularly in the area of heat resistance. Moreover, methods employed to prepare the aforementioned polyol compositions require special processing conditions and equipment, for example microwave heating, or produce by-products which must be separated from the nascent or product polyol prior to its reaction with a polyisocyanate to form a polyurethane product.

Czech patent CZ2011-336 (Benes) discloses the preparation of polyol compositions obtained by microwave irradiation of a mixture of bisphenol A polycarbonate, a naturally occurring plant or animal oil such as castor oil and a catalyst. The product polyols were used to produce a polyurethane composition having a low glass transition temperature, negative 8 degrees centigrade.

Benes et al. European Polymer Journal 86 (2017) 173-187 discloses the preparation of polyol compositions obtained by microwave irradiation of bisphenol A polycarbonate in the presence of a mixture of monoglycerides prepared from coconut oil. The properties of any polyurethane materials prepared from the product polyols were not disclosed.

United States U.S. Pat. No. 7,521,521 (Bruchmann) patent discloses highly branched or hyper branched polycarbonate polyols prepared by reaction of polyols such as alkoxylated polyols such as alkoxylated trimethylol propane but does not disclose the use of such highly branched or hyper branched polycarbonate polyols in the preparation of polyurethane compositions Thus, there is a need for new polyurethane compositions which exhibit superior heat resistance, enhanced stability in the presence of water, improved strength, hardness, and molding characteristics relative to known polyurethane materials. There is a need for polyol compositions useful as starting materials in preparing polyurethane based compositions which exhibit superior heat resistance, enhanced stability in the presence of water, improved strength, hardness, and molding characteristics relative to known polyurethane materials.

BRIEF DESCRIPTION

This disclosure addresses many of the shortcomings of known polyurethanes by providing novel polyol compositions, which when reacted with isocyanate monomers or functional equivalents thereof provide a new class of polyurethanes having superior heat resistance and superior strength. The polyol compositions are adapted to provide structurally robust, temperature resistant polyurethanes, but are of sufficiently low viscosity to permit the use of currently available pumping and mixing equipment. The polyurethane compositions disclosed herein may exhibit heat distortion temperatures in excess of 110 degrees centigrade, high strength and essentially no loss of material properties in prolonged humidity tests at 70 degrees centigrade. The new polyurethanes exhibit lower peak exotherms, typically less than 250 degrees Fahrenheit during in-mold curing/polymerization, a beneficial attribute in making molded parts using FRP tooling. In addition, articles prepared from polyurethanes incorporating such polyol compositions as reactants exhibit flexural strengths in excess of 10,000 psi and flexural moduli in excess of 400,000 psi, and exhibit outstanding green strength.

Disclosed is a polyol composition comprising: (a) at least one monomeric polyol comprising three or more hydroxyl groups; (b) at least one higher polyol comprising three or more hydroxyl groups; and (c) at least one polyhydroxylated aromatic compound; wherein the at least one higher polyol comprises residues of either or both of the at least one monomeric polyol and the poly-hydroxylated aromatic compound linked by one or more carbonate groups, oxygen ether groups, or a combination thereof, and wherein the polyol composition has a viscosity of less than 5000 cps at 150 degrees Fahrenheit. The at least one monomeric polyol and at least one higher polyol may have any structures affording polyol compositions and polyurethane compositions having the requisite physical characteristics in terms of polyol composition viscosity and polyurethane heat resistance, strength and flexural modulus. The at least one monomeric polyol may be a polyether polyol. The at least one monomeric polyol may comprise three or more secondary hydroxyl groups or four or more secondary hydroxyl groups. The at least one higher polyol may comprise three or more secondary hydroxyl groups or four or more secondary hydroxyl groups. The at least one higher polyol may be a linear higher polyol. The at least one polyhydroxylated aromatic compound is a compound containing at least one aromatic ring and at least two hydroxyl groups each bonded directly to an aromatic ring of such compound. A portion or all of the at least one polyhydroxylated aromatic compounds may comprise at least one bisphenol.

There is disclosed a method of making a polyol composition as disclosed herein comprising: contacting one or more compositions containing one or more polyhydroxylated aromatic moieties with one or more monomeric polyols having three or more hydroxyl groups in the presence of at least one activating agent and an effective amount of at least one of a catalyst, a promoter or a mixture thereof, under conditions sufficient to cause formation of the first higher polyol to provide the product polyol composition.

There is disclosed a method of making a polyol composition as disclosed herein comprising: contacting at least one aromatic carbonate with one or more monomeric polyols having three or more hydroxyl groups in the presence of an effective amount of at least one of a catalyst, a promoter or a mixture thereof, under conditions sufficient to cause formation of the higher polyol to provide the product polyol composition; wherein the at least one aromatic carbonate comprises one or more residues of the polyhydroxylated aromatic compound; and wherein the at least one polyhydroxylated aromatic compound is derived from the one or more residues of the polyhydroxylated aromatic compound of the at least one aromatic carbonate.

There is disclosed a polyol composition as disclosed herein prepared by a method comprising: contacting one or more compositions containing one or more polyhydroxylated aromatic moieties with one or more monomeric polyols having three or more hydroxyl groups in the presence of at least one activating agent and an effective amount of at least one of a catalyst, a promoter or a mixture thereof, under conditions sufficient to cause formation of the at least one higher polyol to provide the product polyol composition.

Disclosed is a polyol composition as disclosed herein prepared by a method comprising: contacting one or more aromatic carbonates with one or more monomeric polyols having three or more hydroxyl groups in the presence of an effective amount of at least one of a catalyst, a promoter or a mixture thereof, under conditions sufficient to cause formation of the at least one higher polyol to provide the product polyol composition; wherein at least a portion of the at least one polyhydroxylated aromatic compound is derived from the one or more aromatic carbonates.

There is disclosed a polyurethane composition prepared by reacting a polyol composition as disclosed herein with one or more polyisocyanates, latent polyisocyanates or mixtures thereof, optionally in the presence of a catalyst, under conditions sufficient to cause at least a portion of the hydroxyl groups of the at least one monomeric polyol, at least a portion of the hydroxy groups of the at least one higher polyol, and at least a portion of the hydroxyl groups the at least one polyhydroxylated aromatic compound to react with isocyanate groups or latent isocyanate groups of the one or more polyisocyanates or latent polyisocyanates to form urethane linkages of the product polyurethane composition.

There is disclosed a polyurethane composition comprising the residue of a polyol composition as disclosed herein and the residue of one or more polyisocyanates or latent polyisocyanates; wherein urethane linkages of the polyurethane composition are formed by reaction of at least a portion of the hydroxyl groups of the at least one monomeric polyol, at least a portion of the hydroxyl groups of the at least one higher polyol, and at least a portion of the hydroxyl groups of the at least one polyhydroxylated aromatic compound with isocyanate groups of the polyisocyanates or latent isocyanate groups of the latent polyisocyanates.

There is disclosed an article comprising a polyurethane composition as disclosed herein which exhibits a heat distortion temperature greater than 110 degrees centigrade, a flexural strength greater than 10,000 psi and a flexural modulus greater than 400,000 psi.

There is disclosed a method of making a polyurethane composition comprising: contacting a polyol composition as disclosed herein with one or more polyisocyanates, latent polyisocyanates or mixtures thereof, optionally in the presence of a catalyst under conditions sufficient to cause at least a portion of the hydroxyl groups of the at least one monomeric polyol, at least a portion of the hydroxy groups of the at least one higher polyol, and at least a portion of the hydroxyl groups of the at least one polyhydroxylated aromatic compound to react with one or more isocyanate groups or latent isocyanate groups of the polyisocyanates or latent polyisocyanates to form a polyurethane product.

There is disclosed a method comprising: (a) mixing a first reactant comprising either or both of one or more polyisocyanates, one or more latent polyisocyanates or mixtures thereof with a second reactant comprising one or more polyol compositions as disclosed herein to form a reactive mixture; (b) transferring the reactive mixture into a mold; and (c) curing the reactive mixture within the mold to afford a molded part; wherein during step (c) at least a portion of the hydroxyl groups of the at least one monomeric polyol, at least a portion of the hydroxy groups of the at least one higher polyol, and at least a portion of the hydroxyl groups of the at least one polyhydroxylated aromatic compound react with isocyanate groups or latent isocyanate groups of the polyisocyanates or latent polyisocyanates to form a polyurethane product.

There is disclosed a composition comprising: (a) a first part comprising either or both of one or more polyisocyanates and one or more latent polyisocyanates; and (b) a second part comprising one or more polyol compositions as disclosed herein; wherein when the first part and the second part are contacted the composition cures by reaction of at least a portion of the hydroxyl groups of the at least one monomeric polyol, at least a portion of the hydroxy groups of the at least one higher polyol, and at least a portion of the hydroxyl groups of the at least one polyhydroxylated aromatic compound with the isocyanate groups or latent isocyanate groups of the polyisocyanates or latent polyisocyanates.

There is disclosed a polyol composition as disclosed herein comprising a filler. There is disclosed a polyol composition as disclosed herein comprising a filler, wherein the filler comprises one or more clay fillers, glass flake fillers, glass fiber fillers, carbon black fillers, carbon fiber fillers, basalt fiber fillers, or mixtures thereof.

There is disclosed a polyurethane composition comprising a filler prepared by reacting, in the presence of the filler, one or more polyol compositions as disclosed herein with one or more polyisocyanates, latent polyisocyanates or mixtures thereof, optionally in the presence of a catalyst, under conditions sufficient to cause at least a portion of the hydroxyl groups of the at least one monomeric polyol, at least a portion of the hydroxy groups of the at least one higher polyol, and at least a portion of the hydroxyl groups of the at least one polyhydroxylated aromatic compound to react with isocyanate groups or latent isocyanate groups of the one or more polyisocyanates or latent polyisocyanates to form urethane linkages of the product polyurethane composition.

There is disclosed a polyurethane composition comprising a filler, the residue of one or more polyol compositions as disclosed herein and the residue of one or more polyisocyanates or latent polyisocyanates; wherein urethane linkages of the polyurethane composition are formed by reaction of at least a portion of the hydroxyl groups of the at least one monomeric polyol, at least a portion of the hydroxyl groups of the at least one higher polyol, and at least a portion of the hydroxyl groups the at least one polyhydroxylated aromatic compound with isocyanate groups of the polyisocyanates or latent isocyanate groups of the latent polyisocyanates.

There is disclosed a polyurethane composition as disclosed herein comprising a filler, wherein the filler comprises one or more clay fillers, glass flake fillers, glass fiber fillers, carbon black fillers, carbon fiber fillers, basalt fiber fillers, or mixtures thereof.

There is disclosed a polyurethane composition as disclosed herein comprising a filler, wherein the filler comprises one or more of a glass or carbon continuous filament mat (CFM), a chopped strand mat (CSM), and engineered stitched mat.

There is disclosed a polyurethane composition as disclosed herein comprising a filler, wherein the filler comprises one or more sizing agents or is essentially free of sizing agent.

There is disclosed a polyurethane composition as disclosed herein comprising a filler, wherein the filler is present in an amount greater than 1 percent by weight and less than 60 by weight based on the total weight of the composition.

Disclosed is an article comprising a polyurethane composition as disclosed herein comprising a filler, which exhibits a heat distortion temperature greater than 110° C., a flexural strength greater than 7,000 psi and a flexural modulus greater than 500,000 psi.

Disclosed is a method comprising: contacting in the presence of a filler a polyol composition as disclosed herein with one or more polyisocyanates, latent polyisocyanates or mixtures thereof, optionally in the presence of a catalyst under conditions sufficient to cause at least a portion of the hydroxyl groups of the at least one monomeric polyol, at least a portion of the hydroxy groups of the at least one higher polyol, and at least a portion of the hydroxyl groups of the at least one polyhydroxylated aromatic compound to react with one or more isocyanate groups or latent isocyanate groups of the polyisocyanates or latent polyisocyanates to form a polyurethane product.

There is disclosed a method comprising: (a) mixing a first reactant comprising either or both of one or more polyisocyanates, one or more latent polyisocyanates or mixtures thereof with a second reactant comprising one or more polyol compositions as disclosed herein to form a reactive mixture; (b) transferring the reactive mixture into a mold containing a reinforcing filler; and (c) curing the reactive mixture within the mold to afford a molded composite part; wherein during step (c) at least a portion of the hydroxyl groups of the at least one monomeric polyol, at least a portion of the hydroxy groups of the at least one higher polyol, and at least a portion of the hydroxyl groups of the at least one polyhydroxylated aromatic compound react with isocyanate groups or latent isocyanate groups of the polyisocyanates or latent polyisocyanates to form a polyurethane product in the presence of the filler.

There is disclosed a composition comprising: (a) a first part comprising either or both of a polyisocyanate and latent polyisocyanate; and (b) a second part comprising a polyol composition as disclosed herein; wherein when the first part and the second part are contacted the composition cures by reaction of at least a portion of the hydroxyl groups of the at least one monomeric polyol, at least a portion of the hydroxy groups of the at least one higher polyol, and at least a portion of the hydroxyl groups of the at least one polyhydroxylated aromatic compound with the isocyanate groups or latent isocyanate groups of the polyisocyanates or latent polyisocyanates; and wherein either or both of the first part and the second part comprises a filler.

The polyurethane materials provided by this disclosure are well suited for use in the manufacture of structural and semi-structural vehicle parts such as automotive and heavy truck body panels, floor panels, brackets, bumper covers, footsteps and housings, and interior parts such as door panels, arm rests, center console bodies and covers, cup holders and similar parts, and may be filled or unfilled materials. Other applications include the use of the polyurethanes in the manufacture of structural and semi-structural agricultural equipment components such as tractor body parts, brackets, grilles, fan shrouds and the like, and building and construction and industrial infrastructural pieces such as decks and railings, building trim, window lineals, manhole covers and electrical boxes. Further applications include manufacture of aquatic sports equipment such as kayaks, canoes, personal watercraft such as jet skis, paddle boards, surf boards, and light weight fishing craft.

DETAILED DESCRIPTION

Figure 1:
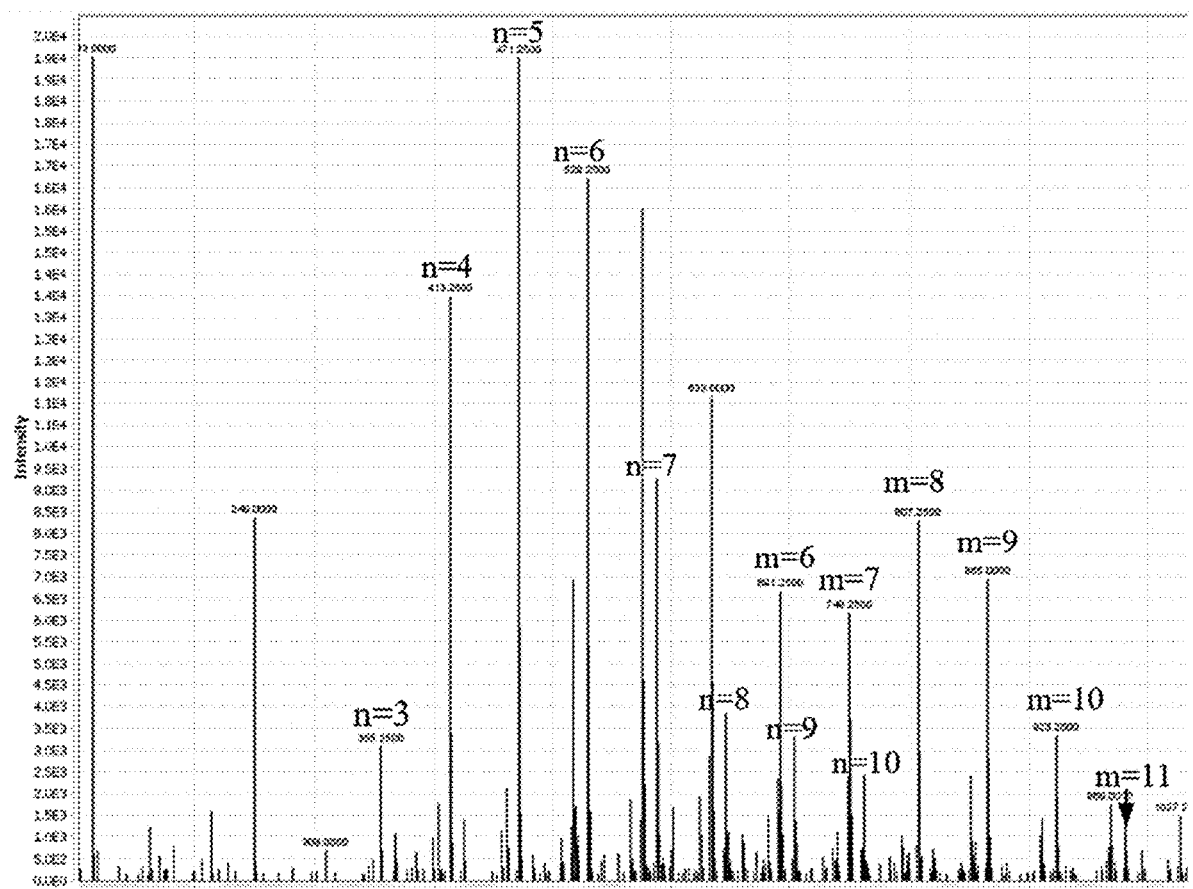
FIG. 1 shows a negative ion mass spectrum of a representative polyol composition as disclosed herein containing a higher polyol having structure IIa.

The explanations and illustrations presented herein are intended to acquaint others skilled in the art with the disclosure, its principles, and its practical application. The specific embodiments of the present disclosure as set forth are not intended as being exhaustive or limiting of the disclosure. The scope of the disclosure should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

One or more as used herein means that at least one, or more than one, of the recited components may be used as disclosed. Nominal as used with respect to functionality means the theoretical functionality. This can be calculated from the stoichiometry of the ingredients used. The actual functionality may be different due to imperfections in raw materials, incomplete conversion of the reactants and formation of by-products. Nominal with respect to molecular weight refers to the molecular weight of a particular structure. Nominal with respect to the molecular weight of a component of a chemical substance disclosed herein may differ from the actual molecular weight of the substance, for example as when the substance consists of a mixture of structurally related compounds as is the case with many commercially available polyether polyols. Durability in this context means that the composition once cured remains sufficiently strong to perform its designed function. Residual content of a component refers to the amount of the component present in free form or reacted with another material, such a higher polyol or a cured product. The residual content of a component can be calculated from the ingredients utilized to prepare the component or composition. It may be determined utilizing known analytical techniques. Heteroatom means nitrogen, oxygen, sulfur, silicon, selenium and phosphorus. Heteroatoms may include nitrogen and oxygen. Hydrocarbyl as used herein refers to a group containing one or more carbon atom backbones and hydrogen atoms, which may optionally contain one or more heteroatoms. As used herein, the term "hydrocarbyl" refers an organic radical which may be any of an aromatic radical, a cycloaliphatic radical, or an aliphatic radical as those terms are defined herein. Where the hydrocarbyl group contains heteroatoms, the heteroatoms may form one or more functional groups well known to one skilled in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. As used herein percent by weight or parts by weight refer to, or are based on, the weight of the disclosed composition unless otherwise specified.

The term isocyanate-reactive compound as used herein includes any organic compound having nominally greater than one, or at least two, isocyanate-reactive moieties. For the purposes of this invention, an active hydrogen containing moiety refers to a moiety containing a hydrogen atom which, because of its position in the molecule, displays significant activity according to the Zerewitinoff test described by Wohler in the Journal of the American Chemical Society, Vol. 49, p. 3181 (1927). Illustrative of such isocyanate reactive moieties, such as active hydrogen moieties, are —COOH, —OH, —NH$_2$, —NH—, —CONH$_2$, —SH, and —CONH—. Active hydrogen containing compounds include polyols, polyamines, polymercaptans and polyacids. The isocyanate reactive compound may be a polyol, and may be a polyether polyol.

As used herein, the term "aromatic radical" refers to an array of atoms having a valence of at least one comprising at least one aromatic group. The array of atoms having a valence of at least one comprising at least one aromatic group may include heteroatoms, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly, a tetrahydronaphthyl radical is an aromatic radical comprising an aromatic group (C$_6$H$_3$) fused to a nonaromatic component —(CH$_2$)$_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —OPhC(CF$_3$)$_2$PhO—), 4-chloromethylphen-1-yl, 3-trifluorovinyl-2-thienyl, 3-trichloromethylphen-1-yl (i.e., 3-CCl$_3$Ph-), 4-(3-bromoprop-1-yl)phen-1-yl (i.e., 4-BrCH$_2$CH$_2$CH$_2$Ph-), and the like. Further examples of aromatic radicals include 4-allyloxyphen-1-oxy, 4-aminophen-1-yl (i.e., 4-H$_2$NPh-), 3-amino-carbonylphen-1-yl (i.e., NH$_2$COPh-), 4-benzoylphen-1-yl, dicyanomethylidenebis (4-phen-1-yloxy) (i.e., —OPhC(CN)$_2$PhO—), 3-methylphen-1-yl, methylenebis(4-phen-1-yloxy) (i.e., —OPhCH$_2$PhO—), 2-ethylphen-1-yl, phenylethenyl, 3-formyl-2-thienyl, 2-hexyl-5-furanyl, hexa-methylene-1,6-bis(4-phen-1-yloxy) (i.e., —OPh(CH$_2$)$_6$PhO—), 4-hydroxymethylphen-1-yl (i.e., 4-HOCH$_2$Ph-), 4-mercaptomethylphen-1-yl (i.e., 4-HSCH$_2$Ph-), 4-methylthiophen-1-yl (i.e., 4-CH$_3$SPh-), 3-methoxyphen-1-yl, 2-methoxycarbonylphen-1-yloxy (e.g., methyl salicyl), 2-nitro-methylphen-1-yl (i.e., 2-NO$_2$CH$_2$Ph), 3-trimethylsilylphen-1-yl, 4-t-butyldimethylsilylphen-1-yl, 4-vinylphen-1-yl, vinylidenebis(phenyl), and the like. The term "a $C_3$-$C_{10}$ aromatic radical" includes aromatic radicals containing at least three but no more than 10 carbon atoms. The aromatic radical 1-imidazolyl (C$_3$H$_2$N$_2$—) represents a $C_3$ aromatic radical. The benzyl radical (C$_7$H$_7$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group (C$_6$H$_{11}$CH$_2$—) is a cycloaliphatic radical which comprises a cyclohexyl ring (the array of atoms which is cyclic but which is not aromatic) and a methylene group (the noncyclic component). The cycloaliphatic radical may include heteroatoms or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroiso-propylidene-2,2-bis (cyclohex-4-yl) (i.e., —C$_6$H$_{10}$C(CF$_3$)$_2$ C$_6$H$_{10}$—), 2-chloromethylcyclohex-1-yl, 3-difluoromethylenecyclohex-1-yl, 4-trichloromethylcyclohex-1-yloxy, 4-bromodichloromethyl-cyclohex-1-ylthio, 2-bromoethylcyclopent-1-yl, 2-bromopropylcyclohex-1-yloxy (e.g., CH$_3$CHBrCH$_2$C$_6$H$_{10}$O—), and the like. Further examples of cycloaliphatic radicals include 4-allyloxycyclohex-1-yl, 4-aminocyclohex-1-yl (i.e., H$_2$NC$_6$H$_{10}$—), 4-aminocarbonylcyclopent-1-yl (i.e., NH$_2$COC$_5$H$_8$—), 4-acetyloxycyclohex-1-yl, 2,2-dicyanoisopropylidenebis(cyclohex-4-yloxy) (i.e., —OC$_6$H$_{10}$C(CN)$_2$C$_6$H$_{10}$O—), 3-methylcyclohex-1-yl, methylenebis(cyclohex-4-yloxy) (i.e., —OC$_6$H$_{10}$CH$_2$C$_6$H$_{10}$O—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —OC$_6$H$_{10}$(CH$_2$)$_6$C$_6$H$_{10}$O—), 4-hydroxymethylcyclohex-1-yl (i.e., 4-HOCH$_2$C$_6$H$_{10}$—), 4-mercapto-methylcyclohex-1-yl (i.e., 4-HSCH$_2$C$_6$H$_{10}$—), 4-methylthiocyclohex-1-yl (i.e., 4-CH$_3$SC$_6$H$_{10}$—), 4-methoxycyclohex-1-yl, 2-methoxycarbonylcyclohex-1-yloxy (2-CH$_3$OCOC$_6$H$_{10}$O—), 4-nitromethylcyclohex-1-yl (i.e., NO$_2$CH$_2$C$_6$H$_{10}$—), 3-trimethylsilylcyclohex-1-yl, 2-t-butyldimethyl-silylcyclopent-1-yl, 4-trimethoxysilylethylcyclohex-1-yl (e.g., (CH$_3$O)$_3$SiCH$_2$CH$_2$C$_6$H$_{10}$—), 4-vinylcyclohexen-1-yl, vinylidenebis (cyclohexyl), and the like. The term "a $C_3$-$C_{10}$ cycloaliphatic radical" includes cycloaliphatic radicals containing at least three but no more than 10 carbon atoms. The cycloaliphatic radical 2-tetrahydrofuranyl (C$_4$H$_7$O—) represents a $C_4$ cycloaliphatic radical. The cyclohexylmethyl radical (C$_6$H$_1$CH$_2$—) represents a $C_7$ cycloaliphatic radical.

As used herein the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloro-methyl, bromoethyl, 2-bromotrimethylene (e.g., —CH$_2$CHBrCH$_2$—), and the like. Further examples of aliphatic radicals include allyl, aminocarbonyl (i.e., —CONH$_2$), carbonyl, 2,2-dicyanoisopropylidene (i.e., —CH$_2$C(CN)$_2$CH$_2$—), methyl (i.e., —CH$_3$), methylene (i.e., —CH$_2$—), ethyl, ethylene, formyl (i.e., —CHO), hexyl, hexamethylene, hydroxymethyl (i.e., —CH$_2$OH), mercaptomethyl (i.e., —CH$_2$SH), methylthio (i.e., —SCH$_3$), methylthiomethyl (i.e., —CH$_2$SCH$_3$), methoxy, methoxy-carbonyl (i.e., CHOCO—), nitromethyl (i.e., —CH$_2$NO$_2$), thiocarbonyl, trimethylsilyl (i.e., ($CH_3$)$_3$Si—), t-butyldimethylsilyl, 3-trimethyoxysilylpropyl (i.e., ($CH_3O$)$_3$SiCH$_2$CH$_2$CH$_2$—), vinyl, vinylidene, and the like. By way of further example, a $C_1$-$C_{10}$ aliphatic radical contains at least one but no more than 10 carbon atoms. A methyl group (i.e., $CH_3$—) is an example of a $C_1$ aliphatic radical. A decyl group (i.e., $CH_3(CH_2)_9$—) is an example of a $C_{10}$ aliphatic radical. As used herein, the term hydrocarbyl ether linkage refers to an oxygen atom linking a hydrocarbyl group to another hydrocarbyl group, an aromatic radical, a cycloaliphatic radical, or an aliphatic radical. As used herein, the term aromatic ether linkage refers to an oxygen atom linking an aromatic radical to another aromatic radical, a cycloaliphatic radical, or an aliphatic radical. As used herein, the term cycloaliphatic ether linkage refers to an oxygen atom linking a cycloaliphatic radical to another cycloaliphatic radical, or an aliphatic radical. As used herein, the term aliphatic ether linkage refers to an oxygen atom linking an aliphatic radical to another aliphatic radical. As used herein, the term aliphatic polyol refers to a polyol comprising at least one aliphatic radical and not comprising a cycloaliphatic radical or an aromatic radical. As used herein, the term cycloaliphatic polyol refers to a polyol comprising at least one cycloaliphatic radical and not comprising an aromatic radical. As used herein, the term aromatic polyol refers to a polyol comprising at least one aromatic radical. As used herein the term SMC refers to Sheet Molded Compounds and associated molding methods. As used herein the term BMC refers to Bulk Molded Compounds and associated molding methods. As used herein the term FRP tooling refers to fiber reinforced plastic tooling. As used herein residue means the remainder of a compound utilized to form a reaction product remaining in the reaction product wherein the residue is covalently bonded into the formed reaction product. As used herein methylene ether means a linking oxygen atom comprised within an alkylene chain. As used herein amino ether means a linking nitrogen atom comprised within an alkylene chain.

The polyol compositions disclosed herein comprise at least one monomeric polyol comprising three or more hydroxyl groups. The at least one monomeric polyol may be present in an amount corresponding to greater than twenty percent, forty percent, sixty percent, or eighty percent by weight based on the total weight of the polyol composition. The at least one monomeric polyol may be present in an amount corresponding to less than ninety-five percent, seventy-five percent, fifty-five percent, or thirty-five percent by weight based on the total weight of the polyol composition.

Suitable monomeric polyols include glycerol, diglycerol, triglycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, dipentaerythritol, bis(trimethylolpropane), tris(hydroxymethyl)isocyanurate, tris(hydroxyethyl)isocyanurate, 1,3,5-benzenetrimethanol, 1,1,1-tris(4'-hydroxyphenyl)methane, 1, 1, 1-tris(4'-hydroxyphenyl)ethane, sugars, such as glucose, sugar derivatives, trifunctional or higher polyfunctional polyether polyols based on trihydric or higher polyhydric alcohols and ethylene oxide, ethylene carbonate, propylene oxide, 1,2-propylene carbonate, 1,3-propylene carbonate, butylene oxide, 1, 2-butylene carbonate, 1, 3-butylene carbonate or mixtures thereof, or polyester polyols. Of these, glycerol, trimethylolethane, trimethylolpropane, 1,2,4-butanetriol, pentaerythritol, dipentaerythritol and also their polyether polyols based on ethylene oxide or propylene oxide may be utilized.

There is disclosed a polyol composition wherein the monomeric polyol comprises three or more secondary hydroxyl groups, for example a monomeric polyol comprising three of more hydroxyl groups may be converted via alkoxylation as is known in the art with a sufficient amount a suitable mono-substituted oxirane such as propylene oxide, 1, 2-butylene oxide, 1, 2-pentylene oxide, or a suitable cyclic carbonate such as 1, 2-propylene carbonate, 1, 2-butylene carbonate, or 1, 2-pentylene carbonate, to a mixture of monomeric polyols in which the principal components are polyether polyols comprising three or more secondary hydroxyl groups. Such monomeric polyols are illustrated by glycerol alkoxylated with three, four, five, six, or more equivalents of propylene oxide and for convenience abbreviated: glycerol 3×PO, glycerol 4×PO, glycerol 5×PO, glycerol 6×PO, etc. respectively; trimethylolpropane alkoxylated with three, four, five, six, or more equivalents of 1, 2-butylene oxide and for convenience abbreviated: TMP 3×BO, TMP 4×BO, TMP 5×BO, TMP 6×BO, etc. respectively; pentaerythritol alkoxylated with four, five, six, seven or more equivalents of propylene oxide and for convenience abbreviated: PE 4×PO, PE 5×PO, PE 6×PO, PE 7×PO, etc. respectively; and dipentaerythritol alkoxylated with five, six, seven, eight or more equivalents of propylene oxide and for convenience abbreviated: DiPE 5×PO, DiPE 6×PO, DiPE 7×PO, DiPE 8×PO, etc. respectively.

Suitable monomeric polyols may also include alkoxylated polyether polyols comprising three or more primary hydroxyl groups, for example an alkoxylated monomeric polyol comprising three of more primary or secondary hydroxyl groups may be converted via alkoxylation as is known in the art with a sufficient amount a suitable oxirane such as ethylene oxide or a cyclic carbonate such as ethylene carbonate to a mixture of monomeric polyols in which the principal components are alkoxylated polyether polyols comprising three or more primary hydroxyl groups.

As will be understood by those skilled in the art, such alkoxylated polyether polyols may be single chemical species comprising three or more hydroxyl groups, but are typically mixtures of related chemical species.

There is disclosed a polyol composition wherein the monomeric polyol is tetrafunctional or greater and comprises four or more hydroxyl groups as is the case of pentaerythritol, dipentaerythritol and diglycerol (See additional illustrative monomeric polyols in Table 1 of this disclosure). The tetrafunctional polyol may comprise four or more secondary hydroxyl groups, for example an alkoxylated pentaerythritol or an alkoxylated dipentaerythritol, an alkoxylated diglycerol or an alkoxylated $C_4$-$C_6$ carbohydrate (See additional illustrative monomeric polyols in Table 1 of this disclosure). Alkoxylated monomeric polyols constitute polyether polyols and include $C_2$-$C_4$ alkoxylated polyols. Those skilled in the art will understand that $C_2$ alkoxylated polyols may be produced by reaction of a base polyol such as pentaerythritol with, for example ethylene oxide or ethylene carbonate. The product $C_2$ alkoxylated polyol will comprise one or more primary hydroxyl groups as a result. $C_3$ and $C_4$ alkoxylated polyols may comprise one or more primary, secondary and, in some instances, tertiary hydroxyl groups depending on the manner in which they are prepared. For example, a base polyol such as trimethylol propane when reacted with 1,3-propylene carbonate (CAS Number 2543-03-4) will produce a $C_3$ alkoxylated polyol comprising one or more primary hydroxyl groups. Whereas, a base polyol reacted with 1,2-propylene carbonate (CAS Number 108-32-7) or propylene oxide (CAS Number 75-56-9) will produce a $C_3$ alkoxylated polyol comprising one or more secondary hydroxyl groups. By way of further example, a base polyol such as dipentaerythritol reacted with 1,4- butylene carbonate (CAS Number 4427-94-5) will produce a $C_4$ alkoxylated polyol comprising one or more primary hydroxyl groups. Whereas, a base polyol reacted with 1,2- or 1,3-butylene carbonate (CAS Numbers 4437-85-8 and 17361-58-9 respectively) or butylene oxide (CAS Number 106-88-7) will produce a $C_4$ alkoxylated polyol comprising one or more secondary hydroxyl groups. By way of yet further example, a base polyol reacted with 2,2-dimethyl oxirane (CAS Number 558-30-5) or 1,2-isobytylene carbonate (CAS Number 4437-69-8) will produce a $C_4$ alkoxylated polyol comprising one or more tertiary hydroxyl groups. The presence of secondary hydroxyl groups as opposed to primary or tertiary hydroxyl groups may beneficially control the nature and chemical properties of the polyol composition. For example, during the preparation of the polyol composition the use of one or more monomeric polyols comprising chiefly, or exclusively, secondary hydroxyl groups may result in higher polyol components of the polyol composition wherein residues of the monomeric polyol may be predominantly linked by carbonate groups. Primary hydroxyl groups within the monomeric polyol may have a greater susceptibility to produce oxygen ether linkages between constituent residues of the higher polyol, be they residues of the monomeric polyol or residues of the polyhydroxylated aromatic compound.

There is disclosed a polyol composition wherein the monomeric polyol may have a molecular weight sufficient to provide the requisite properties of both the polyol composition itself as well as polyurethanes incorporating the polyol composition. The monomeric polyol may have a molecular weight of less than 1000 grams per mole, less than 800 grams per mole, less than 600 grams per mole, or less than 400 grams per mole. The monomeric polyol may have a molecular weight of greater than 200 grams per mole, greater than 450 grams per mole, greater than 700 grams per mole, or greater than 900 grams per mole. The molecular weight may be the actual molecular weight of the monomeric polyol when the monomeric polyol is predominately a single molecular species, or may represent an average molecular weight when the monomeric polyol is a mixture of structurally related polyols such as is the case of Pluracol PEP450 polyols which are a mixture of structurally related monomeric polyols encompassing both alkoxylated homologues and diastereomers thereof. Alternatively, the molecular weight used to describe a monomeric polyol may be a nominal molecular weight of the polyol based upon a specific chemical structure assigned to such monomeric polyol. By way of example, a monomeric polyol which is a polyether polyol may be prepared by alkoxylation of a single, substantially pure base polyol (such as pentaerythritol) with propylene oxide, however, the product polyether polyol may comprise a mixture of structurally related polyols differing in molecular weight from one another by some regular amount (or multiple thereof), for example by 58 grams per mole (the group molecular weight of a propyleneoxy repeat unit). Such a product polyether polyol is defined as a monomeric polyol for purposes of this disclosure.

There is disclosed a polyol composition comprising at least one monomeric polyol and at least one higher polyol comprising one or more residues of such monomeric polyol. The monomeric polyols include polyols having structure I

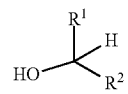

1 wherein $R^1$ and $R^2$ are independently at each occurrence a hydrogen atom, or a hydrocarbyl group such that $R^1$ and $R^2$, either alone or together, comprise at least two hydroxyl groups wherein $R^1$ and/or $R^2$ optionally contain an internal functional group containing a heteroatom. The hydrocarbyl group or groups may be chosen such that monomeric polyol I comprises three or more secondary hydroxyl groups. The hydrocarbyl group or groups may be chosen such that monomeric polyol I comprises four or more hydroxyl groups. The hydrocarbyl group or groups may be chosen such that monomeric polyol I comprises four or more secondary hydroxyl groups. The hydrocarbyl group or groups may be chosen such that monomeric polyol I comprises one or more internal functional groups containing a heteroatom. The hydrocarbyl group or groups may be chosen such that monomeric polyol I comprises one or more internal functional groups which are alkylene ether groups or polyalkylene ether groups. The hydrocarbyl group or groups may be chosen such that monomeric polyol I is an alkoxylated monomeric polyol. The hydrocarbyl group or groups may be chosen such that monomeric polyol I is an alkoxylated monomeric polyol comprising one or more $C_2$-$C_4$ alkylene oxide repeat units.

Additionally, $R^1$ and $R^2$ are independently at each occurrence a hydrogen atom, a $C_1$-$C_{60}$ aliphatic radical, a $C_5$-$C_{30}$ cycloaliphatic radical, a $C_6$-$C_{30}$ aromatic radical, or $R^1$ and $R^2$ may together form a $C_5$-$C_{30}$ cycloaliphatic radical or a $C_6$-$C_{30}$ aromatic radical; with the proviso that $R^1$ and $R^2$, either alone or together, comprise at least two hydroxyl groups, wherein $R^1$ and/or $R^2$ optionally contain an internal functional group containing a heteroatom.

Additionally, $R^1$ and $R^2$ are independently at each occurrence a hydrogen atom, a $C_1$-$C_{40}$ aliphatic radical, a $C_5$-$C_{25}$ cycloaliphatic radical, or a $C_6$-$C_{25}$ aromatic radical, or $R^1$ and $R^2$ may together form a $C_5$-$C_{30}$ cycloaliphatic radical or a $C_6$-$C_{30}$ aromatic radical; with the proviso that $R^1$ and $R^2$, either alone or together, comprise at least two hydroxyl groups, wherein $R^1$ and/or $R^2$ optionally contain an internal functional group containing a heteroatom.

Further, $R^1$ and $R^2$ are independently at each occurrence a hydrogen atom, a $C_1$-$C_{25}$ aliphatic radical; with the proviso that $R^1$ and $R^2$, either alone or together, comprise at least two hydroxyl groups, wherein $R^1$ and/or $R^2$ optionally contain an internal functional group containing a heteroatom which is an oxygen atom, a sulfur atom or a nitrogen atom. Specific examples of monomeric polyols I are given in Table 1.

TABLE 1
Illustrative Monomeric Polyols 1
| Entry | Structure | $R^1$ | $R^2$ |
|---|---|---|---|
| Ia | 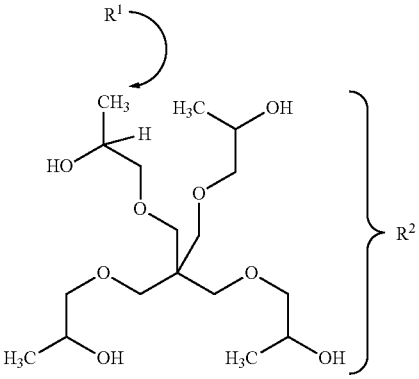 | $CH_3$ | See Structure |
| Ib | 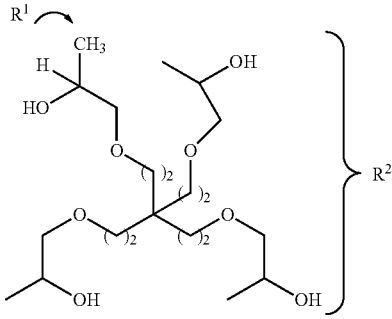 | $CH_3$ | See Structure |
| Ic | 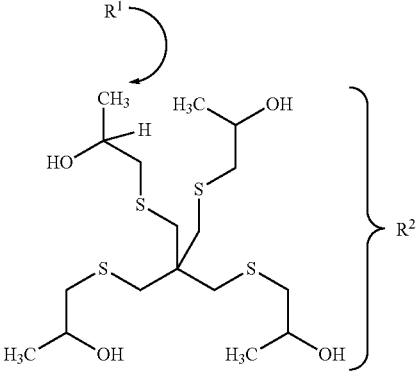 | $CH_3$ | See Structure |
| Id | 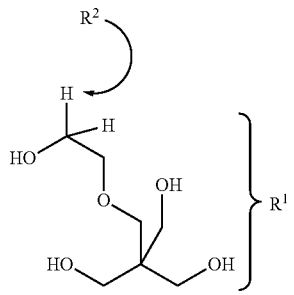 | See structure | H |

TABLE 1-continued
Illustrative Monomeric Polyols 1
| Entry | Structure | R¹ | R² |
|---|---|---|---|
| Ie | 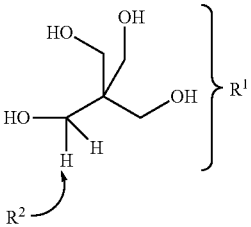 | See Structure | H |
| If | 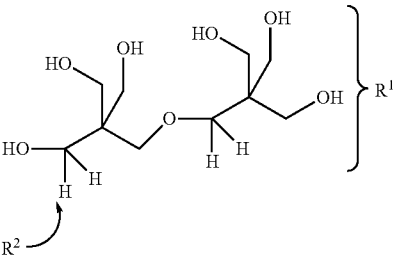 | See Structure | H |
| Ig | 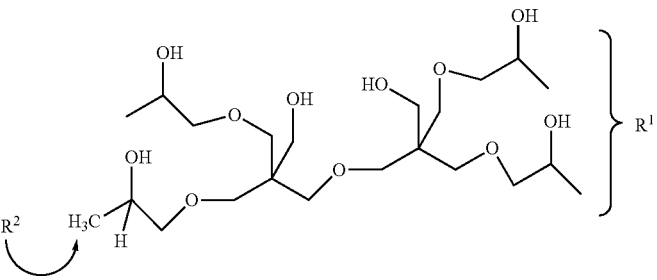 | See Structure | CH₃ |
| Ih | 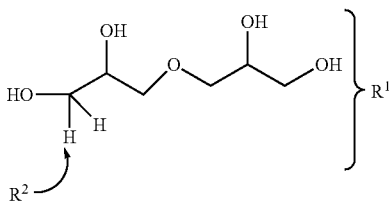 | See Structure | H |
| Ii | 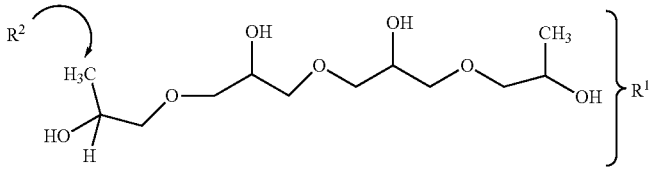 | See Structure | CH₃ |
| Ij | 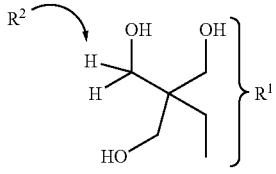 | See Structure | H |
| Ik | 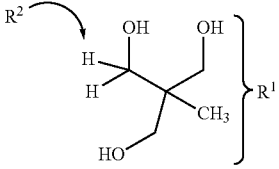 | See Structure | H |

TABLE 1-continued
Illustrative Monomeric Polyols 1
| Entry | Structure | R¹ | R² |
|---|---|---|---|
| Il | 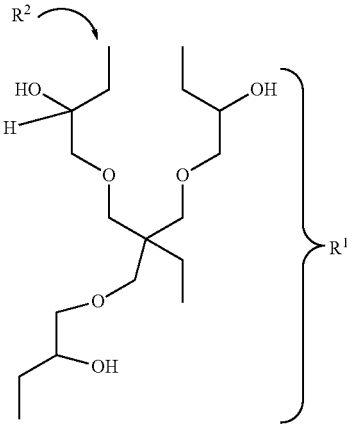 | See Structure | Et |
| Im | 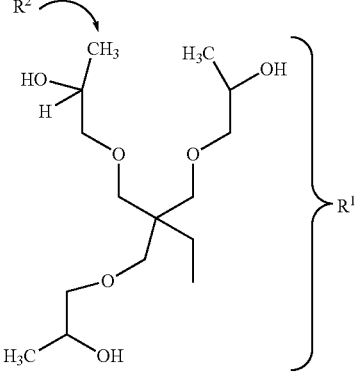 | See Structure | CH₃ |
| In | 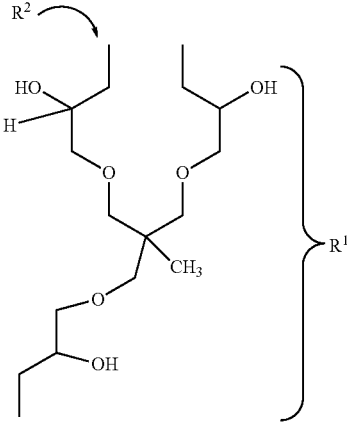 | See Structure | Et |

TABLE 1-continued
Illustrative Monomeric Polyols 1
| Entry | Structure | R¹ | R² |
|---|---|---|---|
| Io | 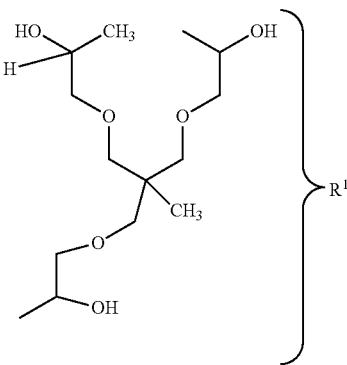 | Et | See Structure |
| Ip | 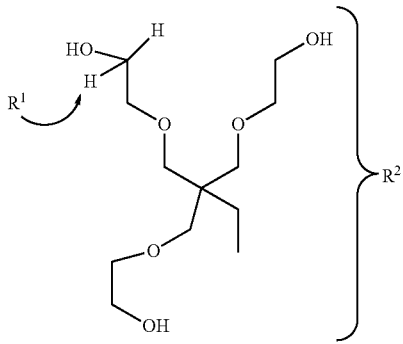 | CH₃ | See Structure |
| Iq | 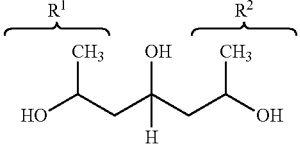 |  |  |
| Ir | 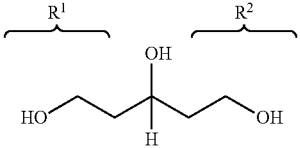 |  |  |
| Is | 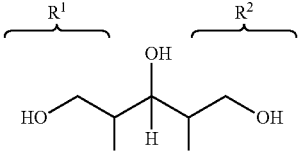 | 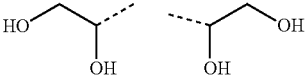 | 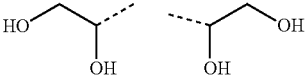 |
| It | 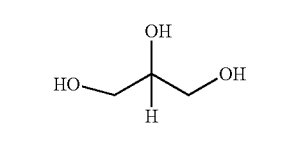 | 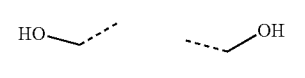 | 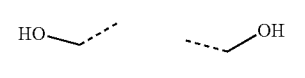 |

TABLE 1-continued

Illustrative Monomeric Polyols 1

| Entry | Structure | R¹ | R² |
|---|---|---|---|
| Iu | (see structure) | CH₃ | See Structure |
| It | (see structure) | H | See Structure |

Illustrative polyols are represented by aliphatic polyols, entries Ia-It. For convenience and simplicity, the fixed structures for monomeric polyols illustrated in Table I and throughout this disclosure may include structurally related homologues where the monomeric polyol represents an alkoxylated structure as in, for example, monomeric polyols which are polyether polyols Ia-Id, Ig, Il-Ip, Iu and It. Base polyols to which one or more of the illustrated polyether polyols may relate are; Ie pentaerythritol, If dipentaerythritol, Ih diglycerol, Ij trimethylolpropane, Ik trimethylolethane, Iq 2,4,6-trihydroxyheptane, Ir 3,5-dihydroxy-1-pentanol, Is 2,3,4,5-tetrahydroxy-1-pentanol and It glycerol. Monomeric polyols comprising hydroxy groups present in the base polyol; Id, Ig and Ii may represent polyether polyols resulting from partial alkoxylation of the base polyol.

The higher polyol component of the polyol composition comprises three or more hydroxyl groups and residues of either or both of the at least one monomeric polyol and the polyhydroxylated aromatic compound linked by one or more carbonate groups, one or more oxygen ether groups, or a combination of one or more carbonate groups and one or more oxygen ether groups. The major higher polyol components of the polyol composition comprise two or more residues of the monomeric polyol linked by one or more carbonate groups. Higher polyol components comprising one or more resides of the aromatic polyhydroxy compound and one or more residues of the monomeric polyol are present in the polyol composition but in lesser amounts than the higher polyols comprising two or more residues of the monomeric polyol. In such higher polyols, residues of the polyhydroxy aromatic compound may be linked to residues of the monomeric polyol by one or more carbonate groups, one or more oxygen ether groups, or a combination of one or more carbonate groups and one or more oxygen ether groups. Such higher polyol components of the polyol composition may have a molecular weight of less than 2000 grams per mole, less than 1500 grams per mole, less than 1000 grams per mole, or less than 750 grams per mole. Such higher polyol components of the polyol composition may have a molecular weight of greater than 500 grams per mole, greater than 750 grams per mole, greater than 1000 grams per mole, or greater than 1500 grams per mole.

The higher polyol components of the polyol composition may be represented by (a) structure II

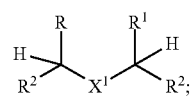

II (b) Structure III

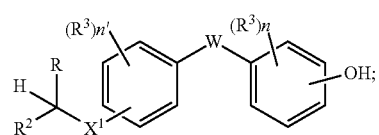

III or (c) Structure IV

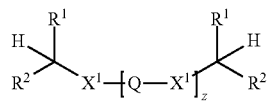

IV wherein $R^1$ and $R^2$ are as disclosed herein; $R^3$ is independently at each occurrence a non-carbon substituent or a hydrocarbyl group; W is a bond or a linking group; the variables n and n' are independently an integer from 0 to 4; $X^1$ is independently at each occurrence a carbonate group or an oxygen ether group; and Q is independently at each occurrence a residue of a monomeric polyol within a higher polyol structure comprising at least two additional residues of the same or different monomeric polyols.

Additionally, $X^1$ is independently at each occurrence a carbonate group or an oxygen ether group; and Q is independently at each occurrence a residue of a monomeric polyol within a higher polyol comprising at least two additional residues of the same or different monomeric polyol.

Additionally, $X^1$ is independently at each occurrence a carbonate group or an oxygen ether group; and Q is independently at each occurrence a residue of a monomeric polyol within a higher polyol comprising at least two additional residues of the same or different monomeric polyols.

Further, $X^1$ is independently at each occurrence a carbonate group or an oxygen ether group; and Q is independently at each occurrence a residue of a monomeric polyol within a higher polyol comprising at least two additional residues of the same or different monomeric polyols.

Specific examples of higher polyols having structure II are given in Table 2.

TABLE 2

| Entry | Structure | $X^1$ |
|---|---|---|
| IIa | | OCOO |
| IIb | | OCOO |
| IIc | | O |

Illustrative Higher Polyols II

TABLE 2-continued

Illustrative Higher Polyols II

| Entry | Structure | X[1] |
|---|---|---|
| IId | | OCOO |
| IIe | | O |
| IIf | | OCOO |
| IIg | | O |
| IIh | | OCOO |

TABLE 2-continued

Illustrative Higher Polyols II

| Entry | Structure | X¹ |
|---|---|---|
| IIi | | OCOO |
| IIj | | OCOO |
| IIk | | O |
| IIl | | OCOO |

TABLE 2-continued

Illustrative Higher Polyols II

| Entry | Structure | $X^1$ |
|---|---|---|
| IIm | | OCOO |
| IIn | | OCOO |

Illustrative higher polyols IIa-IIn represent aliphatic higher polyols in which two monomeric polyol residues are linked by a carbonate group ($X^1$=OCOO) or an oxygen ether group ($X^1$=O). Oxygen ether groups linking monomeric polyol groups are thought to arise via loss of carbon dioxide from a higher polyol in which two or more monomeric polyol residues are linked by one or more carbonate groups.

For convenience and simplicity, the fixed structures for higher polyols II illustrated in Table 2 and throughout this disclosure may include structurally related homologues comprising residues of a monomeric polyol which is itself comprised of structurally related homologs.

Specific examples of higher polyols having structure III are given in Table 3.

TABLE 3

Illustrative Higher Polyols III

| Entry | Structure | $X^1$ |
|---|---|---|
| IIIa | | OCOO |

TABLE 3-continued
Illustrative Higher Polyols III
| Entry | Structure | X¹ |
|---|---|---|
| IIIb | 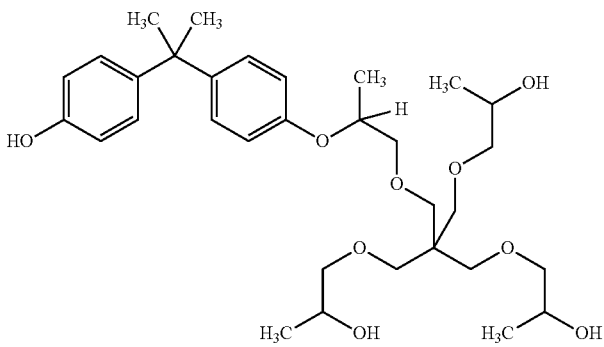 [SMILES: CC(O)COCC(COCC(C)O)(COCC(C)O)COCC(C)Oc1ccc(C(C)(C)c2ccc(O)cc2)cc1] | O |
| IIIc | 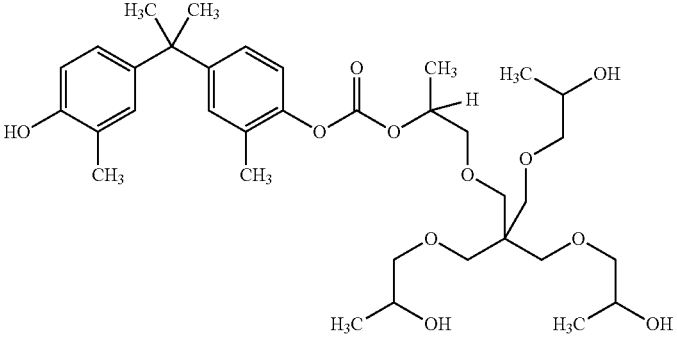 [SMILES: Cc1cc(C(C)(C)c2ccc(OC(=O)OC(C)COCC(COCC(C)O)(COCC(C)O)COCC(C)O)c(C)c2)ccc1O] | OCOO |
| IIId | 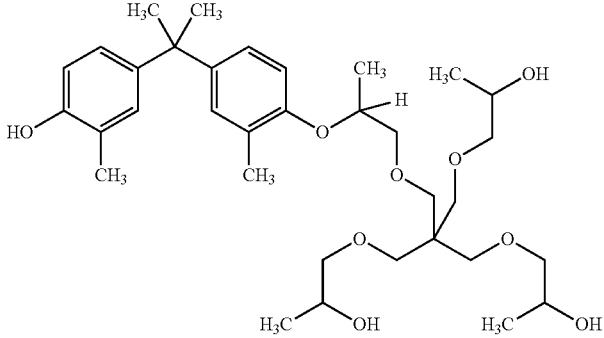 [SMILES: Cc1cc(C(C)(C)c2ccc(OC(C)COCC(COCC(C)O)(COCC(C)O)COCC(C)O)c(C)c2)ccc1O] | O |
| IIIe | 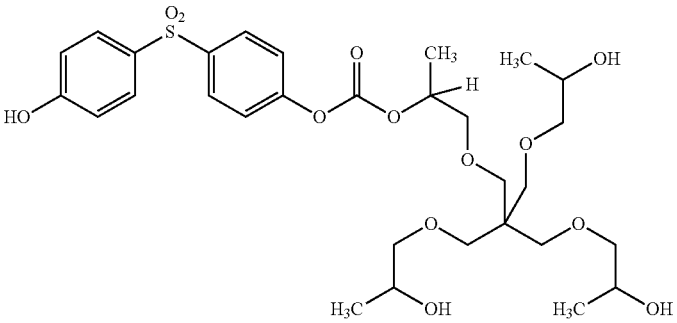 [SMILES: CC(O)COCC(COCC(C)O)(COCC(C)O)COCC(C)OC(=O)Oc1ccc(S(=O)(=O)c2ccc(O)cc2)cc1] | OCOO |

TABLE 3-continued
Illustrative Higher Polyols III
| Entry | Structure | X¹ |
|---|---|---|
| IIIf | 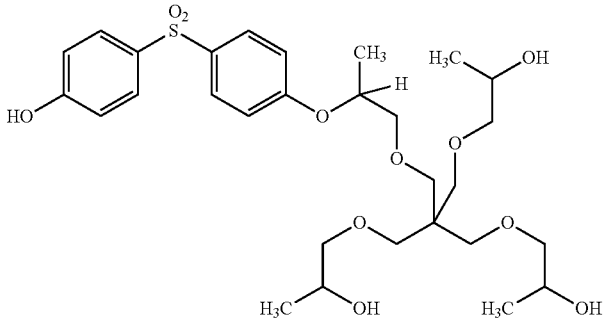 [SMILES: CC(O)COCC(COCC(C)O)(COCC(C)O)COCC(C)Oc1ccc(S(=O)(=O)c2ccc(O)cc2)cc1] | O |
| IIIg | 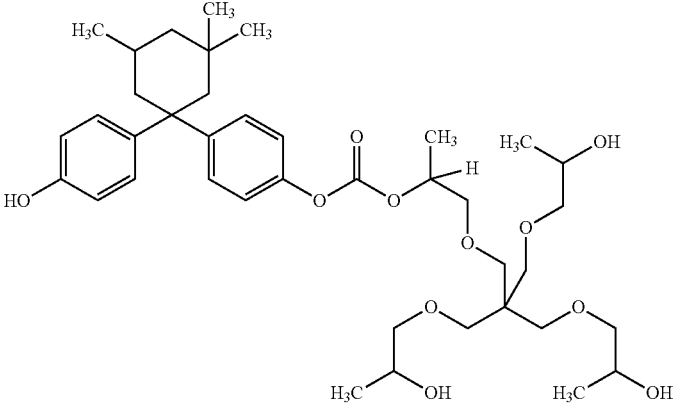 [SMILES: CC(O)COCC(COCC(C)O)(COCC(C)O)COCC(C)OC(=O)Oc1ccc(C2(c3ccc(O)cc3)CC(C)CC(C)(C)C2)cc1] | OCOO |
| IIIh | 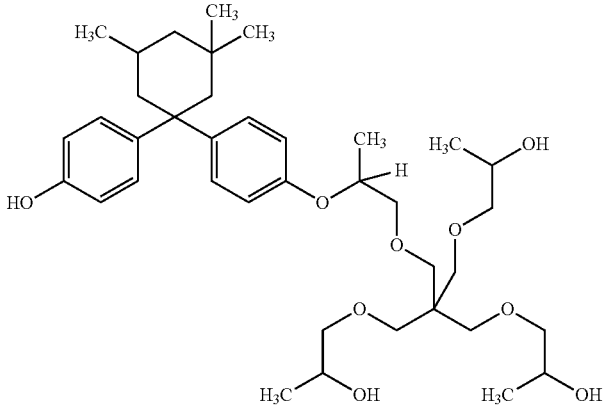 [SMILES: CC(O)COCC(COCC(C)O)(COCC(C)O)COCC(C)Oc1ccc(C2(c3ccc(O)cc3)CC(C)CC(C)(C)C2)cc1] | O |
| IIIi | 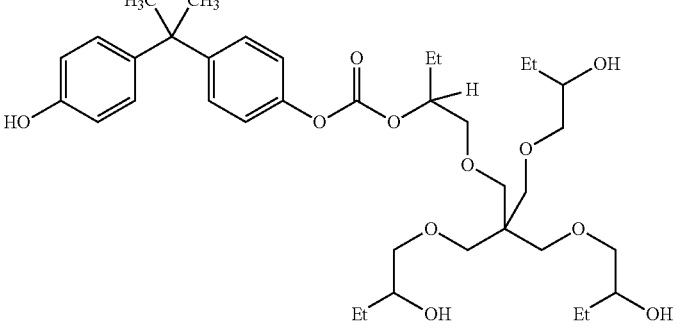 | OCOO |

TABLE 3-continued

Illustrative Higher Polyols III

| Entry | Structure | $X^1$ |
|---|---|---|
| IIIj | | O |
| IIIk | | OCOO |
| IIIl | | O |
| IIIm | | OCOO |

TABLE 3-continued
| | Illustrative Higher Polyols III | |
|---|---|---|
| Entry | Structure | X¹ |
| IIIn | 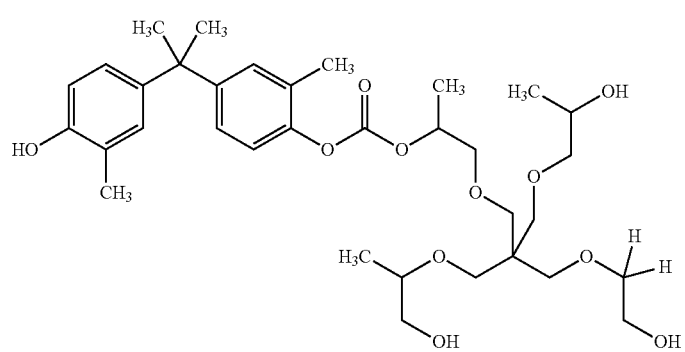 [SMILES: Cc1cc(C(C)(C)c2ccc(OC(=O)OC(C)COCC(COCCO)(COCC(C)O)COC(C)CO)c(C)c2)ccc1O] | OCOO |
| IIIo | 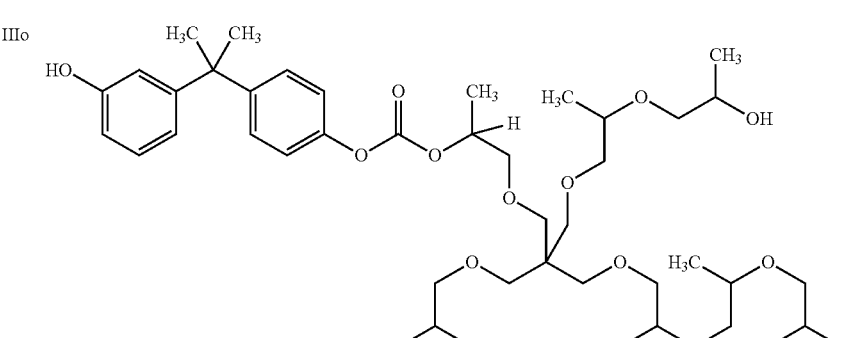 | OCOO |
| IIIp | 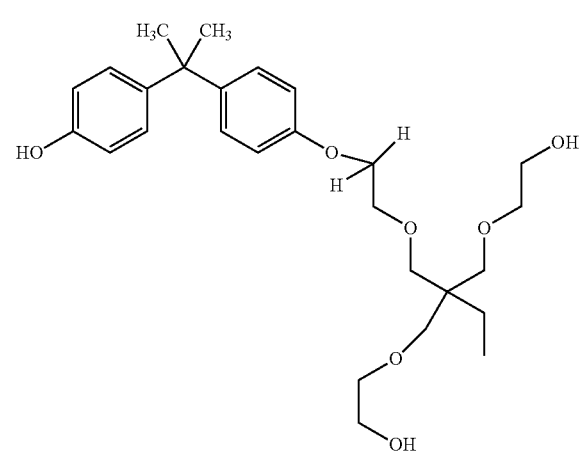 [SMILES: CCC(COCCO)(COCCO)COCCOc1ccc(C(C)(C)c2ccc(O)cc2)cc1] | O |

TABLE 3-continued

Illustrative Higher Polyols III

| Entry | Structure | $X^1$ |
|---|---|---|
| IIIq | 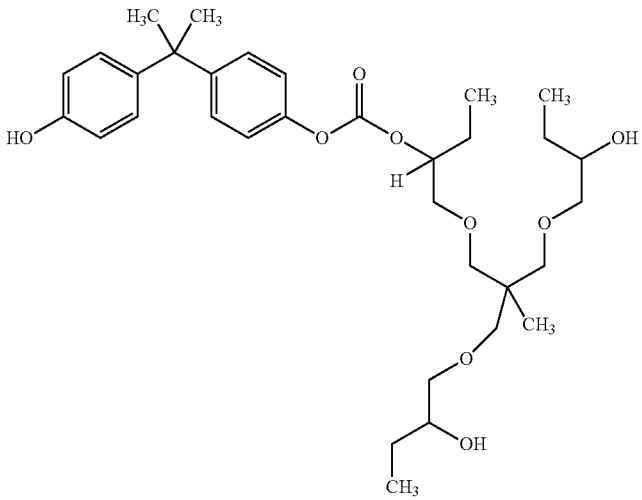 [SMILES: CCC(O)COCC(C)(COCC(O)CC)COCC(CC)OC(=O)Oc1ccc(C(C)(C)c2ccc(O)cc2)cc1] | OCOO |
| IIIr | 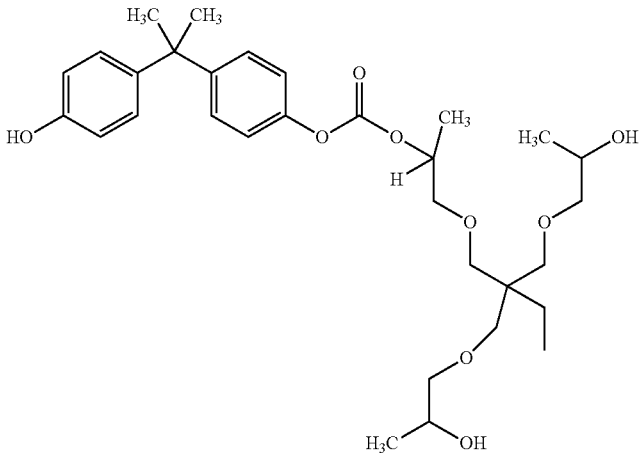 [SMILES: CCC(COCC(C)O)(COCC(C)O)COCC(C)OC(=O)Oc1ccc(C(C)(C)c2ccc(O)cc2)cc1] | OCOO |

Illustrative higher polyols IIIa-IIIr represent aromatic higher polyols in which a monomeric polyol residue and a residue of a polyhydroxylated aromatic compound are linked by a carbonate group ($X^1$=OCOO) or an oxygen ether group ($X^1$=O). Oxygen ether groups linking a monomeric polyol residue to a residue of a polyhydroxylated aromatic compound are thought to arise via loss of carbon dioxide from a higher polyol in which the monomeric polyol residue and the residue of a polyhydroxylated aromatic compound are linked by one or more carbonate groups. For example, higher polyol IIIb is thought to arise by loss of carbon dioxide from precursor higher polyol IIIa. It should be noted that appropriately controlling conditions under which the polyol composition is formed can minimize the formation of oxygen ether-linked higher polyols such as IIIb, IIId, IIIf, IIIh, IIIj, IIIl and IIIp. The carbonate-linked higher polyols such as IIIa, IIIc, IIIe, IIIg, IIIi, IIIk, IIIm, IIIn, IIIo, IIIq and IIIr are susceptible to further reaction with monomeric polyol with displacement of the residue of the polyhydroxylated aromatic compound to form a higher polyol containing the residues of two monomeric polyols linked together by a carbonate linkage. For example, reaction of higher polyol IIIa with monomeric polyol Ia may afford rise higher polyol IIa and free polyhydroxylated aromatic compound, in this instance bisphenol A.

For convenience and simplicity, the fixed structures for higher polyols III illustrated in Table 3 and throughout this disclosure may include structurally related homologues comprising residues of a monomeric polyol which is itself comprised of structurally related homologs.

Specific examples of higher polyols having structure IV are given in Table 4.

TABLE 4

Illustrative Higher Polyols IV

| Entry | Structure | $X^1$ |
|---|---|---|
| IVa | | OCOO |
| IVb | | OCOO; O |
| IVc | | O |
| IVd | | OCOO |
| IVe | | OCOO |

TABLE 4-continued

Illustrative Higher Polyols IV

| Entry | Structure | $X^1$ |
|---|---|---|
| IVf |  | O |
| IVg |  | OCOO |
| IVh |  | OCOO; O |
| IVi |  | OCOO |

TABLE 4-continued

Illustrative Higher Polyols IV

| Entry | Structure | $X^1$ |
|---|---|---|
| IVj | | OCOO |
| IVk | | OCOO |
| IVl | | OCOO; O |
| IVm | | OCOO |

TABLE 4-continued

Illustrative Higher Polyols IV

| Entry | Structure | $X^1$ |
|---|---|---|
| IVn | | OCOO |
| IVo | | OCOO |
| IVp | | OCOO |
| IVq | | OCOO |

TABLE 4-continued

Illustrative Higher Polyols IV

| Entry | Structure | X¹ |
|---|---|---|
| IVr | 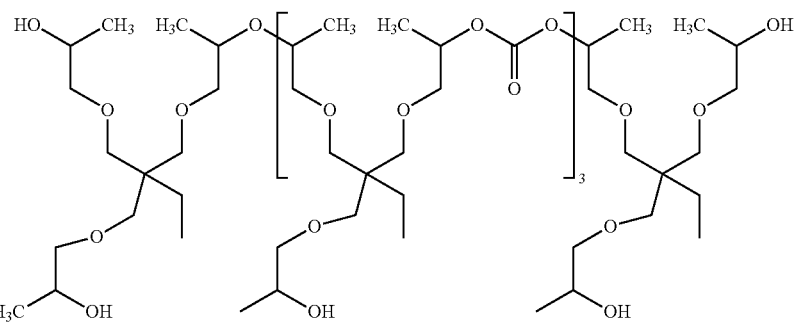 | OCOO; O |

Illustrative higher polyols IVa-IVo represent aliphatic higher polyols IV comprising three monomeric polyol residues (z=1) and in which X¹ is a carbonate group or an oxygen ether group. Illustrative higher polyols IVp-IVr represent aliphatic higher polyols IV comprising more than three monomeric polyol residues (z=2 or more) and in which X¹ is a carbonate group or an oxygen ether group. Higher polyols IV are thought to arise via reaction of an initially formed higher polyol with a source of a carbonate group and a source of one or more additional monomeric polyol residues. For example, during the formation of the polyol composition an initially formed higher polyol such as IIa could react with an initially formed higher aromatic polyol such as IIIa which could serve both as the source of a carbonate group and a source of an additional monomeric polyol residue. Alternatively, a higher polyol such as IIa could react with a source of carbonate groups, such as an aromatic polycarbonate, in the presence of a monomeric polyol such as Ia.

For convenience and simplicity, the fixed structures for higher polyols IV illustrated in Table 4 and throughout this disclosure may include structurally related homologues comprising residues of a monomeric polyol which is itself comprised of structurally related homologs.

There is disclosed a polyol composition comprising at least one monomeric polyol comprising three or more hydroxyl groups; at least one higher polyol comprising three or more hydroxyl groups; and at least one polyhydroxylated aromatic compound. The polyhydroxylated aromatic compound is present as within the polyol composition as a free (meaning unbound) compound, for example monomeric bisphenol A. Residues of the polyhydroxylated aromatic compound represent bound polyhydroxylated compound and are present as residues in at least a portion of the higher polyol components. The polyhydroxylated aromatic compound in its free form may be present in the polyol composition in any amount that affords useful product properties. The polyol compositions show a special utility in the preparation of high strength, heat resistant polyurethanes when the amount of polyhydroxylated aromatic compound in its free form is less than 32 percent by weight, 28 percent by weight, or 24 percent by weight based on the total weight of the polyol composition The polyol compositions show a special utility in the preparation of high strength, heat resistant polyurethanes when the amount of polyhydroxylated aromatic compound in its free form is greater than 10 percent by weight, 16 percent by weight, or 20 percent by weight based on the total weight of the polyol composition. The amount polyhydroxylated aromatic compound in bound form is may be less than 10 percent, 5 percent, or 3 percent of the of the weight of the polyhydroxylated aromatic compound present in the polyol composition in free form. The amount polyhydroxylated aromatic compound in bound form may be greater than 1 percent, 4 percent, or 6 percent of the of the weight of the polyhydroxylated aromatic compound present in the polyol composition in free form.

Polyhydroxylated aromatic compounds and residues to which they relate include compounds which correspond to the formula Ar—(OH), wherein Ar comprises an aromatic radical as disclosed herein and f is an integer of about 2 to about 6, or 2 to 4. The polyhydroxylated aromatic compounds may be diphenols. Exemplary diphenols include hydroquinone, resorcinol, dihydroxybiphenyls, bis(hydroxyphenyl)-$C_1$-$C_5$ alkanes, bis-(hydroxy-phenyl)-$C_5$-$C_6$ cycloalkanes, bis(hydroxyphenyl)ethers, bis(hydroxyphenyl)sulfoxides, bis(hydroxy phenyl) ketones, bis(hydroxyphenyl)sulfones and 4,4"-bis(hydroxyphenyl)diisopropyl benzenes, as well as derivatives thereof which have brominated and/or chlorinated nuclei. Exemplary diphenols may be 4,4'-dihydroxybiphenyl, bisphenol A, 2,4-bis(4-hydroxyphenyl)-2-methylbutane, 1,1-bis(4-hydroxyphenyl)-cyclohexane, 1,1-bis(4-hydroxyphenyl)-3,3,5-trimethyl-cyclohexane, 4,4-dihydroxydiphenyl sulfide and 4,4-dihydroxydiphenyl sulfone, as well as di- and tetrabrominated or chlorinated derivatives thereof, such as 2,2-bis(3-chloro-4-hydroxyphenyl) propane, 2,2-bis-(3,5-dichloro-4-hydroxyphenyl)propane or 2,2-bis(3,5-dibromo-4-hydroxy-phenyl)propane. The diphenols can be used individually or as arbitrary mixtures.

The polyhydroxylated aromatic compounds may be bisphenols and include bisphenols having structure V

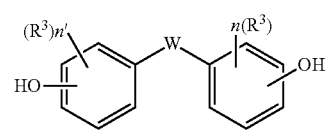

V wherein R³ W n and n' are as disclosed herein.

R³ may be independently at each occurrence a halogen atom, a nitro group, a $C_1$-$C_{10}$ aliphatic radical, a $C_5$-$C_{10}$ cycloaliphatic radical, or a $C_6$-$C_{20}$ aromatic radical; W may be a bond or a linking oxygen atom, a sulfur atom, a sulfur oxide linking group, a $C_1$-$C_{10}$ aliphatic radical, a $C_5$-$C_{10}$ cycloaliphatic radical, or a $C_6$-$C_{zo}$ aromatic radical; and the variables n and n' are independently an integer from 0 to 4.

$R^3$ may be independently at each occurrence a halogen atom, a nitro group, a $C_1$-$C_5$ aliphatic radical, a $C_5$-$C_{10}$ cycloaliphatic radical, or a $C_6$-$C_{10}$ aromatic radical; W may be a bond or a linking oxygen atom, a sulfur atom, a sulfur oxide linking group, a $C_1$-$C_5$ aliphatic radical, a $C_5$-$C_{10}$ cycloaliphatic radical, or a $C_6$-$C_{15}$ aromatic radical; and the variables n and n' are independently an integer from 0 to 4.

$R^3$ may be independently at each occurrence a halogen atom, a $C_1$-$C_2$ aliphatic radical, a $C_5$-$C_8$ cycloaliphatic radical, or a $C_6$-$C_{10}$ aromatic radical; W may be a bond or a linking oxygen atom, a sulfur atom, a sulfur oxide linking group, a $C_1$-$C_3$ aliphatic radical, a $C_5$-$C_9$ cycloaliphatic radical, or a $C_6$-$C_{13}$ aromatic radical; and the variables n and n' are independently an integer from 0 to 2.

Specific examples of polyhydroxylated aromatic compounds which are bisphenols having structure V are given in Table 5.

TABLE 5

Illustrative Bisphenols V

| Entry | Structure | $R^3$ | $R^3$ | n' | n |
|---|---|---|---|---|---|
| Va | 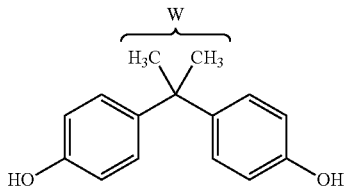 | — | — | 0 | 0 |
| Vb | 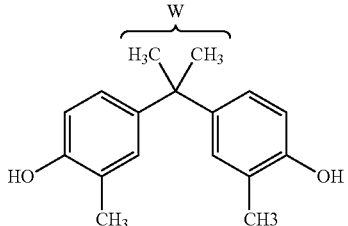 | $CH_3$ | $CH_3$ | 1 | 1 |
| Vc | 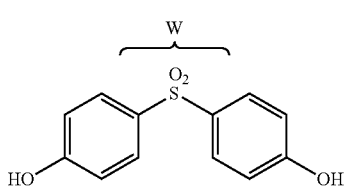 | — | — | 0 | 0 |
| Vd | 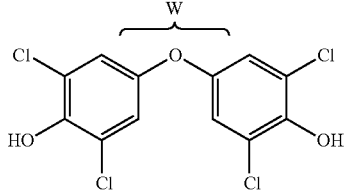 | Cl | Cl | 2 | 2 |
| Ve | 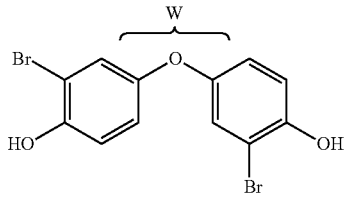 | Br | Br | 1 | 1 |
| Vf | 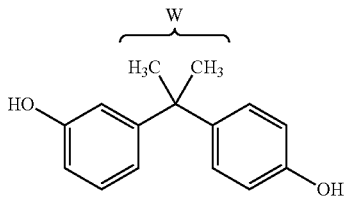 | — | — | 0 | 0 |

TABLE 5-continued
Illustrative Bisphenols V
| Entry | Structure | R³ | R³ | n' | n |
|---|---|---|---|---|---|
| Vg | 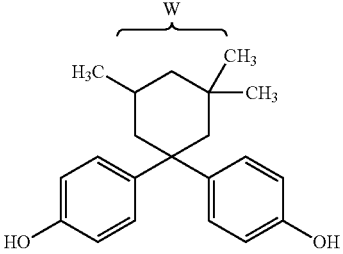 | — | — | 0 | 0 |
| Vh | 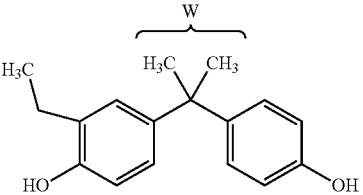 | Et | — | 1 | 0 |
| Vi | 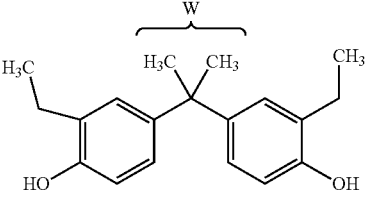 | Et | Et | 1 | 1 |
| Vj | 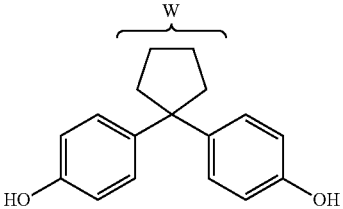 | — | — | 0 | 0 |
| Vk | 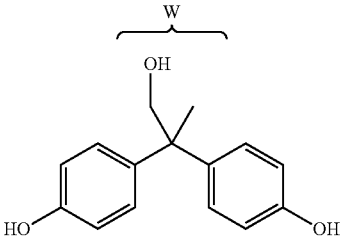 | — | — | 0 | 0 |
| Vl | 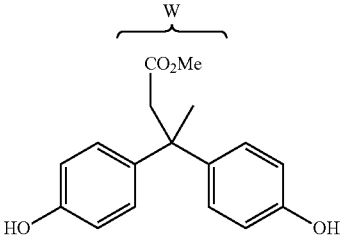 | — | — | 0 | 0 |

TABLE 5-continued

Illustrative Bisphenols V

| Entry | Structure | R³ | R³ | n' | n |
|---|---|---|---|---|---|
| Vm | (bisphenol with W = C(CF₃)₂ bridging two 4-hydroxyphenyl groups) | — | — | 0 | 0 |
| Vn | (bisphenol with W = N(CH₃) bridging two 4-hydroxyphenyl groups) | — | — | 0 | 0 |
| Vo | (tris(4-hydroxyphenyl) methane with CH₃ on central carbon; W bridges) | — | — | 0 | 0 |
| Vp | (9,9-bis(4-hydroxyphenyl)fluorene; W = fluorenylidene) | — | — | 0 | 0 |
| Vq | (central 4-methyl-2,6-bis(3-methyl-4-hydroxy-5-methylbenzyl)phenol structure; W bracketed) | CH₃ | CH₃ | 2 | 2 |
| Vr | (central 4-methoxy-2,6-bis(3-methyl-4-hydroxy-5-methylbenzyl)phenol structure; W bracketed) | CH₃ | CH₃ | 2 | 2 |

TABLE 5-continued

Illustrative Bisphenols V

| Entry | Structure | $R^3$ | $R^3$ | n' | n |
|---|---|---|---|---|---|
| Vs | 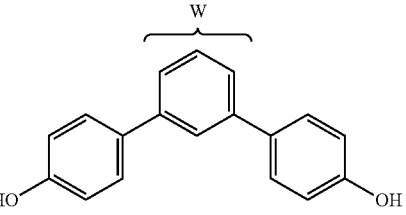 | — | — | 0 | 0 |
| Vt | 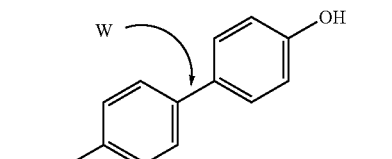 | — | — | 0 | 0 |
| Vu | 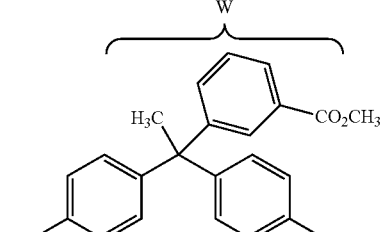 | — | — | 0 | 0 |
| Vv | 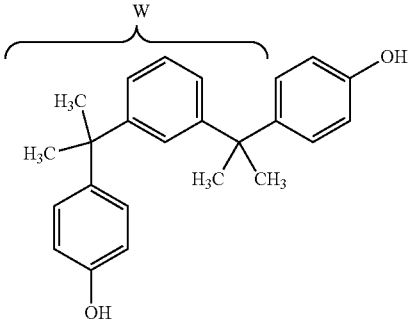 | — | — | 0 | 0 |

Disclosed are polyol compositions which are typically free flowing, low color, homogeneous liquids at 150° F. and which are relatively viscous liquids at room temperature. The polyol compositions may have viscosities of less than 5000 cps, 2000 cps, 1000 cps or 200 cps at 150° F. The polyol compositions may have viscosities of greater than 100 cps, 400 cps, or 1000 cps at 150° F. While the chemical structures of the components of the polyol composition and their concentration may be the primary determinant of the utility of the polyol compositions in the preparation of high strength, heat resistant polyurethanes, the relatively low viscosity of the polyol compositions makes it possible to manufacture such polyurethanes using conventional manufacturing equipment, such as conventional meter mixing systems. Such conventional meter mixing systems are ill suited for use with highly viscous polyols which may require specialized pumping and higher temperature handling capabilities than are currently available. The lower viscosity of the polyol compositions allows more complete mixing of A and B side components of a reactive polyurethane formulation and delivery to a mold at lower temperature. This in turn may moderate the in-mold exotherm arising as the polyurethane formulation cures inside the mold. Lower in-mold peak exotherm temperatures in turn make the use of FRP tooling more efficient by extending the useful life of such tooling. Similarly, cycle times may be reduced as a result of lower in-mold peak exotherm temperatures.

Chromatographic and mass spectral analysis (See Experimental Part) of the product polyol indicates a mixture of the starting monomeric polyol, higher polyols and free polyhydroxy aromatic compound. Both the complexity of suitable commercially available monomeric polyols such as PEP-450 polyols (structure Ia, Table 1) and the nature of the exchange reactions taking place during the preparation of the polyol composition make direct chemical analysis of the product polyol composition exceedingly difficult. The polyol composition as disclosed herein may contain, based on the entire weight of the composition, about 25 percent by weight or greater of monomeric polyol, about 20 percent by weight or greater of a first higher polyol comprising two residues of the monomeric polyol linked by a single carbonate group, about 10 percent by weight of a second higher polyol comprising three residues of the monomeric polyol linked by two carbonate groups, and about 5 percent by weight of a third higher polyol comprising four residues of the monomeric polyol linked by three carbonate groups. The polyol composition as disclosed herein may contain, based on the entire weight of the composition, about 35 percent by weight or less monomeric polyol, about 30 percent by weight or less of a first higher polyol comprising two residues of the monomeric polyol linked by a single carbonate group, about 20 percent by weight or less of a second higher polyol comprising three residues of the monomeric polyol linked by two carbonate groups, and about 10 percent by weight or less of a third higher polyol comprising four residues of the monomeric polyol linked by three carbonate groups.

The polyol compositions may be prepared by reacting a monomeric polyol or a suitable polyol derivative with a polyhydroxylated aromatic compound, such as a bisphenol, or a polyhydroxylated aromatic compound derivative, such as a bisphenol derivative, under conditions promoting the formation of the higher polyol components of polyol composition. The reaction may advantageously be carried out in the presence of a catalyst or non-catalyst promoter. Illustrative catalysts and promoters include organic bases, inorganic bases, metal oxides, and organometallics. Catalysts are distinguished from promoters in that promoters are consumed during the formation of the polyol composition whereas catalysts are not consumed. Illustrative organic bases include salts of carboxylic acids such as sodium acetate and tri-octyl ammonium isovalerate; salts of sulfonic acids such as sodium dodecyl sulfonate, amine bases, such as trialkyl amines exemplified by tri-butyl amine, N,N'-tetra-isopropyl ethylene diamine, polyhydroxylated amines such as tris(hydroxypropyl)amine and amine-containing monomeric polyols such as Vf-Vm of Table 5 of US patent U.S. Ser. No. 10/053,533 which is incorporated herein by reference in its entirety; amidine bases such as N,N'-tri-isopropyl phenyl amidine and N,N'-tri-methyl butyl amidine, and guanidine bases such as Barton-Elliott bases illustrated by N,N',N"-penta-isopropyl guanidine. Illustrative inorganic bases include metal carbonates such as sodium carbonate, potassium carbonate, magnesium carbonate and barium carbonate; metal hydroxides such as lithium hydroxide, sodium hydroxide, potassium hydroxide and barium hydroxide; illustrative metal oxides include aluminum oxide, silica, calcium oxide, magnesium oxide, tin oxide, and zinc oxide; and illustrative organometallics include tri-isopropyl aluminate, tetraalkyl zirconates, and organometallic transesterification catalysts such as tetra-isopropyl titanate and tetra-octyl titanate.

The formation of the polyol composition may occur by formation of carbonate linkages between one or more monomeric polyols to generate higher polyol components of the polyol composition. The carbonate linkages may be supplied by any suitable carbonate containing species, but aromatic carbonate containing species are particularly well adapted to this purpose. The aromatic carbonate containing species may be a simple aromatic carbonate such as diphenyl carbonate or may be an oligomeric or polymeric species containing aromatic carbonate groups, such an aromatic polycarbonate or a polyester polycarbonate species containing aromatic carbonate linkages. Aromatic carbonate linkages are defined herein as carbonate linkages which are linked via at least one oxygen atom directly to an aromatic ringBoth bisphenol A monomethyl carbonate (CAS No. 122890-41-9) and bisphenol A dimethyl carbonate (CAS No. 4824-74-2) are aromatic carbonates and contain aromatic carbonate linkages as that term is defined herein. Aromatic carbonate species containing fully aromatic carbonate groups are exemplified by diaryl carbonates such as diphenyl carbonate, bisphenol A monocarbonate (CAS No. 34074-60-7) and oligomeric and polymeric aromatic carbonates such as bisphenol A polycarbonate. Such aromatic carbonate species may at times herein be referred to as activating agents.

The aromatic polycarbonate employed may be either an oligomeric material or may be a high molecular weight material. In one or more aspects, an aromatic polycarbonate containing significant amounts of both high and low molecular weight polycarbonate may be employed in the same reaction mixture in which the polyol composition is formed. The polycarbonate may have a number average molecular weight of about 1000 grams/mole or greater, about 10,000 grams/mole or greater or about 20,000 grams/mole or greater. The polycarbonate may have a number average molecular weight of about 100,000 or less, about 80,000 grams per mole or less, or about 60,000 grams per mole or less.

The polycarbonate may be a copolycarbonate comprising two or more different polyhydroxylated aromatic structural types. The polycarbonate may be a homopolymer comprising polyhydroxylated aromatic residues of a single structural type, for example bisphenol A residues. The polycarbonate may comprise endcap groups provided by common chain terminators such as cumyl phenol end groups or phenol end groups. The polycarbonate may comprise aromatic hydroxyl end groups only. The polycarbonate may be branched or linear and may be commercial grade polycarbonate or be scrap polycarbonate recovered from a polycarbonate molding operation.

The polycarbonate may be in any suitable form such as polycarbonate-containing powders, polycarbonate-containing pellets, polycarbonate-containing flakes, polycarbonate-containing chips, polycarbonate-containing shards, polycarbonate-containing lumps, polycarbonate-containing solid cakes, polycarbonate-containing intact articles, polycarbonate-containing shredded articles, or a combination of any of the forgoing. The polycarbonate may be used in a molten form, as for example when a molten strand of polycarbonate is brought into initial contact with a suitable monomeric polyol and a catalyst at temperature sufficient to dissolve or prevent solidification of the strand. The polycarbonate may be comprised entirely of virgin polycarbonate, or may comprise from 1 to 100 percent post-consumer polycarbonate-containing material.

Polycarbonates suitable for use in accordance with one or more aspects of this disclosure may be represented by generic structure VI

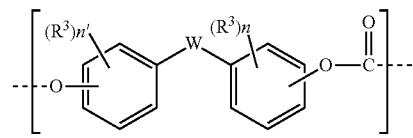

VI wherein $R^3$; W n and n' are as disclosed herein.

Specific examples of suitable aromatic polycarbonates are given in Table 6.

TABLE 6

| Entry | Structure | R³ | R³ | n' | n |
|---|---|---|---|---|---|
| VIa | (bisphenol A carbonate repeat unit with isopropylidene linker W) | — | — | 0 | 0 |
| VIb | (tetramethyl bisphenol A carbonate repeat unit with isopropylidene linker W and CH₃ substituents) | CH₃ | CH₃ | 1 | 1 |
| VIc | (bisphenol S carbonate repeat unit with SO₂ linker W) | — | — | 0 | 0 |
| VId | (tetrachloro bisphenol ether carbonate repeat unit with O linker W and Cl substituents) | Cl | Cl | 2 | 2 |
| VIe | (dibromo bisphenol ether carbonate repeat unit with O linker W and Br substituents) | Br | Br | 1 | 1 |
| VIf | (bisphenol A carbonate repeat unit, meta/para, isopropylidene linker W) | — | — | 0 | 0 |

TABLE 6-continued
Illustrative Bisphenol Polycarbonates VI
| Entry | Structure | R³ | R³ | n' | n |
|---|---|---|---|---|---|
| VIg | 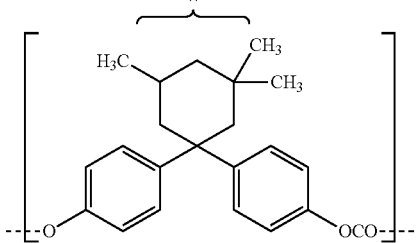 | — | — | 0 | 0 |
| VIh | 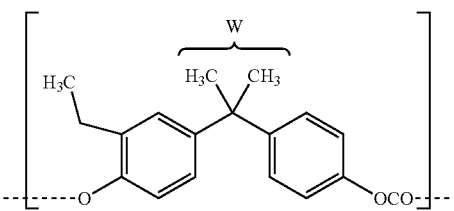 | Et | — | 1 | 0 |
| VIi | 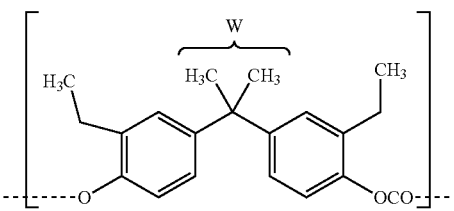 | Et | Et | 1 | 1 |
| VIj | 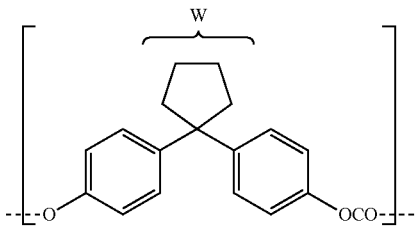 | — | — | 0 | 0 |
| VIk | 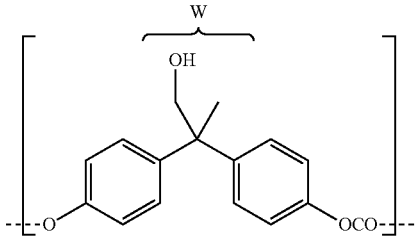 | — | — | 0 | 0 |
| VIl | 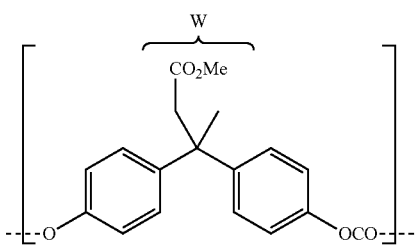 | — | — | 0 | 0 |

TABLE 6-continued
| Entry | Structure | R³ | R³ | n' | n |
|---|---|---|---|---|---|
| VIm | 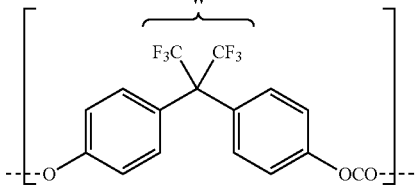 | — | — | 0 | 0 |
| VIn | 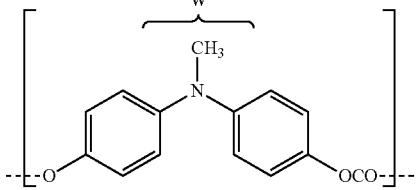 | — | — | 0 | 0 |
| VIo | 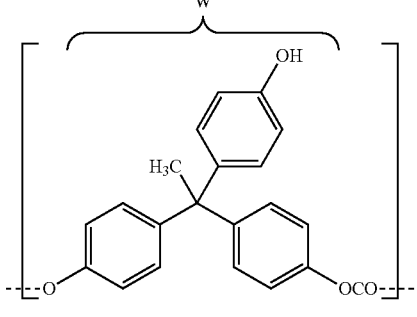 | — | — | 0 | 0 |
| VIp | 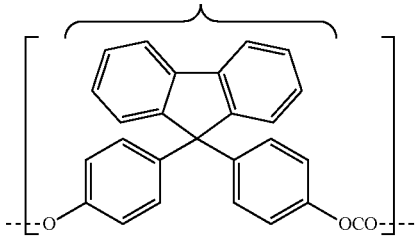 | — | — | 0 | 0 |
| VIq | 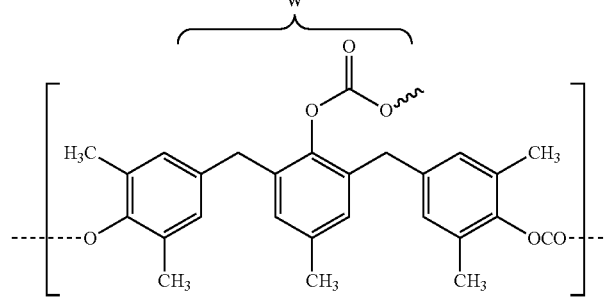 | CH₃ | CH₃ | 2 | 2 |

TABLE 6-continued

Illustrative Bisphenol Polycarbonates VI

| Entry | Structure | R³ | R³ | n' | n |
|---|---|---|---|---|---|
| VIr | 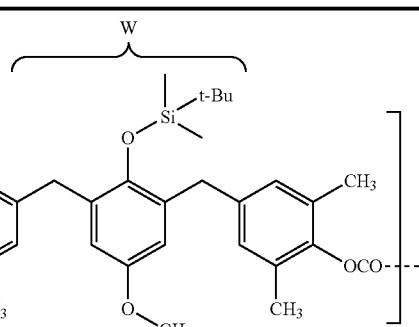 | CH₃ | CH₃ | 2 | 2 |
| VIs | 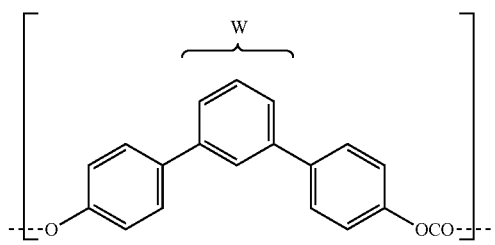 | — | — | 0 | 0 |
| VIt | 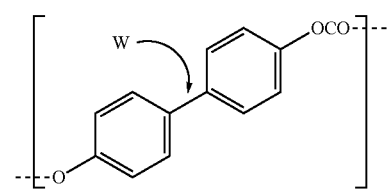 | — | — | 0 | 0 |
| VIu | 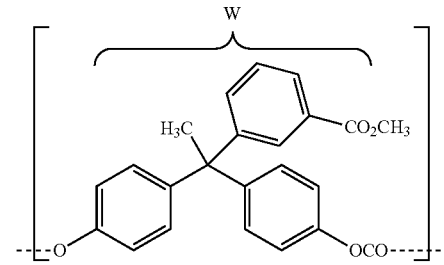 | — | — | 0 | 0 |

Copolycarbonates for use according to one or more aspects of the disclosure may be illustrated by polycarbonate materials comprising two or more of the structural units shown in illustrative Entries VIa-VIu, for example a copolycarbonate comprising both structural units VIa (bisphenol A polycarbonate) and VIf (m,p-bisphenol A polycarbonate) within the same polymeric material.

Where the carbonate source used in the preparation of the polyol composition is a polycarbonate, chain terminators present in the polycarbonate may be present in the polyol composition in both free and bound forms. Because such chain terminators are typically present at levels less than about two percent by weight in the polycarbonate composition itself, levels of chain terminators in any form in such polyol compositions will be less than 1 percent, less than 0.5 percent, or less than 0.25 percent by weight based on the total weight of the polyol composition. Exemplary chain terminators used in aromatic polycarbonates include phenolic compounds, exemplary phenolic compounds include phenol, p-chlorophenol, p-tert-butylphenol, 4-(1,3-dimethyl-butyl)-phenol and 2,4,6-tribromophenol; long chain alkylphenols, such as monoalkylphenols or dialkylphenols which contain a total of 8 to 20 C atoms in their alkyl substituents, specific examples include 3,5-di-tert-butyl-phenol, p-iso-octylphenol, p-tert-octylphenol, p-dodecylphenol, 2-(3,5-dimethylheptyl)-phenol and 4-(3,5-dimethylheptyl)-phenol. Exemplary branching agents tri- or multi-functional phenols for example phloroglucinol, 4,6-dimethyl-2,4,6-tris(4-hydroxyphenyl)-2-heptene, 4,4-dimethyl-2,4,6-tris(4-hydroxyphenyl) heptane, 1,3,5-tris(4-hydroxyphenyl)benzene, 1,1,1-tris(4-hydroxyphenyl)ethane, tris(4-hydroxyphenyl)-phenyl-methane, 2,2-bis[4,4-bis(4-hydroxyphenyl)cyclohexyl]-propane, 2,4-bis [1-(4-hydroxyphenyl)-1-methylethyl]phenol, tetrakis(4-hydroxyphenyl)-methane, 2,6-bis(2-hydroxy-5-methyl-benzyl)-4-methyl-phenol, 2-(4-hydroxyphenyl)-2-(2,4-dihydroxyphenyl) propane, or tetrakis(4-[1-(4-hydroxyphenyl)-1-methylethyl]-phenoxy)-methane.

Other species which may be used as carbonate sources include monomeric dialkyl carbonates such as dimethyl carbonate and diethyl carbonate, and phosgene equivalents such as carbonyl diimidazole and hexachloroacetone. When one or more of such other activating agents is employed instead of an oligomeric or polymeric polycarbonate, the monomeric polyol(s) and the bisphenol(s) may be reacted under conditions similar to those described in the Experimental Part of this disclosure, but may advantageously also include an additional step in which either or both of the monomeric polyol and the bisphenol is first reacted with the activating agent? to form aliphatic carbonate groups, fully aromatic carbonate groups, mixed aliphatic and aromatic carbonate groups and/or a mixture two or more of the foregoing carbonate groups. The initial reaction with the activating chemical may be carried out at a lower or higher temperature than a subsequent conversion to the polyol composition, for instance of about 15° C. or greater, about 25° C. or greater, about 50° C. or greater, or about 75° C. or greater and about 250° C. or less, about 200° C. or less, about 175° C. or less, or about 150° C. or less. Monomeric polyols include polyols disclosed herein.

There is disclosed a method of making a polyol composition wherein the activating agent is a component of a polyhydroxylated aromatic moiety or a bisphenol moiety, is a component of a polyol moiety, is a component of both a polyhydroxylated aromatic moiety, a bisphenol, moiety and a polyol moiety, or is present as an independent reactant.

There is disclosed a method of making a polyol composition comprising contacting one or more polyhydroxylated aromatic moieties, or bisphenol moieties with one or more monomeric polyol moieties in the presence of at least one activating agent and an effective amount of at least one of a catalyst, a promoter or a mixture thereof. The product polyol composition may be used in a variety of applications, such as polyurethane preparation, without a purification step.

There is disclosed a method of making a polyol composition in which one or more polyhydroxylated aromatic, diphenol, or bisphenol polycarbonates serves both as the source of the free and bound polyhydroxylated aromatic compound present in the product polyol, and as the source of aromatic carbonate groups (the activating agent) needed to form the higher polyol components of the polyol composition. By way of example, a polyhydroxylated aromatic polycarbonate may be heated in the presence of a catalyst together with a monomeric polyol comprising at least three hydroxyl groups at a temperature sufficient to cause the formation of mixed carbonate linkages between polyhydroxylated aromatic polycarbonate moieties of lower molecular weight than the polycarbonate used as the initial starting material. The mixed carbonate linkages may undergo further exchange with a hydroxyl group of the monomeric polyol to form a first higher polyol comprising two residues of the monomeric polyol linked by a single carbonate group. The first higher polyol may itself undergo further exchange with a mixed carbonate to afford additional higher polyol components. A mixed carbonate linkage may lose carbon dioxide and form aromatic ether linkages between a polycarbonate moiety and the residue of the monomeric or higher polyol participating in the mixed carbonate linkage but this may be minimized by careful control of the reaction conditions. As the reaction between the polycarbonate, the monomeric polyol and higher polyols continues the concentration carbonate linkages not including a participating polyhydroxylated aromatic moiety increases as molecular weight of the remaining polycarbonate moieties decreases. When a sufficient quantity of the polyol is used, essentially all of the carbonate linkages in the polycarbonate may be converted into mixed carbonates, or carbonates between one or more monomeric polyol residues. The product polyol composition may comprise a statistical mixture of products resulting from chain scission of the polycarbonate starting material and includes a substantial amount of free polyhydroxylated aromatic compound as well as unconsumed monomeric polyol.

Disclosed is a method of making a polyol composition as just described, but substituting a promotor for the catalyst. One or more monomeric polyhydroxylated amines comprising one or more tertiary amines may serve as the promoter. Monomeric polyhydroxylated amines comprising one or more tertiary amines are illustrated by monomeric polyols Vf-Vm and Vu disclosed in Table 5 of United States patent U.S. Ser. No. 10/053,533 which is incorporated herein by reference. While the tertiary amine groups may survive the formation of the polyol composition, the monomeric polyhydroxylated amine may be incorporated via its hydroxy groups into the higher polyols of polyol composition and consumed as a result. It is noteworthy that higher polyols comprising residues of polyhydroxylated amines comprising tertiary amine groups may serve as amine catalysts during subsequent use of the polyol composition, for example the conversion of the polyol composition into a high strength, heat resistant polyurethane composition.

The process for making the polyol compositions may be performed at a temperature at which the higher polyol components are formed. The process for making the polyol composition may be performed at a temperature of about 80° C. or greater, about 120° C. or greater or about 160° C. or greater. The process for making the polyol composition may be performed at a temperature of about 220° C. or less, about 180° C. or less or about 160° ° C. or less. The process for making the polyol composition may be performed for a sufficient time to form the higher polyol components of the polyol composition. Such reaction times may about 10 minutes or greater, about 45 minutes or greater or about 90 minutes or greater. Such reaction times may about 180 minutes or less, about 130 minutes or less or about 90 minutes or less.

The relative amounts of monomeric polyol and activating agent serving a source of carbonate groups of the higher polyols of the polyol composition are chosen such that physical and chemical properties of the polyol composition may be tuned as needed. The viscosity of the polyol composition may be controlled by varying the molar ratio of hydroxyl groups present in the starting monomeric polyol to carbonate groups, or equivalents thereof, in the activating agent. Where an aromatic polycarbonate serves as the source of carbonate groups in the polyol composition, the molar amount of activating agent is taken as the number of moles of aromatic carbonate groups present in the given weight of the aromatic polycarbonate. Where the activating agent is bisphenol A polycarbonate, the number of moles of carbonate groups is taken as the total weight of the polycarbonate divided by the group molecular weight of the repeat unit, 254 grams per mole. The molar ratio of hydroxyl groups present in the starting monomeric polyol to carbonate groups, or equivalents thereof, in the activating agent may be greater than 5, greater than 6, or greater than 8. The molar ratio of hydroxyl groups present in the starting monomeric polyol to carbonate groups, or equivalents thereof, in the activating agent may be less than 14, less than 11, or less than 10. The molar ratio of the monomeric polyol to activating agent may be about 1.2:1 or greater, about 1.5:1 or greater or about 2:1 or greater. The molar ratio of the monomeric polyol to activating agent may be about may be about 4:1 or less, about 3:1 or less, or about 2:1 or less. Where a catalyst is present, any catalyst that is effective in causing the formation of the higher polyols may be used. The catalyst may be present in an amount based on the weight of the reaction mixture of about 0.0001 percent by weight or greater, about 0.01 percent by weight or greater, about 0.2 percent by weight or greater or about 1 percent by weight or greater. The catalyst may be present in an amount based on the weight of the reaction mixture of about 10 percent by weight or less, about 5 percent by weight or less, or about 2 percent by weight or less. Where a promoter is present, any promoter that is effective in causing the formation of the higher polyols may be used. The promoter may act to solubilize and/or compatibilize reactants used to create the polyol composition and enhance reaction rates of chemical transformations that result in the formation of the higher polyols. The promoter may be present in an amount based on the weight of the reaction mixture of about 0.01 percent by weight or greater, about 1.0 percent by weight or greater, or about 10 percent by weight or greater. The promoter may be present in an amount based on the weight of the reaction mixture of about 25 percent by weight or less, about 15 percent by weight or less, or about 9 percent by weight or less. The process may be performed wherein the reaction mixture comprises one or more polyhydroxylated amines, for example diisopropanol amine (DIPA) which contains a reactive secondary amine as well as two reactive secondary hydroxyl groups. The promoter may be a polyhydroxylated amine having one or more tertiary amine groups. The tertiary amine can function as a catalyst and/or promoter. Where the process is performed wherein the monomeric polyol is at least one polyhydroxylated amine having a tertiary amine group, the polyhydroxylated amine having a tertiary amine group may be present in an amount of about 1 percent by weight or greater, about 5 percent by weight or greater or about 9 percent by weight or greater based on the total weight of the reactants used to form the polyol composition. Where the process is performed wherein the monomeric polyol is at least one polyhydroxylated amine having a tertiary amine group, the polyhydroxylated amine having a tertiary amine group may be present in an amount of about 30 percent by weight or less, about 20 percent by weight or less or about 9 percent by weight or less based on the total weight of the reactants used to form the polyol composition.

The polyol composition may be prepared using at least two or more monomeric polyols, a first monomeric polyol containing no amine groups, and a second monomeric polyol containing a tertiary amine wherein the polyol containing a tertiary amine can function as the catalyst or a promoter. For this process the ratio of first monomeric polyol to the second monomeric polyol containing a tertiary amine can be any ratio that results in formation of the desired polyol composition. The molar ratio of the first monomeric polyol to the second monomeric polyol containing a tertiary amine may be about 2:1 or greater, about 4:1 or greater or about 10:1 or greater. The molar ratio of the first monomeric polyol to the second monomeric polyol containing a tertiary amine may be about 25:1 or less, about 15:1 or less or about 10:1 or less.

There are disclosed polyol compositions useful in the preparation of novel polyurethane materials having excellent physical properties. The polyurethane materials and articles containing them may be prepared using the techniques disclosed herein as well as art-recognized polyurethane polymer preparation and processing techniques such as those disclosed in E. N. Doyle's The Development and Use of Polyurethane Products (McGraw-Hill, Inc. 1971), Saunders' et al. Polyurethanes Chemistry and Technology, Parts I-II (Interscience Publishers), Saunders' Organic Polymer Chemistry (Chapman and Hall), J. M. Burst's Developments in Polyurethanes (Applied Science Publishers) and the Kirk Othmer Encyclopedia of Chemical Technology which are incorporated herein by reference in their entirety for all purposes.

When reacted with one or more polyisocyanates or polyisocyanate equivalents the polyol compositions are converted into polyurethanes with superior strength, hardness and moldability when compared to analogous polyurethanes not incorporating such polyol compositions. Polyurethane-forming formulations comprising one or more of the polyol compositions disclosed herein exhibit less intense reaction exotherms during curing than do analogous polyurethane-forming formulations lacking such polyol compositions. Polyurethanes prepared from the polyol compositions disclosed herein exhibit excellent shrinkage resistance.

The polyol compositions disclosed herein can be employed as in an easy to use A plus B polyurethane-forming formulation; component A comprising one or more polyisocyanates or polyisocyanate equivalents and component B comprising the polyol composition. Component B may be a mixture of one or more of the polyol compositions disclosed herein, and may contain one or more art recognized components such as polyurethane catalysts, mold release agents, additional polyols. Component A may contain one or more polyisocyanates of any type, such as one or more polyisocyanate prepolymers and/or one or more monomeric polyisocyanates such as MDI and/or one or more oligomerized polyisocyanates such as HDI trimer (CAS No. 3779-63-3), or component A may comprise one or more polyisocyanate prepolymers and be essentially free of monomeric and oligomeric polyisocyanates. Such A plus B polymer systems provide a useful alternative to unsaturated polyester systems used in SMC, BMC and RTM molding, and epoxy systems used in casting and RTM. Because the polyol compositions typically have a relatively low viscosity under normal processing temperatures, they may be combined with one or more polyisocyanates and injected at low pressure and moderate temperatures eliminating the need for expensive hydraulic presses and steel tooling such as are used in thermoplastic injection molding, BMC and SMC. Low cost aluminum tooling or even gel-coat FRP tooling may be used advantageously due to the low injection pressure needed to fill the mold and the relatively low exotherm observed when the polyol compositions are reacted with polyisocyanates to form polyurethanes. Significant advantages may attend the use of low cost tooling and processing equipment. Ease of processing during molding for example, will enhance the attractiveness of polyurethanes comprising structural units derived from the disclosed polyol compositions relative to harder to process thermoplastics.

Polyurethane-forming formulations comprising the polyol compositions disclosed herein may be processed into molded polyurethane containing parts using one or more known processing techniques including Reaction Injection Molding (RIM), Compression Molding, Resin Transfer Molding, Poured Open Molding and Sprayed Open Molding.

The polyol compositions disclosed herein may be incorporated into polyurethane elastomer precursor formulations which provide for rapid set up times to produce polyurethanes having Young's moduli below 50,000 psi while having excellent mold release characteristics.

There is disclosed a polyol composition which may be reacted with a polyisocyanate or residue thereof having structure VII $$R^4\text{—}(NCO)_m \qquad \text{VII}$$

wherein $R^4$ is a hydrocarbyl group and m is an integer, to form useful polyurethane materials.

The isocyanate functional components VII can be in the form of isocyanate functional prepolymers, blocked polyisocyanates, monomers or oligomers having on average greater than 1 isocyanate group, and preferably 2 or more isocyanate groups. The isocyanate functional prepolymers can by any prepolymers prepared by reaction of an isocyanate functional compound with one or more compounds having on average more than one isocyanate reactive functional groups, such as hydroxyl, amine, thiol, carboxyl and the like, under conditions such that the prepolymers prepared have on average more than one isocyanate moiety (group) per molecule. The isocyanate functional monomers may be any art recognized monomeric polyisocyanates, for example monomeric methylene diphenyl diisocyanate (MDI), monomeric hexamethylene diisocyanate, isophorone diisocyanate, or mixtures thereof. The isocyanate functional blocked polyisocyanates may be any art recognized blocked polyisocyanates The isocyanate functional oligomers may be any art recognized oligomeric polyisocyanates, for example oligomeric methylene diphenyl diisocyanate (oligomeric MDI). Oligomeric aromatic polyisocyanates useful in the preparation of polyurethanes as disclosed herein include those available from The Dow Chemical Company under the trademarks PAPI and VORANATE, such as VORANTE M220, PAPI 27 and PAPI 20 polymeric isocyanates. The isocyanate functional components are present in the curable composition in a sufficient amount to form a cured component when exposed to curing conditions. Exemplary polyisocyanates useful in the invention and in preparing isocyanate functional prepolymers include any aliphatic, cycloaliphatic, araliphatic, heterocyclic or aromatic polyisocyanates, or mixtures thereof. The polyisocyanates used may have an average isocyanate functionality of about 2.0 or greater and an equivalent weight of about 80 or greater. The isocyanate functionality of the polyisocyanates may be about 2.0 or greater, about 2.2 or greater, or about 2.4 or greater; and may be about 4.0 or less, about 3.5 or less, or about 3.0 or less. Higher functionality may be used, but may cause excessive cross-linking and result in a composition which is too viscous to handle and apply easily, and can cause the cured composition to be too brittle. The equivalent weight of the polyisocyanates may be about 80 or greater, about 110 or greater, or about 120 or greater; and may be about 300 or less, about 250 or less, or about 200 or less. Exemplary aliphatic polyisocyanates include those disclosed by Wu, U.S. Pat. No. 6,512,033 at column 3, line 3 to line 49, incorporated herein by reference. Exemplary isocyanates include, isophorone diisocyanate (cycloaliphatic), tetramethylxylene diisocyanate (aromatic), 1,6-hexa-methylene diisocyanate (aliphatic) and oligomeric or polymeric derivatives thereof, bis(4-isocyanato-cylohexyl)methane, and trimethyl hexamethylene diisocyanate. The aliphatic isocyanates may be hexamethylene diisocyanate and oligomeric and polymeric derivatives thereof. Examples of cycloaliphatic isocyanates include trimers of hexamethylene diisocyanate, such as those available from Bayer under the trademark and designation DESMODUR N3300, DESMODUR N3400, DESMODUR N-100. Exemplary aromatic polyisocyanates may include those disclosed by Wu, U.S. Pat. No. 6,512,033 at column 3, line 3 to line 49, incorporated herein by reference. Aromatic isocyanates may include diphenylmethane diisocyanate, toluene diisocyanate and oligomeric and polymeric derivatives thereof.

There is disclosed a polyol composition which may be reacted with a polyisocyanate or residue thereof having structure VII wherein $R^4$ is a $C_2$-$C_{30}$ aliphatic radical, a $C_5$-$C_{20}$ cycloaliphatic radical, or a $C_6$-$C_{30}$ aromatic radical and m is an integer from 2 to 6, to provide a polyurethane material. $R^4$ may be a $C_2$-$C_{25}$ aliphatic radical, a $C_5$-$C_{15}$ cycloaliphatic radical, or a $C_6$-$C_{25}$ aromatic radical and m is an integer 2 or greater and 4 or less, or 3 or less. $R^4$ may be a $C_2$-$C_{17}$ aliphatic radical, a $C_5$-$C_{13}$ cycloaliphatic radical, or a $C_6$-$C_{22}$ aromatic radical and m is an integer 2 or greater and 3 or less.

Specific examples of polyisocyanates having structure VII and suitable for incorporation into polyurethanes are given in Table 7 and include aliphatic polyisocyanates VIIa-VIIe, cycloaliphatic polyisocyanates VIIf-VIIk, and aromatic polyisocyanates VIIl-VIIp.

TABLE 7

Illustrative Polyisocyanates VII

| Entry | Structure | $R^4$ | m |
|---|---|---|---|
| VIIa | 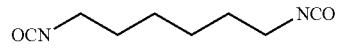 | $(CH_2)_6$ | 2 |
| VIIb | 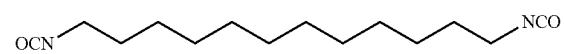 | $(CH_2)_{10}$ | 2 |
| VIIc | 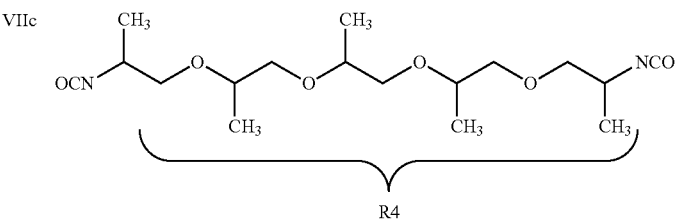 | See Structure | 2 |

TABLE 7-continued
Illustrative Polyisocyanates VII
| Entry | Structure | R⁴ | m |
|---|---|---|---|
| VIId | 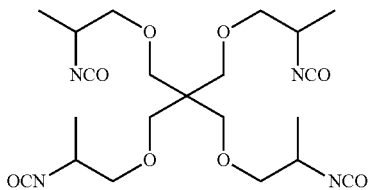 | See Structure | 4 |
| VIIe | 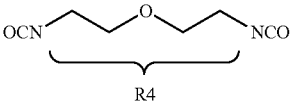 | See Structure | 2 |
| VIIf | 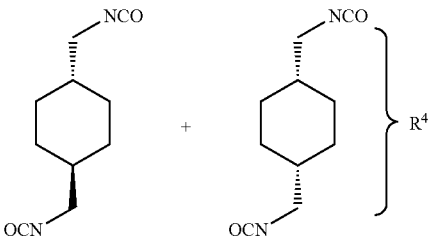 | See Structure | 2 |
| VIIg | 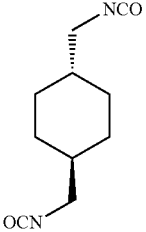 (trans only) | See Structure | 2 |
| VIIh | 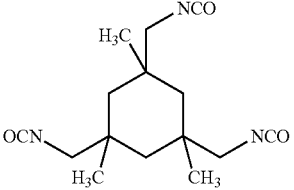 | See Structure | 3 |
| VIIi | 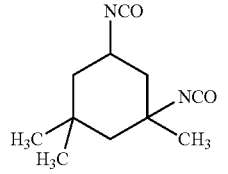 | See Structure | 2 |
| VIIj | 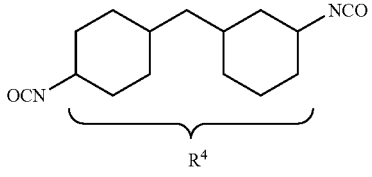 | See Structure | 2 |

TABLE 7-continued

Illustrative Polyisocyanates VII

| Entry | Structure | $R^4$ | m |
|---|---|---|---|
| VIIk | OCN–[cyclohexyl]–CH2–[cyclohexyl]–NCO (with R4 bracket) | See Structure | 2 |
| VIII | OCN–[phenyl]–CH2–[phenyl]–NCO (MDI) (with R4 bracket) | See Structure | 2 |
| VIIm | Vm: OCN–[phenyl(CH3)]–NCO (2,4-TDI) + [phenyl(CH3)]–(NCO)2 (2,6-TDI) | See Structure | 2 |
| VIIn | OCN–[phenyl(CH3)]–NCO (2,4-TDI substantially free of 2,6-TDI) | See Structure | 2 |
| VIIo | OCN–[phenyl]–O–[phenyl(OCN)]–NCO | See Structure | 3 |
| VIIp | H3C–[phenyl(OCN,CH3)]–O–[phenyl(NCO)]–O–[phenyl(H3C,CH3)]–NCO | See Structure | 3 |

There is disclosed a polyurethane material which may obtained by mixing one or more polyisocyanates, for example polyisocyanates VIII (MDI) and VIIn (TDI), a prepolymer, or a latent polyisocyanate such as a blocked polyisocyanate derivative thereof, with the polyol composition as the crude reaction product in which it is formed, for example a crude reaction product obtained by contacting bisphenol A polycarbonate powder (2500 grams) with a mixture of monomeric polyols Ia (7000 grams) and Ie (500 grams) in the presence of a metal hydroxide catalyst at a temperature in a range from about 140 degrees centigrade to about 180 degrees centigrade for a period of 20 minutes to three hours to provide a product mixture comprising the polyol composition comprising either or both of monomeric polyols Ia and Ie, higher polyols derived from them, and free bisphenol A. The polyisocyanates may be mixed with the polyol composition in amounts such that there is a slight excess of hydroxyl groups relative to isocyanate groups, thus assuring complete consumption of isocyanates VIII and VIIn as the polyol composition is converted into a polyurethane. The complexity of the polyol composition notwithstanding, such compositions can be converted to useful polyurethane products without an intervening purification step. It may be useful to subject the polyol composition to a purification step prior to its conversion to a polyurethane. Suitable purification steps may include vacuum transfer removal of volatile components, filtration, microfiltration, nanofiltration, ultrafiltration, centrifugation, low temperature recrystallization, low temperature zone refining and trituration.

There is disclosed a curable composition comprising: (a) a first part comprising one or more polyisocyanates or latent polyisocyanates; and (b) a second part comprising a polyol composition as disclosed herein; wherein when the first part and the second part are contacted and the composition cures.

In preparing the cured polyurethanes one or more second polyols may be present. For example, the second polyol may be one or more of a polyalkylene oxide ether based polyol, a polyester polyol, a polyacrylate polyol or a polycarbonate polyol. Exemplary classes of polyols include polyether polyols, polyarylene ether polyols, polyester polyols, poly (alkylene carbonate)polyols, hydroxyl containing polythio-ethers and mixtures thereof. Polyether polyols may contain one or more alkylene oxide units in the backbone of the polyol. Exemplary alkylene oxide units are ethylene oxide, propylene oxide, butylene oxide and mixtures thereof. The alkylene oxides may contain straight or branched chain alkylene units. The polyol may contain propylene oxide units, ethylene oxide units or a mixture thereof. Where a mixture of alkylene oxide units is contained in a polyol, the different units can be randomly arranged or arranged in blocks of each alkylene oxide. The polyol may comprise propylene oxide chains with ethylene oxide chains capping the polyol. The polyols may be a mixture of diols and triols. The individual polyols may have a functionality of about 1.9 or greater, about 1.95 or greater, or about 2.0 or greater; and may have a functionality of about 6.0 or less, about 4.0 or less, about 3.5 or less, or about 3.0 or less. The equivalent weight of the second polyols may be about 200 or greater, about 500 or greater, or about 1,000 or greater; and may be about 5,000 or less, about 3,000 or less, or about 2,500 or less. The second polyols may be located in the second part of a curable polyurethane composition. The second polyols may be present in the composition in an amount of about 2 percent by weight or greater, about 10 percent by weight or greater or about 20 percent by weight or greater based on either the total weight of the polyol composition, the total weight of a curable composition comprising (a) a first part comprising a polyisocyanate or latent polyisocyanate and (b) a second part comprising a polyol composition, or the weight of either the polyisocyanate component or the polyol composition component of the curable composition. The second polyol may be present in the composition in an amount of about 35 percent by weight or less, about 15 percent by weight or less or about 5 percent by weight or less based on either the total weight of the polyol composition, the total weight of a curable composition comprising (a) a first part comprising a polyisocyanates or latent polyisocyanate and (b) a second part comprising a polyol composition, or the weight of either the polyisocyanate component or the polyol composition component of the curable composition.

The curable compositions may further comprise one or more compounds having two or more isocyanate reactive groups and a hydrocarbon backbone wherein the backbone may further comprise one or more heteroatoms. Such compounds may be of any molecular weight which provides useful physical characteristics in the polyurethane composition, and may be chain extenders. Such compounds may be difunctional, or crosslinkers having greater than two active hydrogen groups per compound. The chain extender may be a lower molecular weight, moderate molecular weight or higher molecular weight diamine; for example, ethylene diamine, 1,3-propylene diamine, 1,4 butylene diamine, N,N'-dimethyl hexamethylene diamine (lower molecular weight diamines); Jeffamine 400, Jeffamine 1000 (moderate molecular weight diamines); and Jeffamine 2000 and Jeffamine 4000 (higher molecular weight diamines). The compound having two or more isocyanate reactive groups may be a triamine such as bishexamethylene triamine (CAS No. 143-23-7), Jeffamine T-403, or Jeffamine T5000. The heteroatoms in the backbone may be oxygen, sulfur, nitrogen or a mixture thereof; oxygen, nitrogen or a mixture thereof; or oxygen. The molecular weight of such compounds having two or more isocyanate reactive groups and a hydrocarbon backbone wherein the backbone may further comprise one or more heteroatoms, be about 4000 or less, about 2000 or less, about 1000 or less, about 500 or less, or about 200 or less. Such compounds having two or more isocyanate reactive groups and a hydrocarbon backbone wherein the backbone may comprise one or more multifunctional alcohols, multifunctional alkanol amines, one or more adducts of multifunctional alcohol and an alkylene oxide, one or more adducts of a multifunctional alkanol amine and an alkylene oxide or a mixture thereof. Exemplary multifunctional alcohols and multifunctional alkanol amines are ethane diol, propane diol, butane diol, hexane diol, heptane diol, octane diol, glycerin, trimethylol propane, pentaerythritol, neopentyl glycol, ethanol amines (diethanol amine, triethanol amine) and propanol amines (di-isopropanol amine, tri-isopropanol amine) and the like. Blends of such compounds having two or more isocyanate reactive groups may be used. The compound having two or more isocyanate reactive groups may be located in the second part. Such compounds may be present in the composition in an amount of about 2 percent by weight or greater, about 3 percent by weight or greater or about 4.0 percent by weight or greater. Such compounds may be present in the composition in an amount of about 16 percent by weight or less, about 12 percent by weight or less or about 10 percent by weight or less.

The second part may comprise a catalyst for the reaction of hydroxyl groups with isocyanate groups. Among exemplary catalysts are organotin compounds, metal alkanoates, and tertiary amines. Mixtures of classes of catalysts may be used, such as a mixture of a tertiary amine and one or more of organotin compounds or metal alkanoates. Such a mixture may include tertiary amines, such as dimorpholino diethyl ether, and a metal alkanoate, such as bismuth octoate. Included in organotin compounds are alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. Exemplary organotin compounds are dialkyltin dicarboxylates and dialkyltin dimercaptides. Dialkyl tin dicarboxylates with lower total carbon atoms are preferred as they are more active catalysts in the compositions. Exemplary dialkyl dicarboxylates include 1,1-dimethyltin dilaurate, 1,1-dibutyltin diacetate and 1,1-dimethyl tin dimaleate. Preferred metal alkanoates include bismuth octoate or bismuth neodecanoate. The organo tin compounds or metal alkanoates may be present in an amount of about 60 parts per million or greater based on the weight of the composition, about 120 parts by million or greater. The organo tin compounds or metal alkanoates may be present in an amount of about 1.0 percent or less based on the weight of the composition, about 0.5 percent by weight or less or about 0.2 percent by weight or less. Exemplary tertiary amine catalysts include dimorpholinodialkyl ether, a di((dialkyl-morpholino)alkyl)ether, bis-(2-dimethylaminoethyl)ether, triethylene diamine, pentamethyldi-ethylene triamine, N,N-dimethylcyclohexylamine, N,N-dimethyl piperazine, 4-methoxyethyl morpholine, N-methylmorpholine, N-ethyl morpholine, diazabicyclo compounds and mixtures thereof. An exemplary dimorpholinodialkyl ether is dimorpholinodiethyl ether. An exemplary di((dialkylmorpholino)alkyl)ether is (di-(2-(3,5-dimethylmorpholino)ethyl)-ether). Diazabicyclo compounds are compounds which have diazobicyclo structures. Exemplary diazabicyclo compounds include diazabicycloalkanes and diazabicyclo alkene salts. Exemplary diazabicycloalkanes include diazabicyclooctane, available from Air Products under the trademark and designations, DABCO, DABCO WT, DABCO DC 1, DABCO DC 2, and DABCO DC 21. Diazabicycloalkene salts include diazabicycloundecene in the phenolate, ethylhexoate, oleate and formate salt forms, available from Air Products under the trademark and designations, POLYCAT SA 1, POLYCAT SA 1/10, POLYCAT SA 102 and POLYCAT SA 610. Tertiary amines may be employed in an amount, based on the weight of the composition of about 0.01 percent by weight or greater, about 0.05 percent by weight or greater, about 0.1 percent by weight or greater or about 0.2 percent by weight or greater and about 2.0 percent by weight or less about 1.5 percent by weight or less, or about 1.2 percent by weight or less.

While polyurethane compositions incorporating the polyol compositions disclosed herein are characterized by both exceptional strength and high heat resistance, such properties may be further enhanced through though the incorporation of one or more fillers. In the case of a two-part polyurethane-forming, curable composition, also referred to herein as a reactive mixture, either or both of parts of may contain a filler. Fillers are added for a variety of reasons and one or more types of fillers may be utilized in the composition. Fillers may be added to reinforce the composition, to impart the appropriate viscosity and rheology and to strike a balance between cost and the desired properties of the composition and the cost of the composition. Reinforcing fillers, such as one or more carbon blacks, one or more clays or non-pigmented fillers, one or more thixotropes or combinations thereof may be used. Such fillers are used in a sufficient amount to impart an acceptable balance of viscosity and cost to the formulation and to achieve the desired properties of the composition. Among fillers useful for this purpose are clays, untreated and treated talc, and calcium carbonates. Preferred clays useful include kaolin, surface treated kaolin, calcined kaolin, aluminum silicates and surface treated anhydrous aluminum silicates. Kaolin is also known as Kaolinite and comprises compounds represented by the chemical formula $Al_2 Si_2 O_5 (OH)_4$, and it most often occurs as clay-sized, plate like, hexagonally shaped crystals. The clays can be used in any form which facilitates formulation of a composition having the desired properties. The composition may further comprise fillers which function as a thixotrope (rheological additive). Such thixotropes are well known and include fumed silica and the like. Fumed silicas include organically modified fumed silicas. The thixotrope may be added to the composition in a sufficient amount to give the desired rheological properties. Additional suitable fillers include glass flake, glass fibers carbon fiber and basalt fiber.

The filler may be a fiber based material which may be present in woven and non-woven structures, individual fibers, rovings comprising a plurality of fiber strands, chopped fibers and the like. The fillers may be glass, carbon, polymeric, metallic, ceramic and the like. The filler may be one or more of a continuous filament mat (CFM), a chopped or continuous strand mat (CSM), and an engineered stitched mat which may be used in single or multiple layers within a composite material prepared using the polyol compositions disclosed herein. Exemplary fillers include Continuous filament mat (CFM) fiberglass reinforcing materials available from Owens Corning, such as M8643, UNIFLO U500 series reinforcing materials, and UNIFLO U700 series reinforcing materials. Exemplary fillers include chopped strand mat (CSM) fiberglass reinforcing materials which include M6X1 CSM, M705 CSM and M723 A CSM available from Owens Corning. Exemplary fillers include engineered knitted mat fiberglass reinforcing materials such as MULTIMAT reinforcing materials available from Owens Corning, ROVI-CORE reinforcing materials available from Chomarart, and FLOWMAT reinforcing materials available from Skaps Industries. Woven and non-woven reinforcing materials other than fiberglass may also be used, for example woven and non-woven carbon fibers. The reinforcing filler may comprise one or more sizing agents. The reinforcing filler may be essentially free of sizing agents. By essentially free of sizing agents it is meant that the reinforcing material was not treated with a sizing agent prior to contacting the reactive mixture.

The reinforcing material may be present in an amount 10 percent or greater, 20 percent or greater, 30 percent or greater, or 40 percent or greater based on the total weight of the composition. The reinforcing material may be present in an amount 60 percent or less, 40 percent or less, or 20 percent or less based on the total weight of the composition. The reactive mixture, also referred to as the polyurethane-forming formulation (or simply resin) may be present in an amount 90 percent or less, 80 percent or greater, 70 percent or less, or 60 percent or less based on the total weight of the composition. The reactive mixture may be present in an amount of 40 percent or more, 60 percent or more, or 80 percent or more based on the total weight of the composition.

Composite materials incorporating the polyol compositions disclosed herein are conventionally prepared. The reinforcing material may be cut to fit within a tool cavity. Slits may be made in the reinforcing material to prevent buckling or puckering of the reinforcing material during mold filling. The reinforcing material is disposed within the tool and the tool is closed. A reactive mixture comprising a first part comprising one or more polyisocyanates or latent polyisocyanates and a second part comprising one or more polyol compositions disclosed herein is prepared in a meter mixing system and is delivered in an uncured state to the mold heated to a temperature greater than about 180° F. and less than about 220° F. and allowed to cure. Cure times and peak in-mold exotherms vary but are typically less than about 30 minutes and less than about 260° F. Cured composite parts have excellent green strength and may be removed hot from the mold and do not require external support once removed in order to prevent deformation. The reactive mixtures disclosed herein, owing to the chemical structure and relatively low viscosity of the polyol composition component, flow easily around the reinforcing material as evidenced by the high quality (strength and appearance) of product composite parts and the mold fill times are the same whether a reinforcing material is present in the mold or not.

Polyurethane compositions may further comprise a plasticizer commonly used in polyurethane compositions. The composition may contain plasticizers in both components. Exemplary plasticizers include straight and branched alkylphthalates, such as diisononyl phthalate, dioctyl phthalate and dibutyl phthalate, a partially hydrogenated terpene commercially available as "HB-40", trioctyl phosphate, alkylsulfonic acid esters of phenol, toluene-sulfamide, adipic acid esters, castor oil, xylene, 1-methyl-2-pyrrolidinone and toluene. Exemplary plasticizers are branched plasticizers, such as branched chain alkyl phthalates for example di-isononyl phthalates (available under the Trademark PLATINOL N from BASF. The amount of plasticizer used is that amount sufficient to give the desired rheological properties and disperse the components in the curable composition. The plasticizer may be present in about 1 percent by weight or greater of the composition, about 5 percent by weight or greater, or about 10 percent by weight or greater. The plasticizer may be present in about 50 percent by weight or less of the composition or about 40 percent by weight or less.

Other components commonly used in curable compositions may be used in the compositions. Such materials are well known to those skilled in the art and may include ultraviolet stabilizers, antioxidants, mold release compounds, both external or internal, and the like.

Experimental Part

General

Examples describing the preparation of polyol compositions and their conversion into polyurethane materials are presented. Structures for representative polyols comprising at least three hydroxyl groups are exemplified in Table 1. The nominal structure and nominal molecular weight of PLURACOLR PEP 450 monomeric polyol, structure Ia, are reproduced below. The average molecular weight PLURACOLR PEP 450 may be somewhat higher as it is a mixture of propoxylated pentaerythritols believed to contain as a principal component a propoxylated pentaerythritol containing five propylene oxide repeat units.

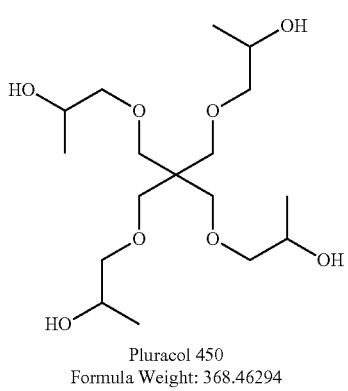

Ia

Pluracol 450
Formula Weight: 368.46294

Example 1 Preparation of Product Polyol Composition

To a 20-liter reactor equipped with a mechanical agitator, overhead vent and nitrogen purge line is added the monomeric polyol, a propoxylated pentaerythritol, PLURACOLR PEP 450 (BASF), (8123.00 grams, 22.05 moles, 67.48%), and a 20% solution of potassium hydroxide (4.2 grams, 0.03%) in methanol. The contents of the reactor are stirred and heated to 150° C. A second monomeric polyol, pentaerythritol, (534.00 grams, 3.92 moles, 4.44%) is added to the reactor with continued stirring. The pentaerythritol substantially dissolves within a two-minute period. The mechanical agitator shaft speed is maintained at approximately 5000 rpm which corresponds to a linear velocity of the mixing blade of approximately 100 feet per second. Bisphenol A polycarbonate powder (3200.00 grams, 26.59%), LEXANR105 (Sabic), is then added over a seven-minute period. After twenty-five minutes no polycarbonate powder remains visible in the reactor. Approximately thirty-two minutes after the addition of the polycarbonate is initiated, diisopropanol amine (132.00 grams, 0.99 moles, 1.10%) is added to the reaction mixture. The rate of agitation is then lowered to approximately 1000 rpm and the reaction mixture is allowed to cool. When the reaction mixture reaches approximately 50° C., a phosphoric acid alkyl ester weakly acidic catalyst, Nacure 4000 (5.90 grams, 0.05%) is added under stirring to quench any remaining potassium hydroxide and other basic species in the reaction mixture. After further cooling the entire contents of the reactor and representing the product polyol composition are transferred to a storage vessel. The product polyol composition has a viscosity of 770 cps at 150° F. and exhibited the viscosity profile shown below.

TABLE 8

Viscosity Profile of Product Polyol Composition of Example 1

| Temp (° F.) | Temp (° C.) | Viscosity (cps) AD17094 |
|---|---|---|
| 75 | 24 | 170000 |
| 80 | 27 | 93070 |
| 85 | 29 | 49260 |
| 90 | 32 | 27240 |
| 95 | 35 | 15340 |
| 100 | 38 | 10400 |
| 105 | 41 | 7044 |
| 110 | 43 | 4956 |
| 115 | 46 | 3744 |
| 120 | 49 | 2848 |
| 125 | 52 | 2212 |
| 130 | 54 | 1708 |
| 135 | 57 | 1388 |
| 140 | 60 | 1120 |
| 145 | 63 | 951 |
| 150 | 66 | 770 |
| 155 | 68 | 623 |
| 160 | 71 | 508 |
| 165 | 74 | 380 |
| 170 | 77 | 318 |
| 175 | 79 | 287 |
| 180 | 82 | 234 |
| 185 | 85 | 189 |
| 190 | 88 | 169 |
| 195 | 91 | 134 |
| 200 | 93 | 106 |
| 205 | 96 | 95 |
| 210 | 99 | 84 |
| 215 | 102 | 66 |
| 220 | 104 | 60 |
| 225 | 107 | 53 |
| 230 | 110 | 42 |
| 235 | 113 | 38 |
| 240 | 116 | 33 |
| 245 | 118 | 30 |
| 250 | 121 | 27 |
| 255 | 124 | 24 |
| 260 | 127 | 21 |

The product polyol composition is analyzed by liquid chromatography and found to contain from about 22 to about 24% by weight free bisphenol A representing about 92 to about 94% of all bisphenol A residues present in the starting polycarbonate employed. Free bisphenol A may serve as a chain extender in subsequent reaction of the polyol composition with polyisocyanates. The remaining bisphenol A residues are believed to be present as residues bound to minor higher polyol components of the product polyol composition and as very short chain bisphenol A polycarbonate oligomers which, as evidenced by mass spectral data, appear to be present but in very low concentrations. The structures of alkoxylated monomeric polyol species such Ia, and higher polyol species such as IIa are idealized in the sense that they are in many instances mixtures of polyol species wherein the number of polyoxyalkylene units may vary from fewer than the number of such units shown to more than the number of such units shown in the nominal representations of the structure. (Contrast structure Ia (Table 1) and structure IIa (Table 2) with the variable structures Ia and IIa presented in this Experimental Part.) The structures Ia and IIa presented in Tables 1 and 2 and alkoxylated polyol structures throughout this disclosure are nominal structures in that they represent both the single structure shown as well as mixtures of closely related homologous compounds and their diastereomers.

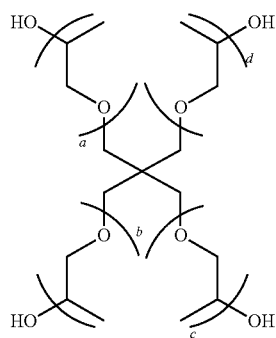

Ia

A detailed chromatographic (high pressure liquid chromatography and gel permeation chromatography) and mass spectral analysis carried out by Cambridge Polymer Group (Charlestown, MA) showed that the principal higher polyol component in the product polyol mixture was the monocarbonate of Pluracol PEP 450 and having nominal structure IIa, Table 2 which may also be represented by structure IIa shown here wherein subscripts a, b, c, d, e, f, g and h when summed represent the total number, m, of propylene oxide repeat units. The value of m has been determined by negative ion mass spectral analysis (FIG. 1) to range from 6, to at least

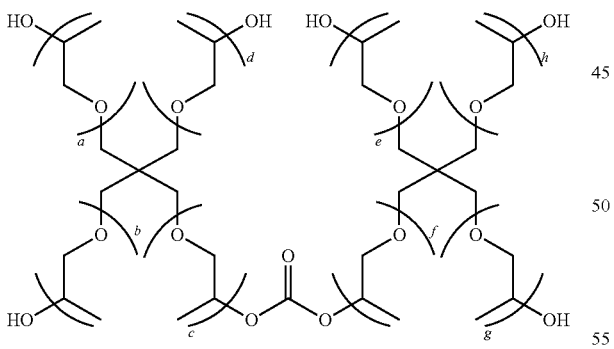

Figure 2:
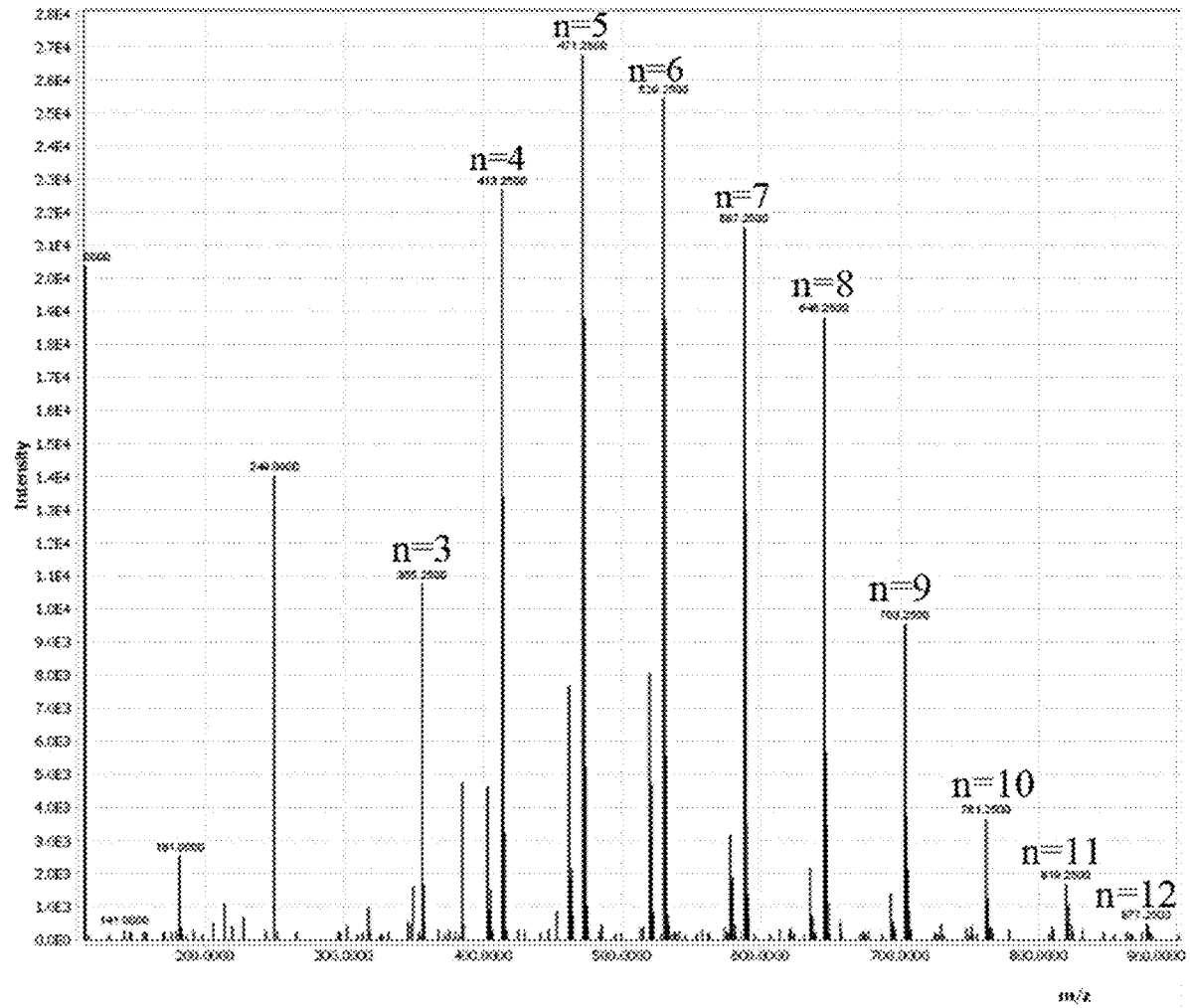
FIG. 2 shows a negative ion mass spectrum of a representative monomeric polyol as disclosed herein.
Figure 3:
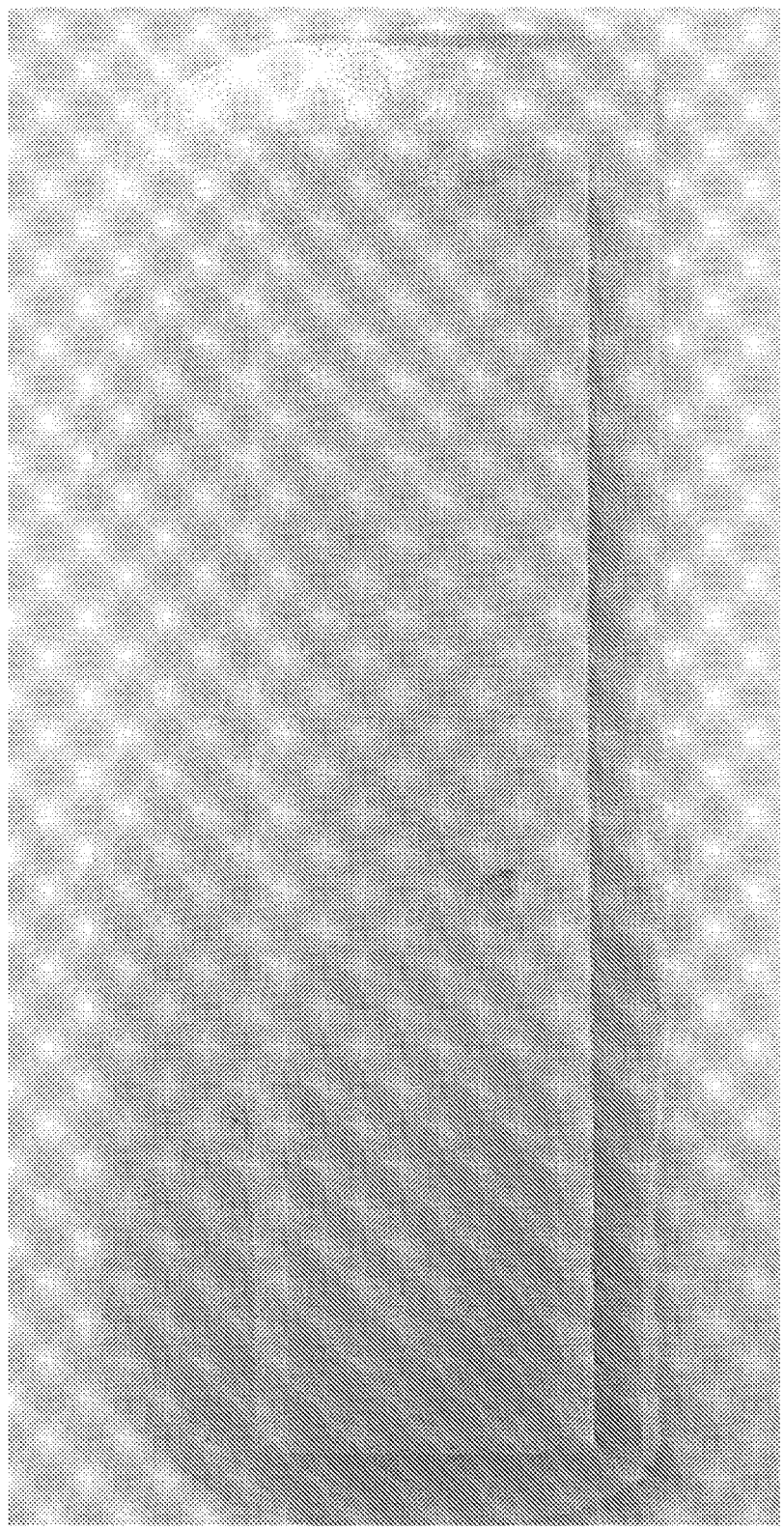
FIG. 3 shows a photograph of a molded polyurethane article comprising the polyol composition of Comparative Example 3.

IIa 11, however, the analytical method does not permit the identification of higher monocarbonate species IIa, for example a species wherein the sum of a-h (m) is 12. For reference, the subscripts a, b, c and d sum to an integer n which ranges from n=3 to n=12 inclusive. Negative ion mass spectral analysis (FIG. 2) of the starting monomeric polyol (PEP 450) shows it to contain a mixture of propoxylated pentaerythritol homologs Ia wherein the major components correspond to n=4, n=5, n=6, n=7 and n=8 with n=5 being the predominant species.

Example 2 Preparation of Product Polyol Composition

To a 20-liter reactor equipped with a mechanical agitator, overhead vent and nitrogen purge line is added the monomeric polyol, a propoxylated pentaerythritol, PLURACOLR PEP 450 (BASF), (8823.00 grams, 23.94 moles, 73.30%), and a solution of potassium hydroxide (4.2 grams, 0.03%) in methanol. The contents of the reactor are stirred and heated to 150° C. A second monomeric polyol, pentaerythritol, (534.00 grams, 3.92 moles, 4.44%) is then added to the reactor with continued stirring. The pentaerythritol substantially dissolves within a two-minute period. The mechanical agitator shaft speed is maintained at approximately 5000 rpm which corresponds to a linear velocity of the mixing blade of approximately 100 feet per second. Bisphenol A polycarbonate powder (2500.00 grams, 20.77%), LEXANR105 (Sabic), is then added over a seven-minute period. After twenty-five minutes no polycarbonate powder remains visible in the reactor. Approximately thirty-two minutes after the addition of the polycarbonate is initiated, diisopropanol amine (132.00 grams, 0.99 moles, 1.10%) is added to the reaction mixture. The rate of agitation is then lowered to approximately 1000 rpm and the reaction mixture is allowed to cool. When the reaction mixture reaches approximately 50° C., a phosphoric acid alkyl ester weakly acidic catalyst, Nacure 4000, (5.90 grams, 0.05%) is added under stirring to quench any remaining potassium hydroxide and other basic species in the reaction mixture. After further cooling the entire contents of the reactor and representing the product polyol composition are transferred to a storage vessel. The product polyol composition has a viscosity of 565 cps at 150° F. and exhibits the viscosity profile shown below.

TABLE 9

Viscosity Profile of Product Polyol Composition of Example 2

| Temp (° F.) | Temp (° C.) | Viscosity (cps) AD17097 |
|---|---|---|
| 100 | 38 | 6072 |
| 105 | 41 | 4404 |
| 110 | 43 | 3264 |
| 115 | 46 | 2428 |
| 120 | 49 | 1940 |
| 125 | 52 | 1496 |
| 130 | 54 | 1212 |
| 135 | 57 | 991 |
| 140 | 60 | 797 |
| 145 | 63 | 661 |
| 150 | 66 | 565 |
| 155 | 68 | 437 |
| 160 | 71 | 378 |
| 165 | 74 | 316 |
| 170 | 77 | 236 |
| 175 | 79 | 174 |
| 180 | 82 | 158 |
| 185 | 85 | 137 |
| 190 | 88 | 111 |
| 195 | 91 | 82 |
| 200 | 93 | 62 |
| 205 | 96 | 70 |
| 210 | 99 | 63 |
| 215 | 102 | 53 |
| 220 | 104 | 48 |
| 225 | 107 | 43 |
| 230 | 110 | 35 |
| 235 | 113 | 31 |
| 240 | 116 | 28 |

Examples 3-10 Preparation of Product Polyol Compositions

Following procedures similar to those described in Examples 1 and 2, on a smaller scale (6,000 grams total weight) and varying the relative amounts of each of the components, affords the similarly constituted polyol compositions as shown in Table 10.

TABLE 10

Polyol Compositions of Examples 1-10 and Comparative Examples 1-3

| Entry | PEP 450 %* | PE %* | DIPA %* | PC %* | Viscosity (cps) at 150° F. |
|---|---|---|---|---|---|
| Example 1 | 67.48 | 4.44 | 1.1 | 26.59 | 770 |
| Example 2 | 73.30 | 4.44 | 1.10 | 20.77 | 565 |
| Example 3 | 51.52 | 3.03 | 7.07 | 38.38 | 519 |
| Example 4 | 63.73 | 4.90 | 0.00 | 31.37 | 741 |
| Example 5 | 52.00 | 3.00 | 7.00 | 38.00 | 512 |
| Example 6 | 32.00 | 6.00 | 17.00 | 45.00 | nd** |
| Example 7 | 58.42 | 0.99 | 10.89 | 29.70 | 297 |
| Example 8 | 57.00 | 4.00 | 10.00 | 29.00 | 172 |
| Example 9 | 66.02 | 0.97 | 0.00 | 33.01 | 1303 |
| Example 10 | 33.66 | 0.99 | 17.82 | 47.52 | nd** |
| Comparative Example 1 | 41.18 | 0.98 | 0.00 | 57.84 | nd*** |
| Comparative Example 2 | 38.24 | 7.84 | 0.00 | 53.92 | nd*** |
| Comparative Example 3 | 67.8 | 4.5 | 1 | 0 | nd** |

*Weight percentage of the component based on the total weight of the product polyol composition.
**nd = not determined.
***nd = not determined, polyol composition was a glass.

Examples 1-10 illustrate the preparation and properties of polyol compositions useful in the preparation of thermally robust polyurethane compositions using conventional manufacturing equipment. Comparative Examples 1 and 2 illustrate polyol compositions prepared using high concentrations of polycarbonate which are too viscous to be readily handled in conventional mixing systems used in the manufacture of polyurethanes. The illustrated polyol compositions are low color, low viscosity fluids (less than 5000 cps at 150° F.) and perform well in commercially available meter mixing equipment. However, the illustrated polyols are considerably more viscous than a representative monomeric polyalkoxylated polyol, PLURACOLR PEP 450, which has a reported viscosity of 5200 cps at 68° F.). The polyhydroxylated aromatic compound is present as bisphenol A monomer in significant amounts, roughly equivalent to the weight of the bisphenol A residues in the starting polycarbonate, and acts as a chain extender in product polyurethanes prepared using the disclosed polyol compositions.

Examples 11-12 Polyurethane Compositions Based on Polyol Compositions

General Procedure

Polyurethane compositions are made using as Component "B" of a two-part A+B formulation, a polyol composition made as described herein. The polyol is heated to a temperature in a range between 160° F. and 200° F. (71° C. and 93° C.), at which temperature the polyol composition exhibits a workable viscosity, typically a viscosity in a range between about 150 cps and about 2000 cps. The heated polyol composition is metered into a mixing head and combined with Component A of the two-part formulation and containing one or more polyisocyanates. Component A is preheated to a temperature in a range from about 130° F. to about 140° F. (54° C. to about 60° C.) prior to being mixed with Component B. The mixing head is operated at 1500-3000 rpm and the fluid flow rate through the mixing head is in a range from about 25 grams per second to about 150 grams per second. Relative flow rates of the A and B sides are set to give a ratio of polyol composition hydroxyl groups to isocyanate groups of 1:1. A liquid catalyst formulation containing a copper-based, heat activated catalyst, Niax LC-5636, is also metered in at the mixing head at a rate calculated to deliver the catalyst in an amount corresponding to 0.3 weight percent of the total weight of the B side polyol composition. The nature of the catalyst and the temperature of the two-part polyurethane formulation are observed to influence gel time, which is typically in a range from about 30 seconds to about 10 minutes. Effective conversion of the polyol composition and polyisocyanate occurs when the mixed material exhibits an in-mold exotherm in the range of from about 250° F. to about 350° F. (121° C. to about 177° C.) during a period of from about 10 to about 20 minutes. Unless otherwise indicated, the physical properties reported for product polyurethane compositions represent average values obtained from multiple (typically three or more) test samples prepared from the same polyurethane-forming formulation.

Example 11 Polyurethane Prepared from the Product Polyol Composition of Example 1

The polyol composition of Example 1 is heated to 180° F. (82° C.) in the B-side reactant reservoir of a Covestro meter mixing system. A modified polymeric diphenylmethane polyisocyanate, Baydur 486, manufactured from a polyether polyol and methylene diphenyl diisocyanate (MDI), is heated to 130° F. (54° C.) in the A-side reactant reservoir of the meter mix system. The A and B side reactants are pumped to the mixing head of the meter mixing system at a total flow rate of 2000 grams per minute in a flow ratio calculated to provide a ratio of polyol composition hydroxyl groups to isocyanate groups of 1:1 and are mixed at 2500 rpm. The A+B formulation is transferred directly from the mixing head to a heated mold held initially at 150° F. (66° C.). An in-mold exotherm resulting from the reaction of the polyol composition with the polyisocyanate is observed to raise the internal temperature within the mold to 260° F. (127° C.) over a period of 10 minutes. The molded article is removed from the mold after 30 minutes and has excellent surface appearance and exhibits the following physical characteristics: Flex Modulus 3762 Mpa as determined using ASTM protocol D790; Flex Strength 132 Mpa as determined using ASTM protocol D790; Glass Transition Temperature (Tg) 121° C. as determined by differential scanning calorimetry (DSC). The glass transition temperature is slightly higher when determined by dynamic mechanical analysis (See Table 12 below).

Example 12 Polyurethane Prepared from the Product Polyol Composition of Example 2

The polyol composition of Example 2 is converted to a molded polyurethane article as described in Example 11 with the exception that the mold is initially held at 200° F. (93° C.) instead of 150° F. (66° C.). An in-mold exotherm resulting from the reaction of the polyol composition with the polyisocyanate is observed to raise the internal temperature within the mold to 260° F. (127° C.). over a period of 10 minutes. The molded article is removed from the mold after 30 minutes and has excellent surface appearance and exhibits the following physical characteristics: Flex Modulus 3602 Mpa as determined using ASTM protocol D790; Flex Strength 132 Mpa as determined using ASTM protocol D790; Glass Transition Temperature (Tg) 99° C. as determined by differential scanning calorimetry (DSC).

Examples 13-20 Polyurethane Prepared from the Product Polyol Composition of Examples 3-10

The compositions of Examples 3-10 are reacted with Baydur 486 polyisocyanate, as described in Example 11 to provide a series of molded articles comprised of the product polyurethanes. Test data for the product polyurethanes are gathered in Table 11. The polyurethane compositions produced in Examples 16 and 20 are extremely brittle and test samples could not be cut from the molded polyurethane product.

substantially dissolves at 150° C. Diisopropanol amine (DIPA) (10 grams, 0.075 moles) is then added to the polyol mixture and stirring is continued for an additional 15 minutes after which time the mixture is allowed to cool with continued stirring at 100 rpm. As the mixture begins to cool a phosphoric acid alkyl ester weakly acidic catalyst, Nacure 4000 (1.5 grams, 0.15%) is added under stirring to quench the potassium hydroxide. Upon reaching room temperature, approximately 70° F.). (21° ° C., the polyol mixture is a turbid liquid which is filtered and degassed under vacuum prior to reaction with the polyisocyanate. To the filtered, degassed polyol mixture (88 grams) is added a copper-based, heat activated catalyst, Niax LC5636 catalyst (0.3 grams). The mixture is then warmed to 100° F. and blended with the polyisocyanate, Baydur 486, (112 grams, OH to NCO mix ratio 1:1) in a bidirectional centrifugal mixer at 400 rpm for 40 seconds to provide a polyurethane-forming reactive mixture which is poured into a mold and cured at 230° F. (110° C.) for 30 minutes. The molded article (FIG.

TABLE 11

Polyurethane Compositions Prepared from Product Polyols of Examples 1-10

| Entry$^\alpha$ | Polyol Viscosity (cps) at 150° F. | OH to NCO Mix Ratio | Product Polyurethane Tg (° C.)* | Product Polyurethane Flex Strength psi (Mpa) | Product Polyurethane Flex Modulus psi (Mpa) | Product Polyurethane Gel Time (seconds) |
|---|---|---|---|---|---|---|
| Example 11 (1)$^\alpha$ | 770 | 1.0 | 121 | 19145 (132) | 545632 (3762) | — |
| Example 12 (2)$^\alpha$ | 565 | 1.0 | 99 | 191145 (132) | 522425 (3602) | — |
| Example 13 (3)$^\alpha$ | 519 | 1.0 | 105 | 16493 (114) | 313514 (2162) | 98 |
| Example 14 (4)$^\alpha$ | 741 | 1.0 | 104 | 10176 (70) | 316393 (2181) | >120 |
| Example 15 (5)$^\alpha$ | 512 | 1.0 | 113 | 14361 (99) | 303709 (2094) | 100 |
| Example 16 (6)$^\alpha$ | nd** | 1.0 | 90 | nd** | nd** | nd** |
| Example 17 (7)$^\alpha$ | 297 | 1.0 | 110 | 15878 (109) | 325356 (2243) | 160 |
| Example 18 (8)$^\alpha$ | 172 | 1.0 | 95 | 9024 (62) | 337990 (2330) | >120 |
| Example 19 (9)$^\alpha$ | 1303 | 1.0 | 108 | 14380 (99) | 301245 (2077) | 100 |
| Example 20 (10)$^\alpha$ | nd** | 1.0 | 83 | nd** | nd** | 270 |

Figure 4:
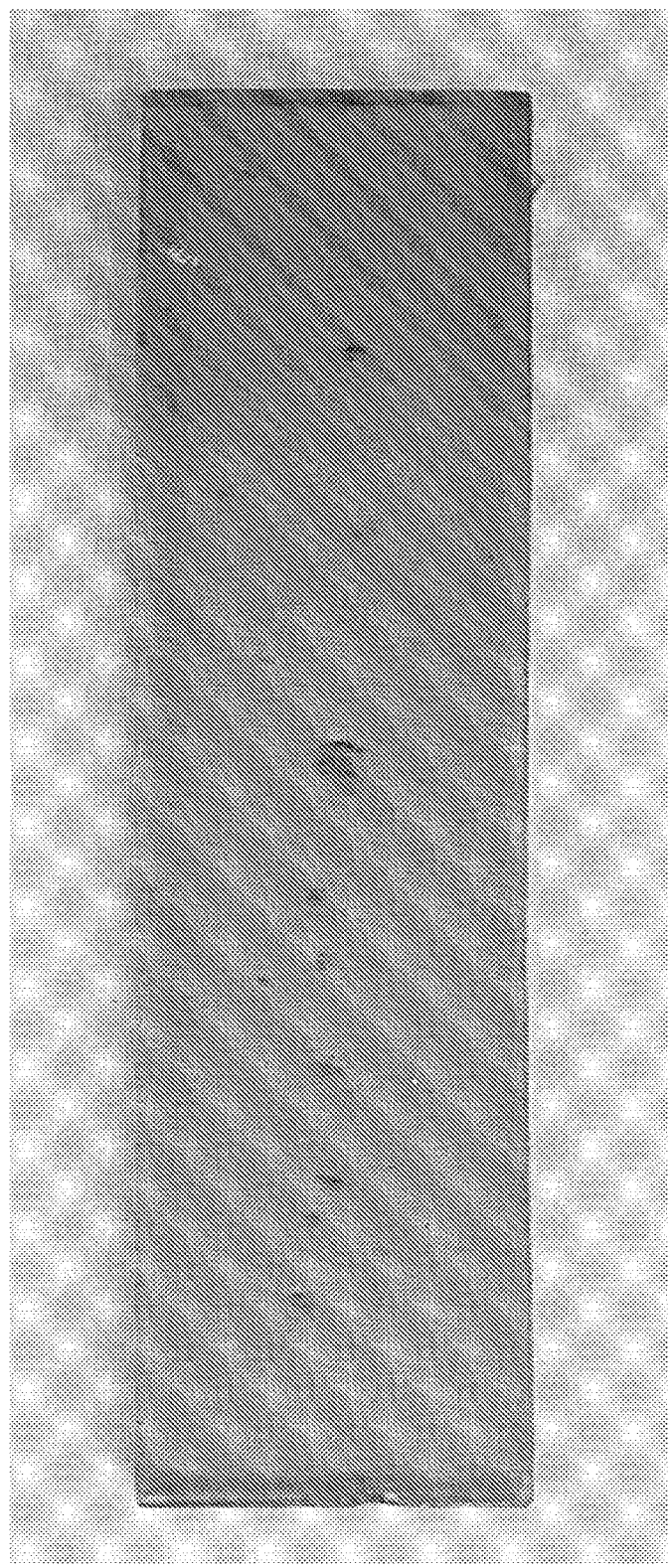
FIG. 4 shows a photograph of a molded polyurethane article comprising the polyol composition of Example 11.
Figure 5:
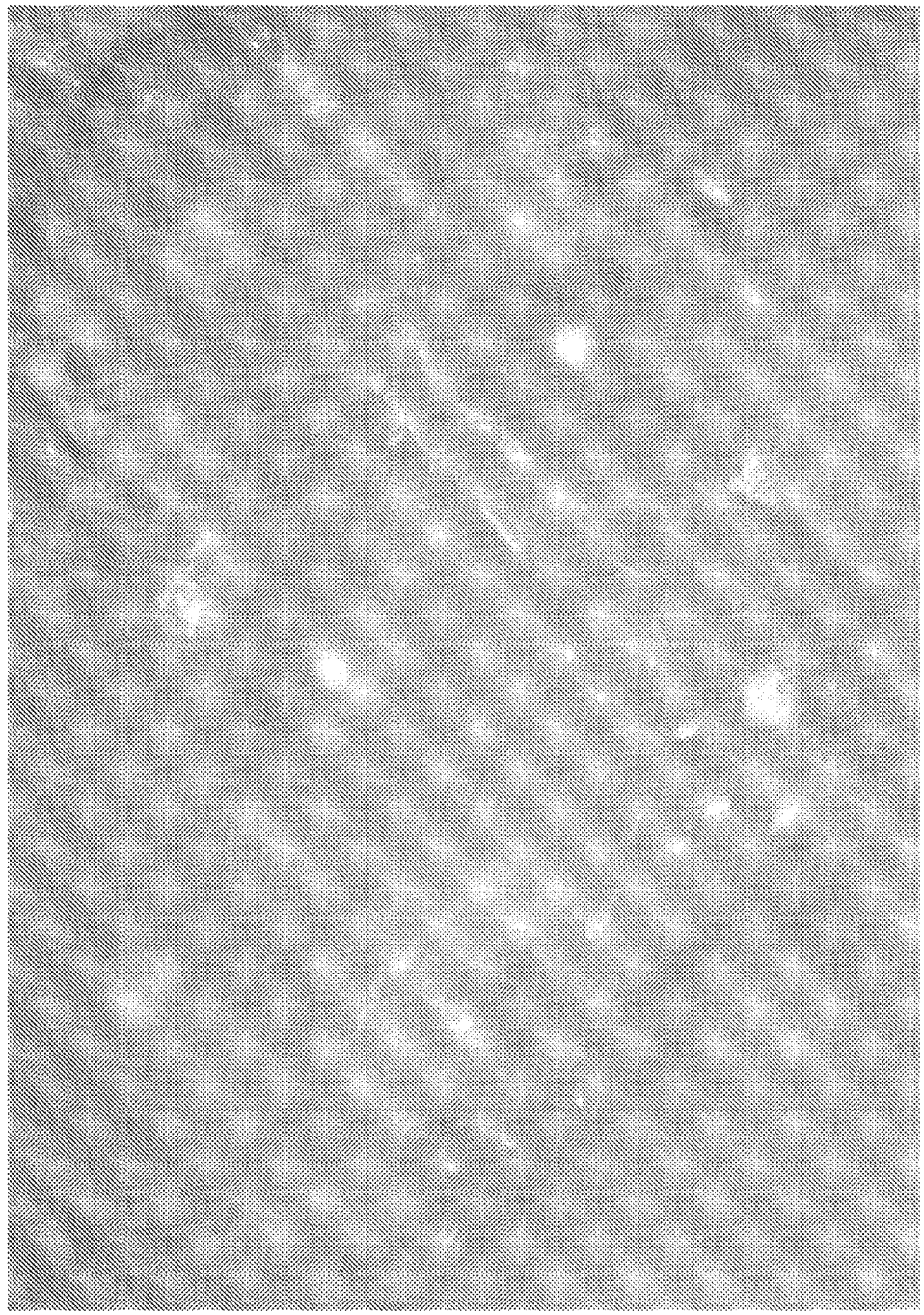
FIG. 5 shows a 10× magnification of the molded polyurethane article comprising the polyol composition of Comparative Example 3.
Figure 6:
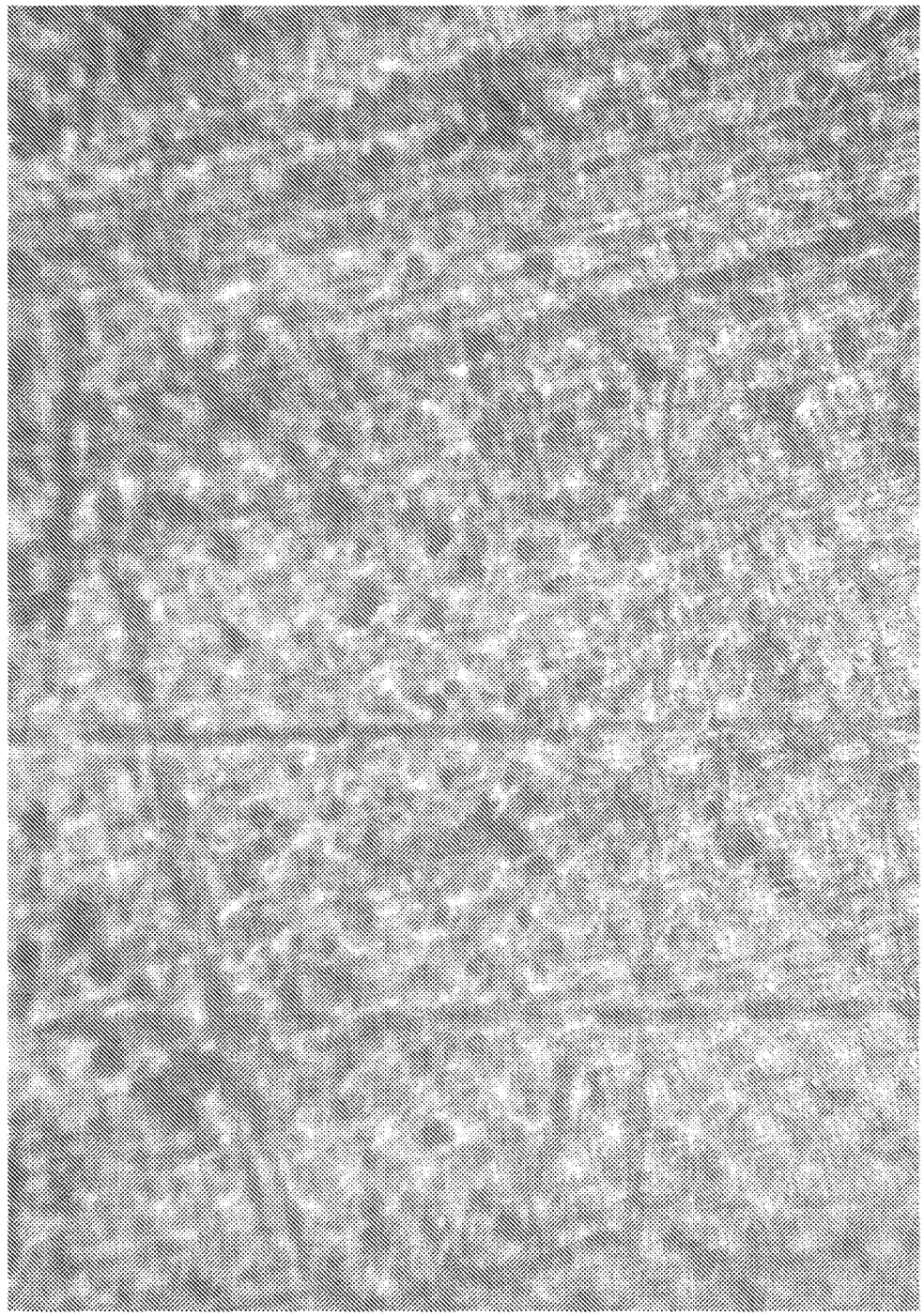
FIG. 6 shows a 10× magnification of the molded polyurethane article comprising the polyol composition of Example 11.

$^\alpha$Values in parentheses = Polyol Composition Example Number
*Tg measured by DSC
**nd = Not determined Comparative Example 4 Polyurethane Prepared from Polyol Mixture not Containing Free or Bound Polyhydroxylated Aromatic Compound To a kettle reactor equipped with a mechanical agitator, and overhead vent is added the monomeric propoxylated polyol (678 grams, 1.84 moles), PLURACOLR PEP 450 (BASF), and heated to 150° C. under stirring. The stirring rate is increased to 1000 rpm and a 20% solution of potassium hydroxide (1 gram) in methanol is added. After 2 minutes a second monomeric polyol, pentaerythritol, (45 grams, 0.33 moles) is added to the reactor with continued stirring. The stirring rate is then decreased to 100 rpm while heating at 150° C. for 30 minutes. The pentaerythritol 3 and FIG. 5) has a sticky to the touch surface and poor surface appearance compared to the molded article of Example 11 (FIGS. 4 and 6), and exhibits the following physical characteristics: Storage Modulus 249 Mpa as determined by dynamic mechanical analysis (DMA); Flex Modulus 458 Mpa as determined using ASTM protocol D790; Flex Strength 13.5 Mpa as determined using ASTM protocol D790; Glass Transition Temperature (Tg) 103° C. as determined by differential scanning calorimetry (DSC). These data are gathered in Table 12 and compared with the corresponding data gathered for the molded article/polyurethane composition of Example 11.

TABLE 12

Comparison of the Product Polyurethane of Comparative
Example 4 with the Product Polyurethane of Example 11

| Entry | Storage Modulus (Mpa) | Flex Modulus (Mpa) | Flex Strength (Mpa) | Tg (° C.) |
|---|---|---|---|---|
| Example 11 | 1400 | 3762 | 132 | 136* |
| Comparative Example 4 | 249 | 458 | 13.5 | 103 |

*Tg determined by dynamic mechanical analysis

Examples 11-20 and Comparative Example 4 illustrate that high strength, high Tg polyurethanes may be prepared from the disclosed polyol compositions using commercially available meter mixing equipment not requiring modification to operate at unusually high temperatures and viscosities. The relatively high glass transition temperatures (Tg) of the disclosed polyurethanes can be taken as a positive indicator of temperature resistance of molded articles incorporating such polyurethane compositions. For example, the heat sag temperature of a 4-millimeter-thick test specimen containing no reinforcing filler and prepared from the polyurethane formulation of Example 11 was 239° F.)(115° ° C., a temperature high enough to meet outdoor use heat requirements. Higher heat resistance may be achieved by incorporating a reinforcing filler, Example 23 in Table 13 below wherein a 4 millimeter thick test specimen containing a single layer of reinforcing filler and prepared from the polyurethane formulation of Example 11 was 340° F. (171° C.). The compositions of Examples 11-20 are high strength, relatively high Tg materials, although some formulations (See Examples 16 and 20 of Table 11) are found to produce brittle polyurethane products. Molded articles prepared from the poly-urethane formulations of Examples 11-20 generally had excellent surface appearance and transparency.

Examples 21-31 Filled Polyurethane Materials Based on the Product Polyol of Example 1 (AD17094)

Into the lower A side (female configuration) of a heated FRP tool is inserted reinforcing glass fabric filler, two layers of continuous filament mat (Owens Corning M8643) which is precut to fill the tool cavity and designed to produce a molded article having a thickness of 4 millimeters (0.17 inches). To fit the tool, slits are cut into the glass fabric filler to conform to the tool surface with minimal overlaps in the reinforcing fabric. The upper B side (male configuration) of the tool is then positioned over the A side and fixed in place with a set of perimeter clamps and the mold is heated to 190-210° F. (88-99° C.). The B side of the tool is attached via a Turbo Auto Sprue (MVP) and injection line to a Covestro meter mixing system equipped with a dynamic mixing head. A reactive mixture is continuously prepared in the mixing head from the polyol composition of Example 1 and Baydur 486 polyisocyanate at a mixing ratio calculated to provide a ratio of polyol composition hydroxyl groups to isocyanate groups of the polyisocyanate of 1.0 to 1.0. The reactive mixture (5.4 Kg) is injected into the tool at a rate of approximately two kilograms per minute. Vent pinch clips are closed when the reactive mixture emerges from mold vent tubes. When the preset amount (5.4 Kg) of the reactive mixture has been delivered to the tool, the tool and the Turbo Auto Sprue are closed, and a propylene carbonate flush sequence is initiated to clear the reactive mixture from the mixing head, the injection line and the Turbo Auto Sprue. The flush sequence is activated immediately to ensure that the reactive mixture does not cure within the machine, the hoses or the Turbo Auto Sprue. When the reactive mixture has gelled to a semi-solid state, the B-side vent tubes are removed. Heat is continuously supplied to the tool by a thermal management system such that in the absence of heat generated by curing of the reactive mixture, the contents of the tool would be maintained at a temperature of 190 to 210° F. (88-99° C.). As the incipient glass filled molded article cures, an in-mold peak exotherm in a range from 250 to 260° F. (121 to 127° C.) is observed during a period 8 to 10 minutes post injection. The total in-mold (in-tool) cure time is 30 minutes at the end of which time the tool temperature returns to the starting temperature of 190 to 210° F. The cured molded article is removed hot from the tool. The molded composite article has excellent surface appearance in both filled and unfilled sections and displays good green strength. The reactive mixture thoroughly wets and adheres to the glass fabric as there are no noticeable air bubbles in the glass filled sections of the article. The molded article exhibits the following physical characteristics: Ultimate Strength 50 Mpa (7252 psi), Flexural Modulus 3732 Mpa (541,281 psi).

The molded articles of Examples 22-31 are prepared analogously to Example 21 using the polyol composition of Example 1, Baydur 483 and one or more layers of a glass filler. Examples 22 and 24 contain no filler and are presented here for purposes of comparison as well as representing disclosed compositions themselves. Data for Examples 21-31 are presented in Table 13.

TABLE 13

Filled Polyurethanes Comprising the Polyol Composition of Example 1 and Baydur 486

| Example | Filler | No. Layers | Part Thickness inches (mm) | Flexural Modulus (Mpa) | Ultimate Strength (Mpa) |
|---|---|---|---|---|---|
| 21 | Owens Corning CFM* M8643 | 2 | 0.170 (4) | 3732 | 50 |
| 22 | Unfilled | — | 0.170 (4) | 3000 | 77 |
| 23 | Owens Corning MULTI MAT S600/G500/S600 | 1 | 0.170 (4) | 8445 | 152 |
| 24 | Unfilled | — | 0.255 (6) | 3762 | 132 |
| 25 | Owens Corning CFM* M8643 | 1 | 0.255 (6) | 3492 | 148 |
| 26 | Owens Corning CFM* M8643 | 2 | 0.255 (6) | 4196 | 148 |
| 27 | Owens Corning CFM* M8643 | 3 | 0.255 (6) | 5514 | 150 |
| 28 | Skaps FLOWMAT 600/P1/600 | 1 | 0.255 (6) | 6979 | 173 |
| 29 | Skaps FLOWMAT 450/P1/450 | 1 | 0.255 (6) | 4785 | 122 |
| 30 | Skaps FLOWMAT 300/D3/300 | 1 | 0.255 (6) | 4031 | 107 |
| 31 | Owens Corning MULTI MAT S600/G500/S600 | 1 | 0.255 (6) | 7660 | 193 |

Examples 21-31 illustrate that high strength, heat resistant polyurethane composites may be prepared from the disclosed polyol compositions using commercially available meter mixing equipment not requiring modification to operate at unusually high temperatures or viscosities. Additionally, moderate in-mold exotherms, typically less than 260° F., enable the use and longer useful life of FRP tooling used to make both filled and unfilled molded articles. As noted earlier, the heat sag temperature of a molded article prepared using the polyurethane formulation of Example 11 was significantly improved without sacrificing the surface appearance of the molded article or creating voids within the molded article. Aa molded article made of a glass filled composite polyurethane as disclosed herein outperformed a corresponding molded article made without a filler. The glass filled molded article of Example 23 performed well in the Drop Dart Test (ASTM D3763) in which the dart bounced off of the surface of the molded article without penetrating it. In the same test, the unfilled molded article of Example 22 broke upon impact.

Heat Sag Test Protocol

The heat sag test is preformed using a 3-foot section of the part 0.170 inches thick containing 1 layer of Owens Corning MULTIMAT S600/G500/S600 glass filler. The part is placed into a fixture holding the part at its designed mounting line so that it floats freely. A pre-measurement (part angle) is taken and the part is placed in the oven and slowly heated from an initial temperature of 190° F. The temperature is increased in increments of 10° F. and held for two hours at each temperature. At the end of each two hour period the part angle is remeasured. The process is repeated until the measured part angle indicated movement of the part relative to its initial position. Temperature measurements are taken using an Omega HH11B, Digital Thermometer. Part angle measurements are taken using a Tilt Box II, Digital Inclinometer (Accuracy+/−0.2°). The molded composite article of Example 23 exhibits a heat sag temperature of 340° F. (171° C.).

Examples 32-44 Product Polyols Comprising Additional Compounds Comprising Two or More Isocyanate Reactive Groups Example 32

To the product polyol composition of Example 1 is added the propoxylated pentaerythritol, PLURACOLA PEP 450 in an amount such that the resultant polyol composition contains 50 by weight of the polyol and 50 by weight of the added polyol. The mixture is warmed to approximately 80° F. and stirred mechanically to afford a homogeneous polyol composition.

Examples 33-44 are prepared analogously and provide the polyol compositions illustrated in Table 14.

TABLE 14

Polyol Compositions of Examples 32-44

| Entry | Polyol of Example 1 %* | PEP 450 %* | Glycerin %* | Trimethylol propane %* | Octane Diol %* |
|---|---|---|---|---|---|
| Example 32 | 50 | 50 | — | — | — |
| Example 33 | 40 | 60 | — | — | — |
| Example 34 | 55 | 45 | — | — | — |
| Example 35 | 60 | 40 | — | — | — |
| Example 36 | 50 | 42 | 8 | — | — |
| Example 37 | 50 | 35 | 15 | — | — |
| Example 38 | 40 | 35 | 10 | 5 | — |
| Example 39 | 60 | 30 | 5 | 5 | — |
| Example 40 | 55 | 25 | 5 | 10 | 5 |
| Example 41 | 50 | 45 | 5 | — | 2 |
| Example 42 | 40 | 45 | 5 | 2 | 2 |
| Example 43 | 50 | 45 | — | 5 | — |
| Example 44 | 50 | 45 | — | 3 | 2 |

*Weight percentage of the component based on the total weight of the product polyol composition.

The invention claimed is:

1. A polyol composition comprising:
   (a) at least one monomeric polyol comprising three or more hydroxyl groups;
   (b) at least one higher polyol comprising three or more hydroxyl groups; and
   (c) at least one polyhydroxylated aromatic compound;
   wherein the at least one higher polyol comprises residues of either the at least one monomeric polyol or both of the at least one monomeric polyol and the polyhydroxylated aromatic compound, wherein the residues are linked by one or more carbonate groups, oxygen ether groups, or a combination thereof, and
   wherein the polyol composition has a viscosity of less than 5000 cps at 150 degrees Fahrenheit and wherein the at least one polyhydroxylated aromatic compound is present in an amount greater than 16 percent by weight and less than 35 percent by weight based on total weight of the polyol composition.

2. The composition of claim 1, wherein the at least one monomeric polyol comprises three or more secondary hydroxyl groups.

3. The composition of claim 1, wherein the at least one monomeric polyol comprises one or more oxygen ether groups.

4. The composition of claim 1, wherein the at least one monomeric polyol comprises four or more hydroxyl groups.

5. The composition of claim 1, wherein the at least one monomeric polyol comprises four or more secondary hydroxyl groups.

6. The composition of claim 1, wherein the at least one monomeric polyol comprises a mixture of polyols having an average molecular weight of less than 500 grams per mole.

7. The composition of claim 1, wherein the at least one monomeric polyol comprises a $C_2$ to $C_4$ alkoxylated polyether polyol.

8. The composition of claim 1, wherein the at least one higher polyol comprises one or more carbonate groups and two or more residues of the at least one monomeric polyol.

9. The composition of claim 1, wherein the at least one monomeric polyol is present in an amount greater than 10 percent and less than 90 percent by weight based on the total weight of the polyol composition; and the at least one higher polyol is present in an amount greater than 5 percent by weight and less than 70 percent based on the total weight of the polyol composition.

10. A method of making the polyol composition of claim 1, comprising contacting one or more compositions containing one or more polyhydroxylated aromatic moieties with one or more monomeric polyols having three or more hydroxyl groups in the presence of at least one activating agent and an effective amount of at least one of a catalyst, a promoter or a mixture thereof, at a temperature sufficient to cause formation of the at least one higher polyol to provide the polyol composition.

11. A method of making the polyol composition of claim 1, comprising contacting at least one aromatic carbonate with one or more monomeric polyols having three or more hydroxyl groups in the presence of an effective amount of at least one of a catalyst, a promoter or a mixture thereof, at a temperature sufficient to cause formation of the at least one higher polyol to provide the polyol composition;
   wherein the at least one aromatic carbonate comprises one or more residues of the polyhydroxylated aromatic compound; and wherein the at least one polyhydroxylated aromatic compound is derived from the one or more residues of the polyhydroxylated aromatic compound of the at least one aromatic carbonate.

12. The method of claim 11, wherein the at least one aromatic carbonate is an oligomeric polycarbonate, a polymeric polycarbonate, or a mixture thereof.

13. The composition of claim 1, prepared by a method comprising contacting one or more aromatic carbonates with one or more monomeric polyols having three or more hydroxyl groups in the presence of an effective amount of at least one of a catalyst, a promoter or a mixture thereof, under conditions sufficient to cause formation of the at least one higher polyol to provide the polyol composition;
  wherein at least a portion of the at least one polyhydroxylated aromatic compound is derived from the one or more aromatic carbonates.

14. A polyurethane composition prepared by reacting the polyol composition of claim 1 with one or more polyisocyanates, latent polyisocyanates or mixtures thereof, optionally in the presence of a catalyst, under conditions sufficient to cause at least a portion of hydroxyl groups of the at least one monomeric polyol, at least a portion of the hydroxyl groups of the at least one higher polyol, and at least a portion of hydroxyl groups of the at least one polyhydroxylated aromatic compound to react with isocyanate groups or latent isocyanate groups of the one or more polyisocyanates or the latent polyisocyanates to form urethane linkages of the polyurethane composition.

15. A polyurethane composition comprising residue of the polyol composition of claim 1 and residue of one or more polyisocyanates or latent polyisocyanates; wherein urethane linkages of the polyurethane composition are formed by reaction of at least a portion of the hydroxyl groups of the at least one monomeric polyol, at least a portion of hydroxyl groups of the at least one higher polyol, and at least a portion of hydroxyl groups of the at least one polyhydroxylated aromatic compound with isocyanate groups of polyisocyanates or latent isocyanate groups of latent polyisocyanates.

16. An article comprising the composition of claim 9, which exhibits a heat distortion temperature greater than 110 degrees centigrade, a flexural strength greater than 10,000 psi and a flexural modulus greater than 500,000 psi.

17. A method comprising: contacting the polyol composition of claim 1 with one or more polyisocyanates, latent polyisocyanates or mixtures thereof, optionally in the presence of a catalyst under conditions sufficient to cause at least a portion of hydroxyl groups of the at least one monomeric polyol, at least a portion of hydroxyl groups of the at least one higher polyol, and at least a portion of hydroxyl groups of the at least one polyhydroxylated aromatic compound to react with one or more isocyanate groups or latent isocyanate groups of the polyisocyanates or the latent polyisocyanates to form a polyurethane product.

18. A method comprising:
  (a) mixing a first reactant comprising either or both of one or more polyisocyanates and one or more latent polyisocyanates with a second reactant comprising one or more polyol compositions of claim 1 to form a reactive mixture;
  (b) transferring the reactive mixture into a mold; and
  (c) curing the reactive mixture within the mold to afford a molded part;
  wherein during step (c) at least a portion of hydroxyl groups of the at least one monomeric polyol, at least a portion of hydroxyl groups of the at least one higher polyol, and at least a portion of hydroxyl groups of the at least one polyhydroxylated aromatic compound react with isocyanate groups or latent isocyanate groups of the one or more polyisocyanates or the one or more latent polyisocyanates to form a polyurethane product.

19. A composition comprising:
  (a) a first part comprising either or both of a polyisocyanate and a latent polyisocyanate; and
  (b) a second part comprising a polyol composition of claim 1;
  wherein when the first part and the second part are contacted the composition cures by reaction of at least a portion of hydroxyl groups of the at least one monomeric polyol, at least a portion of hydroxyl groups of the at least one higher polyol, and at least a portion of hydroxyl groups of the at least one polyhydroxylated aromatic compound with isocyanate groups or latent isocyanate groups of the polyisocyanates or the latent polyisocyanates.

20. The composition of claim 1, wherein a molar ratio of hydroxyl groups to carbonate groups is greater than 5 and less than 14.

* * * * *